United States Patent
Ambichl et al.

(10) Patent No.: US 10,083,073 B2
(45) Date of Patent: Sep. 25, 2018

(54) METHOD AND SYSTEM FOR REAL-TIME CAUSALITY AND ROOT CAUSE DETERMINATION OF TRANSACTION AND INFRASTRUCTURE RELATED EVENTS PROVIDED BY MULTIPLE, HETEROGENEOUS AGENTS

(71) Applicant: Dynatrace LLC, Waltham, MA (US)

(72) Inventors: Ernst Ambichl, Altenberg (AT); Helmut Spiegl, Linz (AT); Otmar Ertl, Linz (AT); Herwig Moser, Freistadt (AT)

(73) Assignee: Dynatrace LLC, Waltham, MA (US)

( * ) Notice: Subject to any disclaimer, the term of this patent is extended or adjusted under 35 U.S.C. 154(b) by 112 days.

(21) Appl. No.: 15/264,867

(22) Filed: Sep. 14, 2016

(65) Prior Publication Data

US 2017/0075749 A1    Mar. 16, 2017

Related U.S. Application Data

(60) Provisional application No. 62/301,116, filed on Feb. 29, 2016, provisional application No. 62/218,128, filed on Sep. 14, 2015.

(51) Int. Cl.
*G06F 11/07* (2006.01)
*G06F 11/30* (2006.01)
(Continued)

(52) U.S. Cl.
CPC ........ *G06F 11/079* (2013.01); *G06F 11/0709* (2013.01); *G06F 11/0712* (2013.01);
(Continued)

(58) Field of Classification Search
CPC ............... G06F 11/079; G06F 11/0709; G06F 11/0748; G06F 11/30; G06F 11/3072; G06F 11/321; G06F 11/0754
See application file for complete search history.

(56) References Cited

U.S. PATENT DOCUMENTS

| 8,464,102 B2 * | 6/2013 | Sinha ..................... G06F 11/079 714/26 |
| 8,761,029 B2 * | 6/2014 | Ge ....................... G06F 11/0709 370/216 |

(Continued)

*Primary Examiner* — Charles Ehne
(74) *Attorney, Agent, or Firm* — Harness, Dickey & Pierce, P.L.C.

(57) ABSTRACT

A method is disclosed that estimates causal relationships between events based on heterogeneous monitoring data. The monitoring data consists in transaction tracing data, describing the execution performance of individual transactions, resource utilization measurements of infrastructure entities like processes or operating systems and network utilization measurement data. A topology model of the monitored environment describing its entities and the communication activities of these entities is incrementally created. The location of occurred events in the topology model is determined. The topology model is used in conjunction with a domain specific causality propagation knowledge base to calculate the possibility of causal relationships between events. Different causality determination mechanisms, based on the type of involved events are used to create graphs of causal related events. A set of root cause events, representing those events with greatest global impact on all other events in an event graph is calculated for each identified event graph.

32 Claims, 29 Drawing Sheets

Problem Scope

(51) Int. Cl.
*G06F 11/34* (2006.01)
*H04L 12/24* (2006.01)

(52) U.S. Cl.
CPC ......... *G06F 11/0748* (2013.01); *G06F 11/30* (2013.01); *G06F 11/3072* (2013.01); *G06F 11/34* (2013.01); *H04L 41/12* (2013.01); *H04L 41/0631* (2013.01); *H04L 41/22* (2013.01); *H04L 41/5009* (2013.01)

(56) References Cited

U.S. PATENT DOCUMENTS 9,466,028 B2 * 10/2016 Polehn .................. G06N 5/047
2011/0231704 A1 * 9/2011 Ge ...................... G06F 11/0709
714/26

* cited by examiner

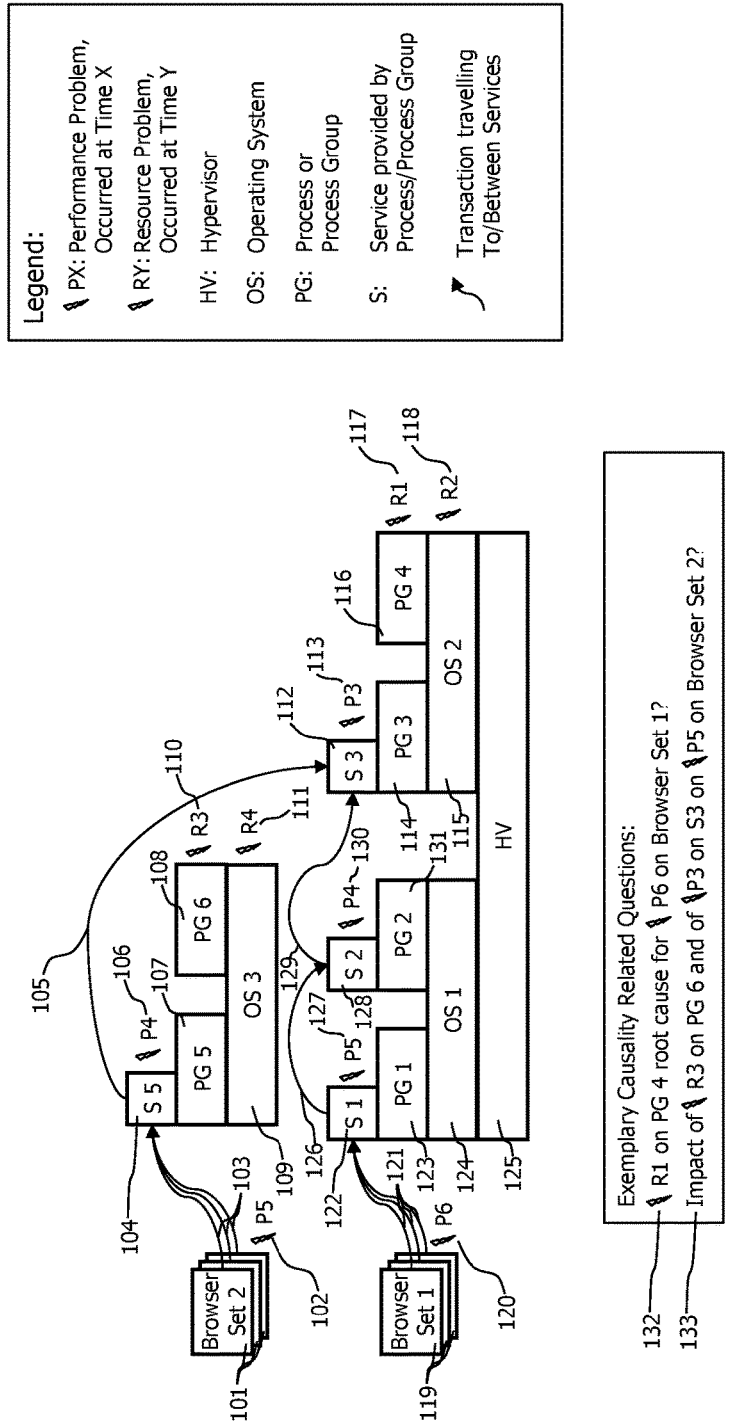
FIG 1: Problem Scope

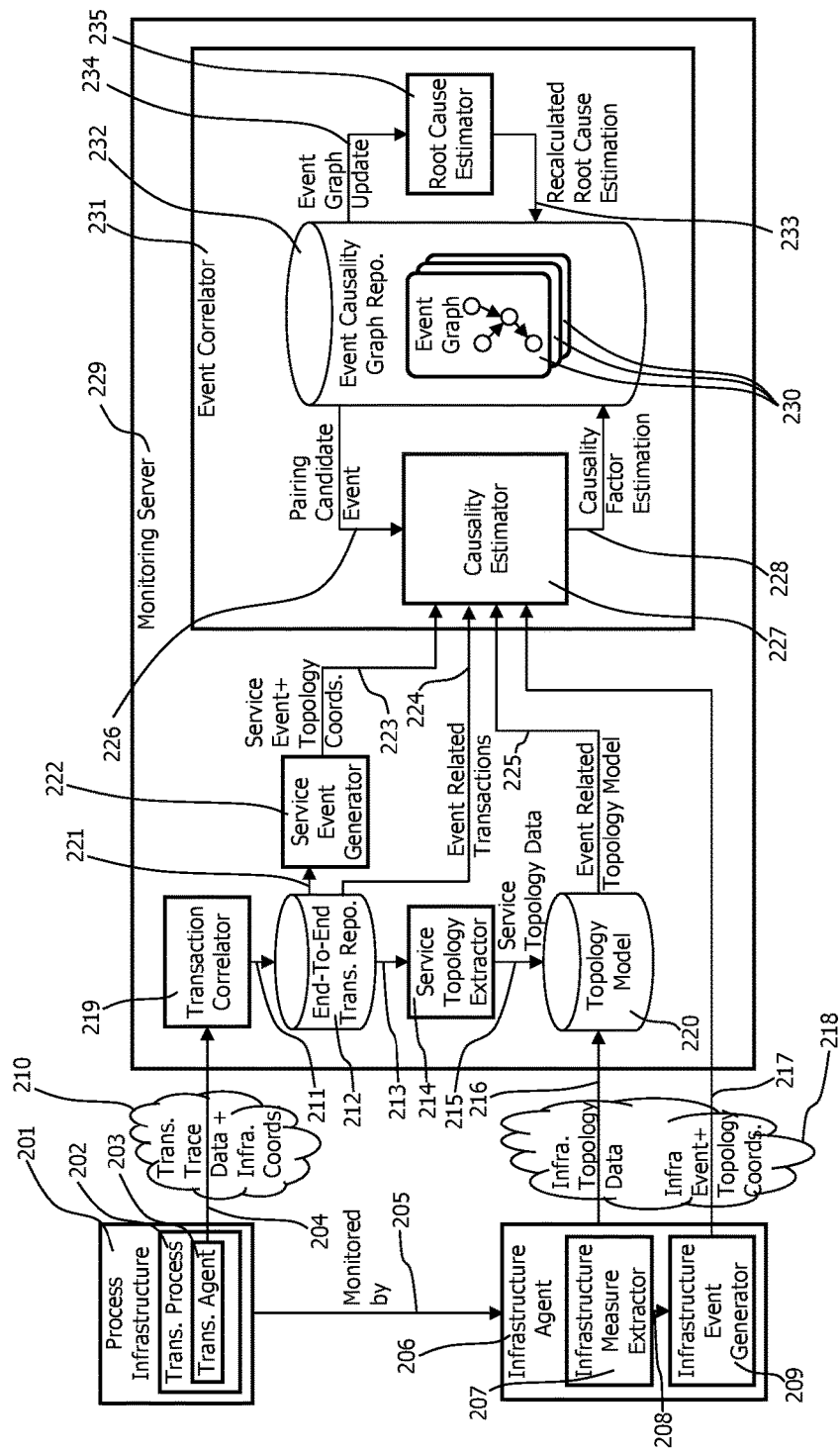
FIG 2: System Overview

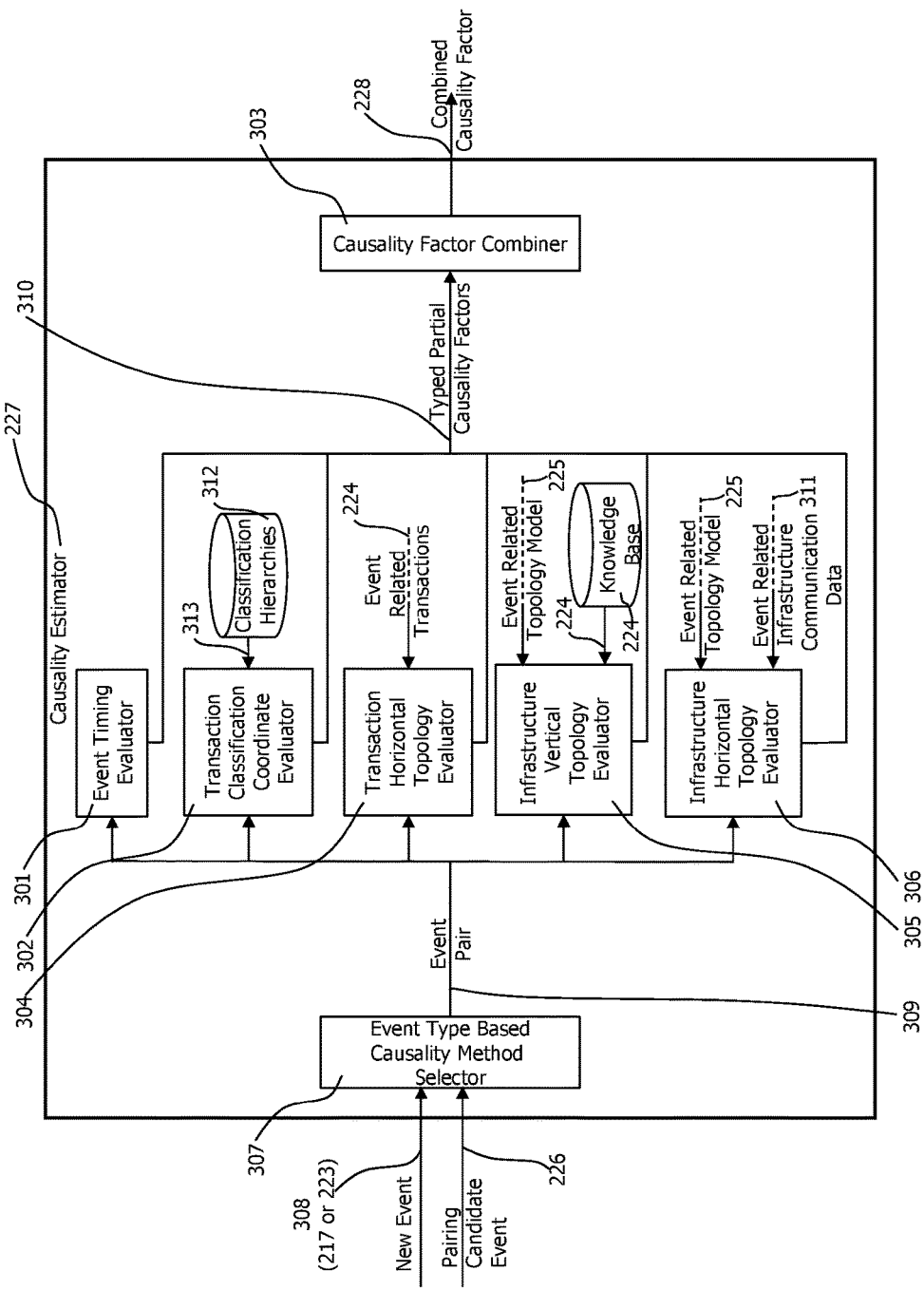
FIG 3: Causality Estimator

FIG 4: Event Node Record and Event Causality Record

FIG 4a: Event Node Record

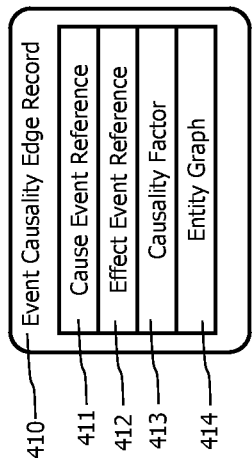

- 401 Event Node Record
- 402 Type
- 403 Topology Type
- 404 Topology Coordinates
- 405 Transaction Classification Coordinates
- 406 Start Time Range/Interval
- 407 End Time Range/Interval

FIG 4b: Event Causality Edge Record

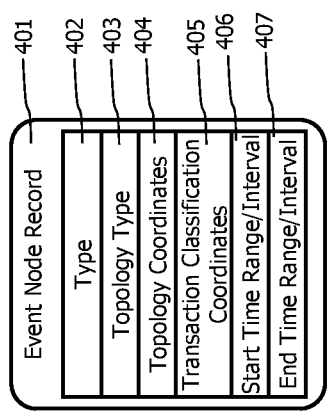

- 410 Event Causality Edge Record
- 411 Cause Event Reference
- 412 Effect Event Reference
- 413 Causality Factor
- 414 Entity Graph

FIG 4c: Event Graph Record

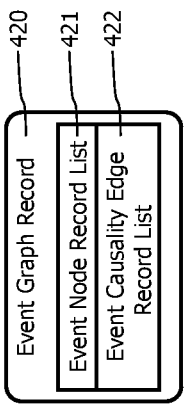

- 420 Event Graph Record
- 421 Event Node Record List
- 422 Event Causality Edge Record List

FIG 5: Exemplary Classification Coordinate Pairs
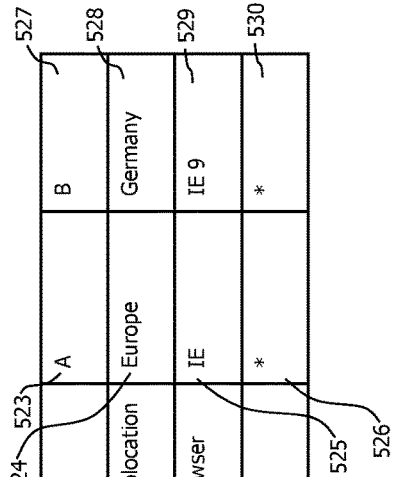
FIG 5a: Disjunctive Pair
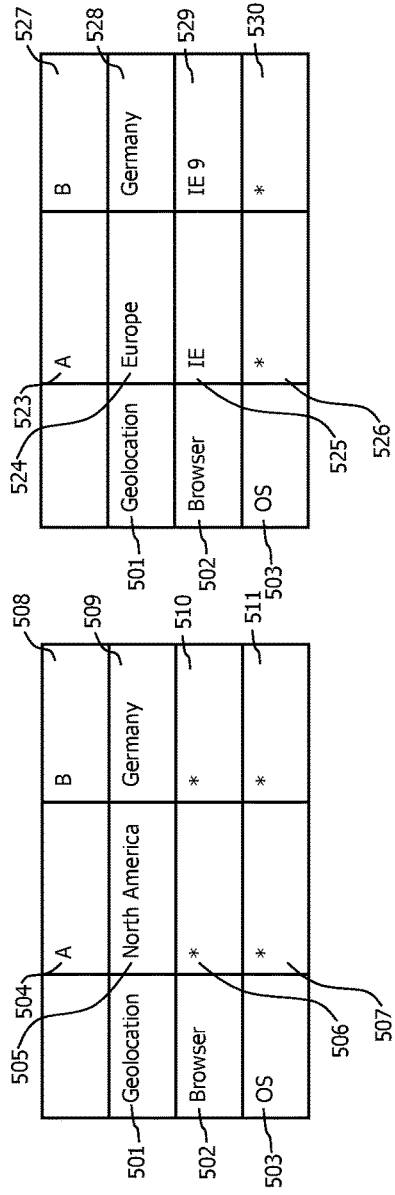
FIG 5b: Non Disjunctive Pair
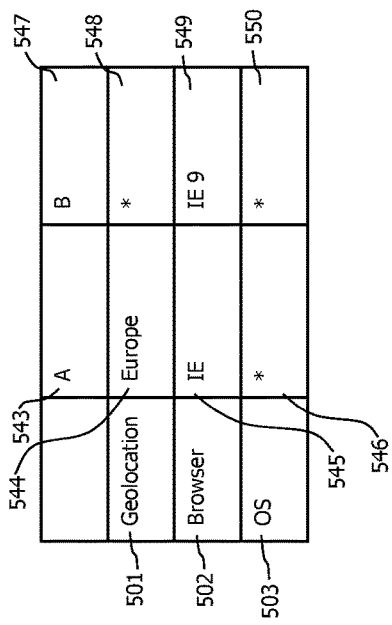
FIG 5c: Undecidable

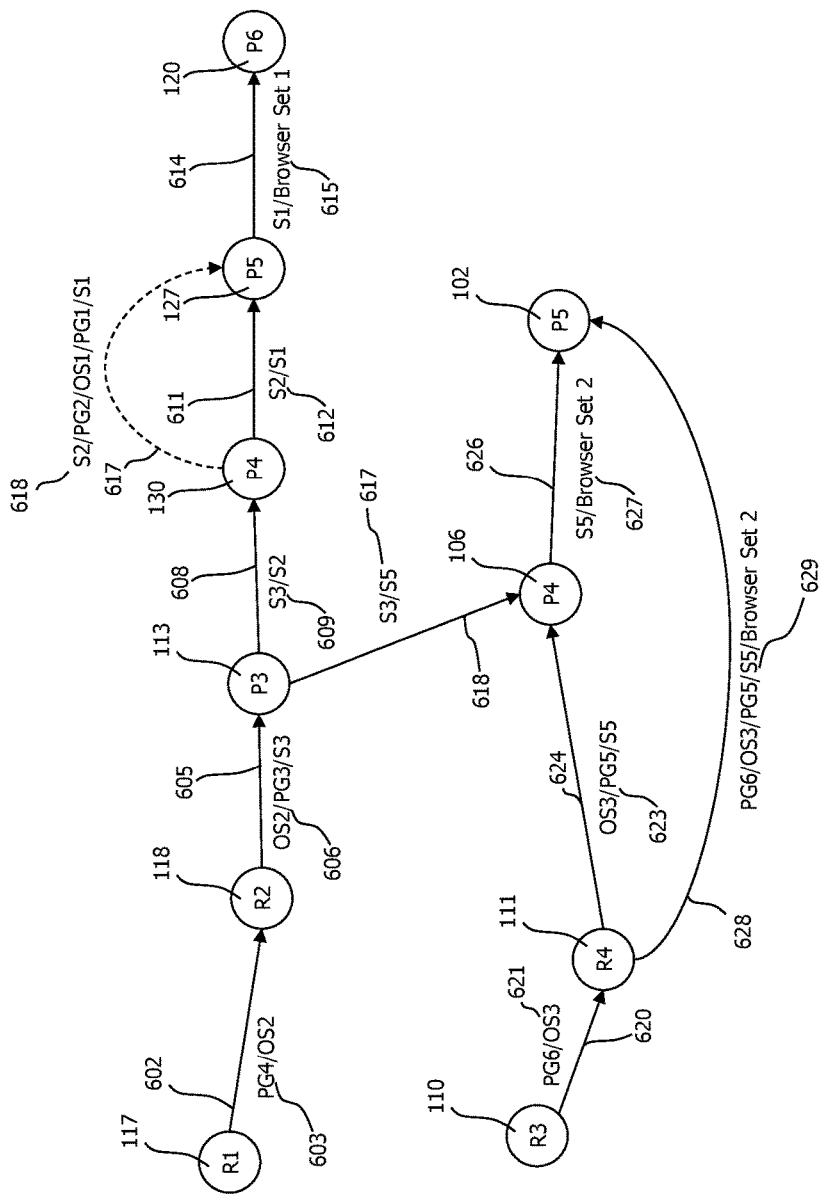
FIG 6: Exemplary Event Causality Graph

FIG 7: Event Creation and Topology Model Update
FIG 7a: End-To-End Transaction Processing
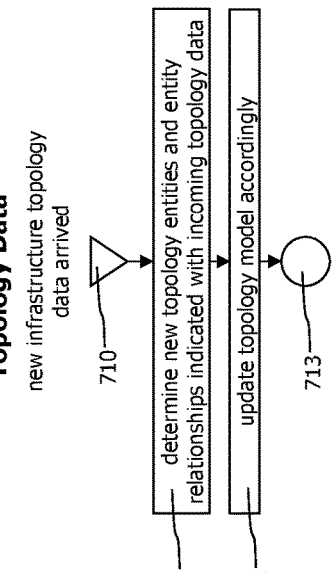
FIG 7b: Processing of Infrastructure Topology Data
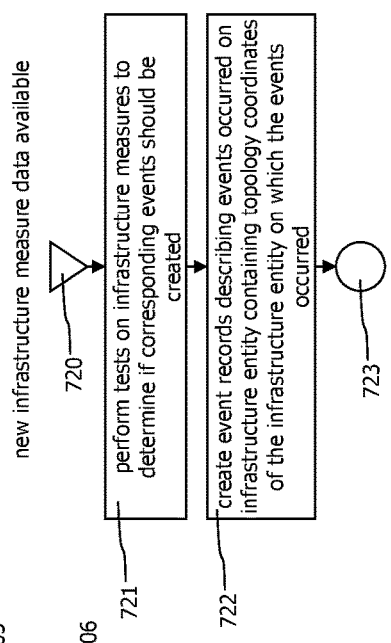
FIG 7c: Creation of Infrastructure Events
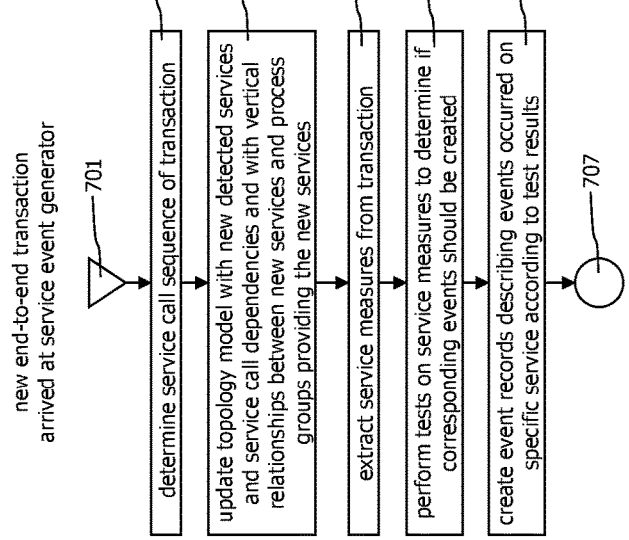

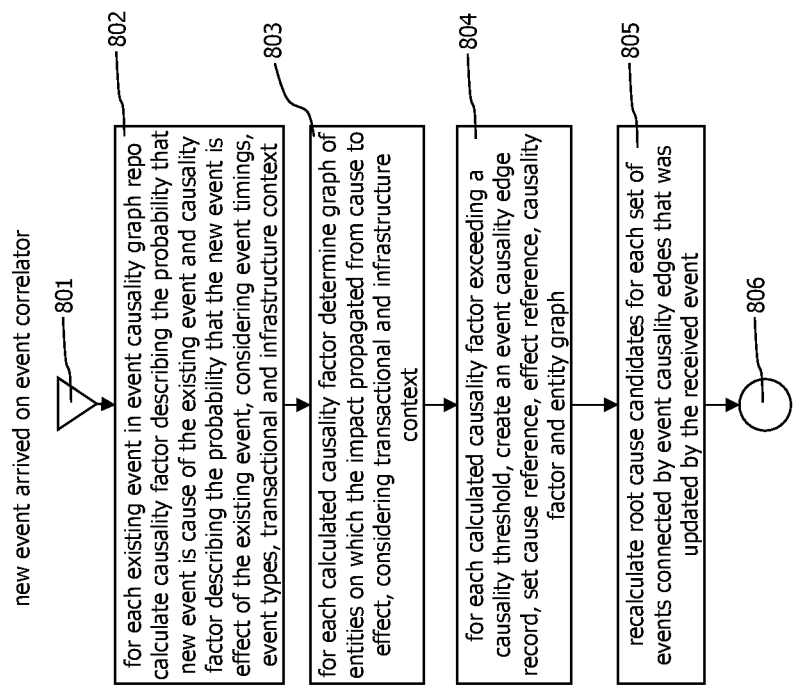
FIG 8: Event Processing by Event Correlator

FIG 9: Causality Determination
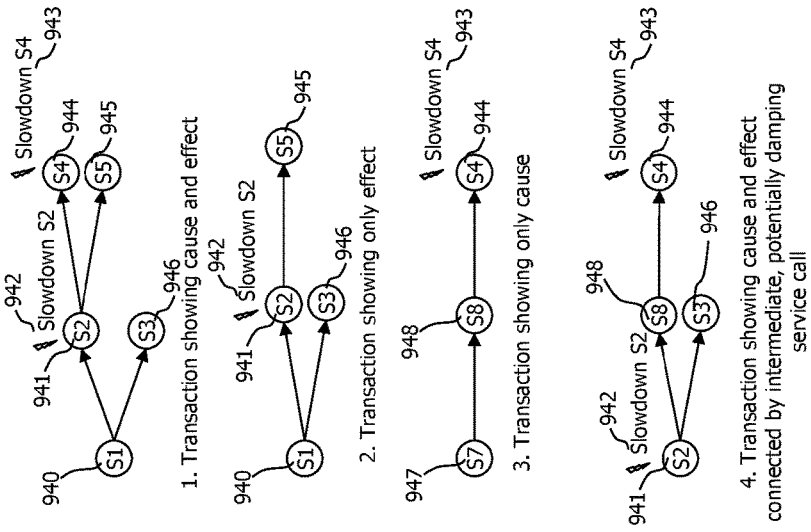
FIG 9c: Transactional Causality Evidence
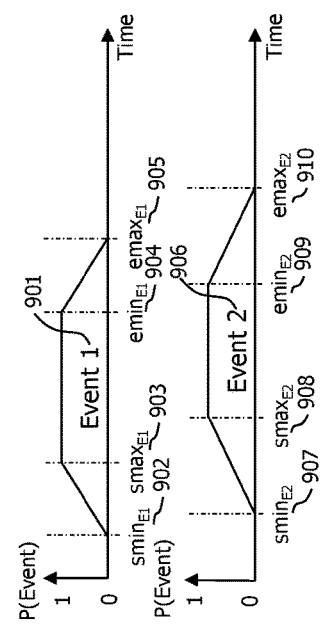
FIG 9a: Event Timing Causality Evidence
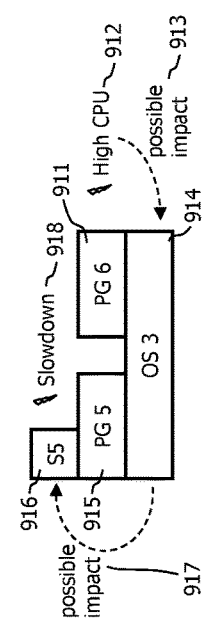
FIG 9b: Infrastructure Causality Evidence
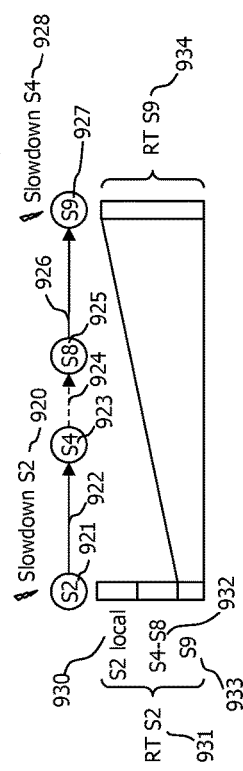
FIG 9d: Transaction Determined Attributable Impact

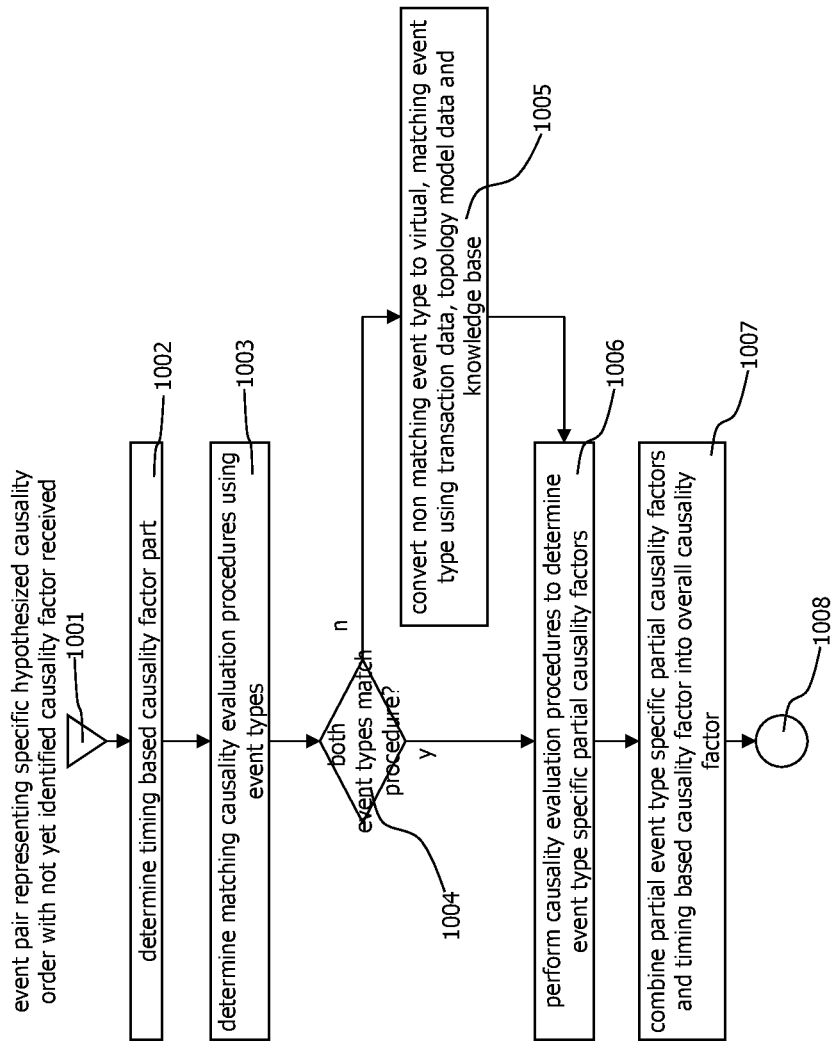
FIG 10: Causality Factor Calculation

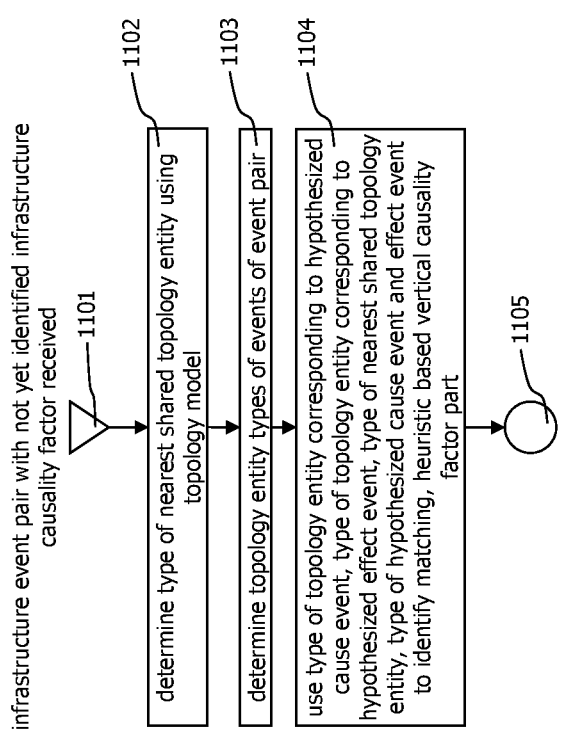
FIG 11: Causality Factor Calculation for Infrastructure Events

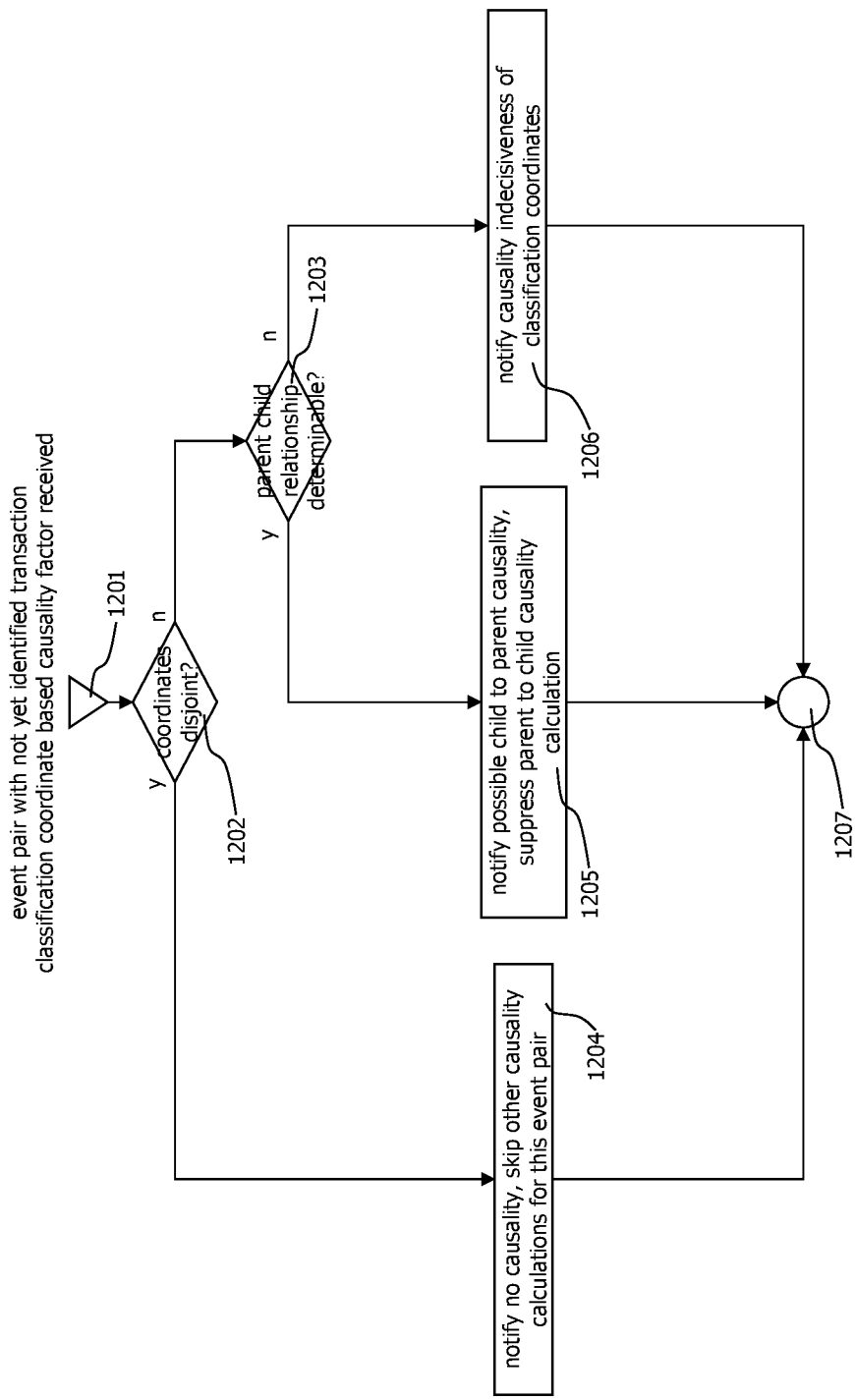
FIG 12: Causality Factor Calculation for Transaction Events using Classification Coordinates

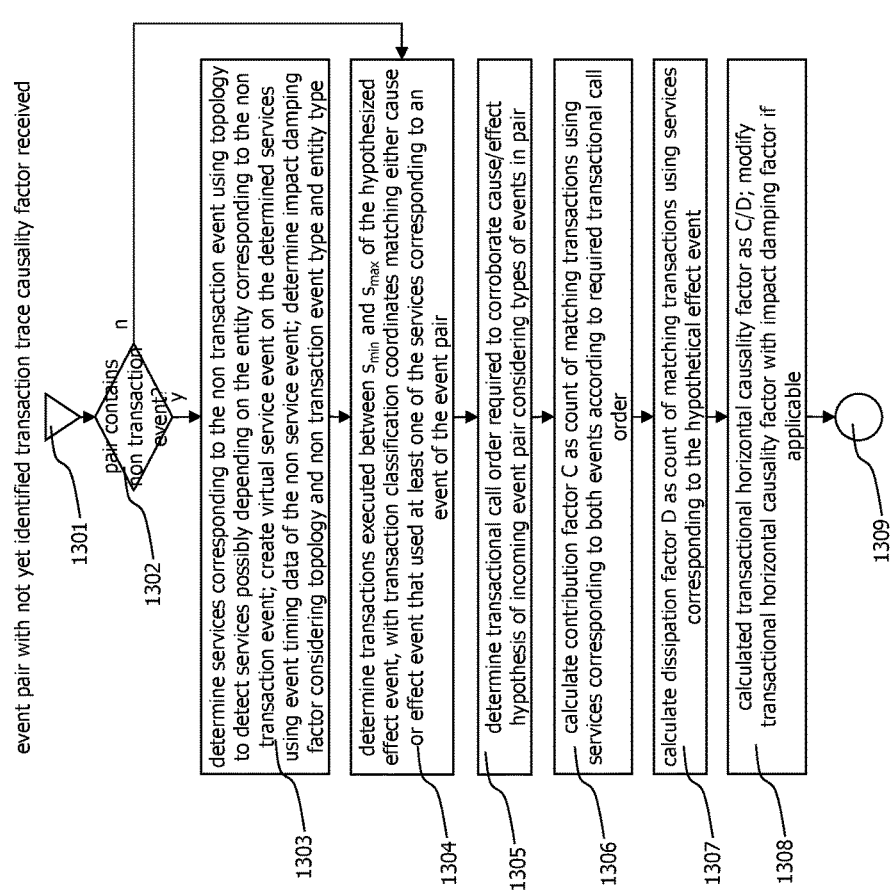
FIG 13: Causality Factor Calculation for Transaction Events using Tracing Data of Involved Transactions

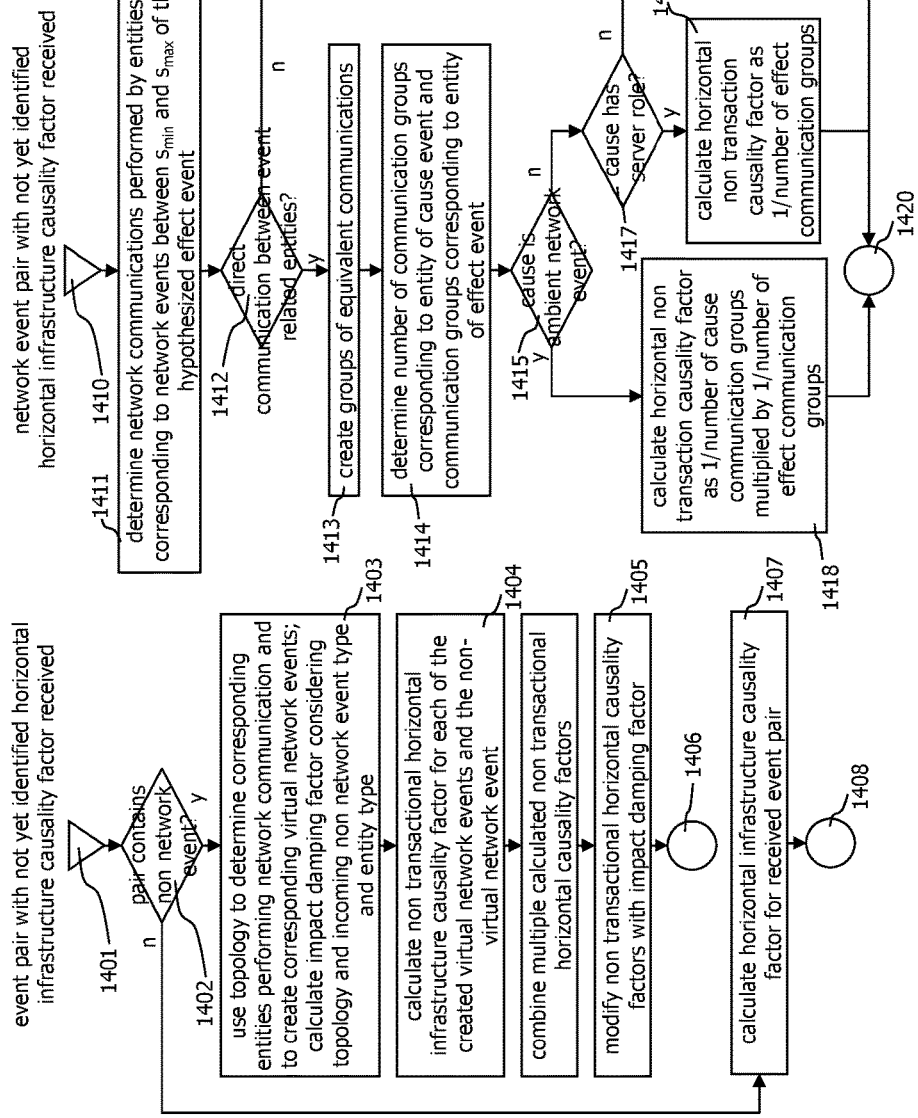
FIG 14: Causality Factor Calculation for Network Events

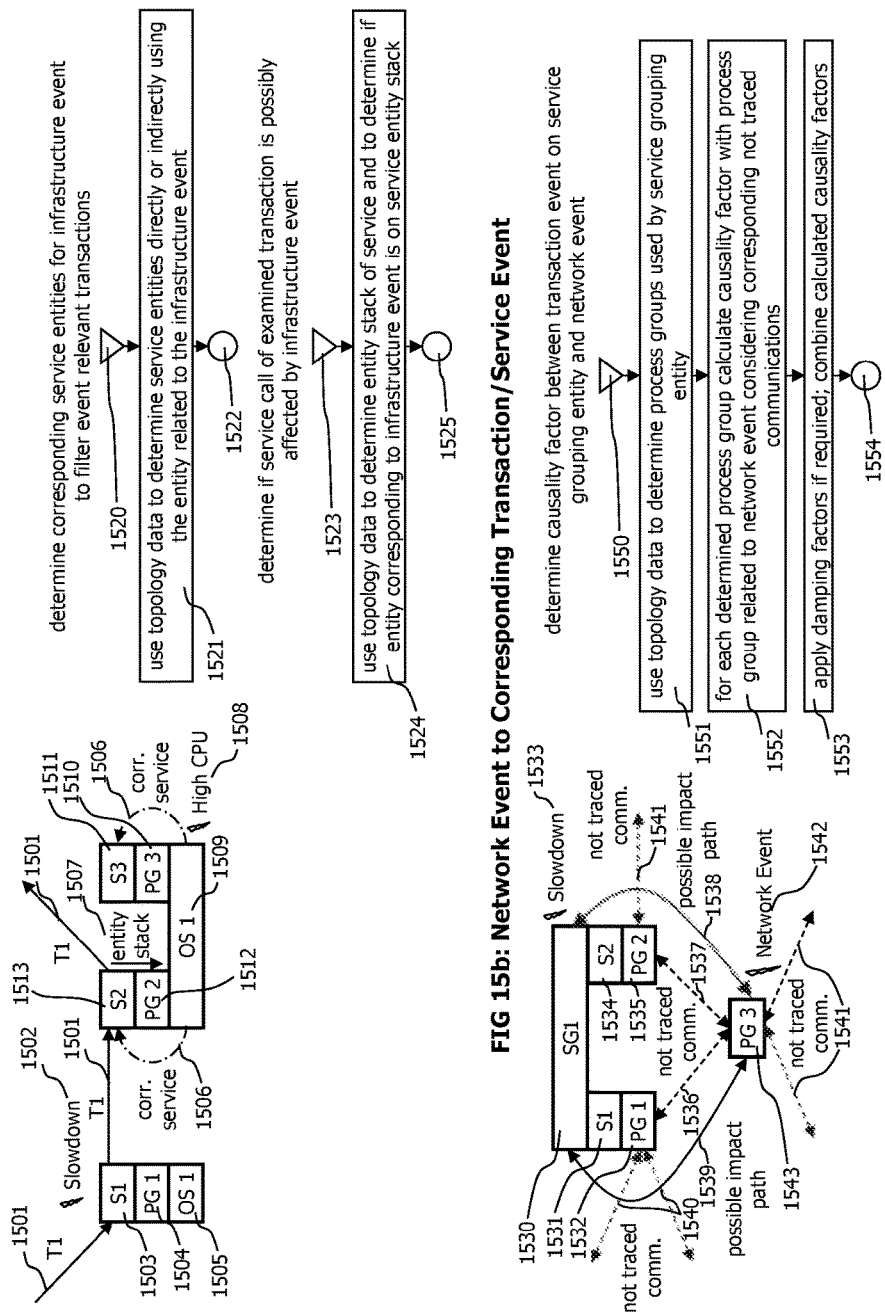

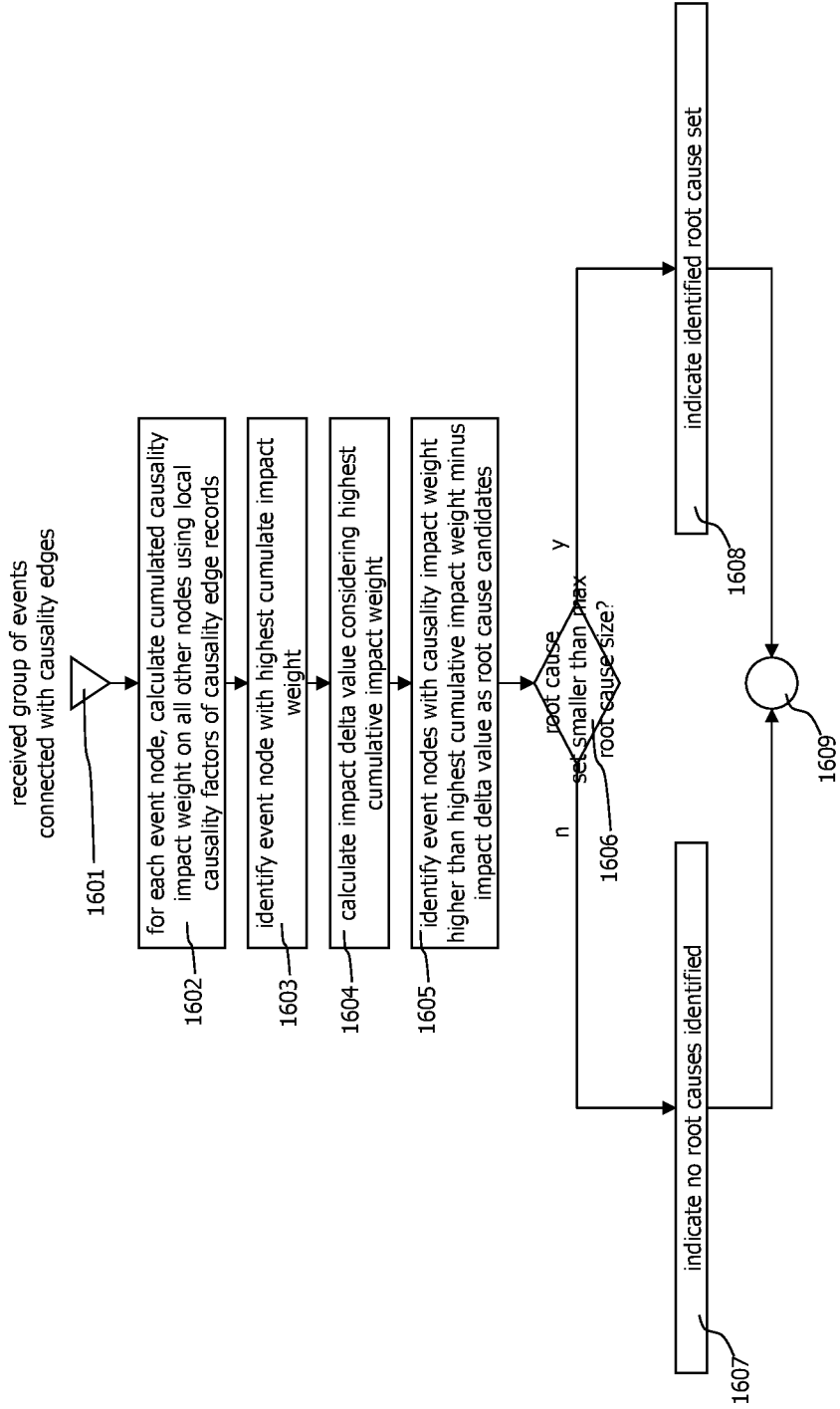

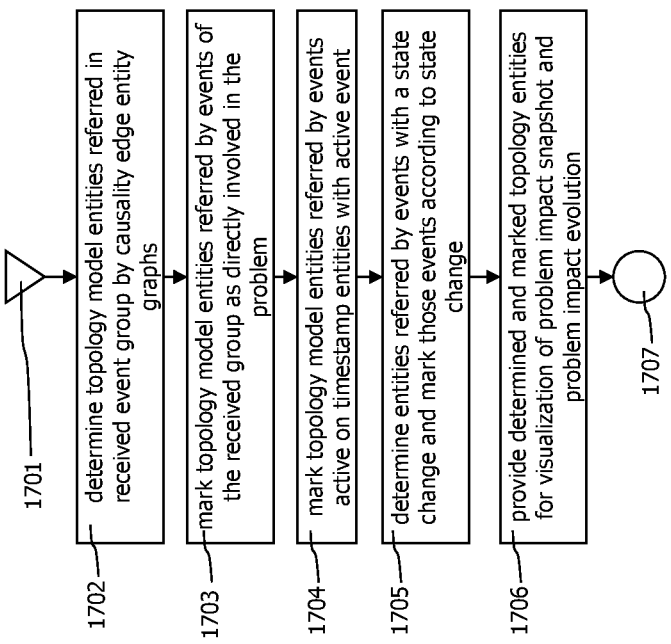
FIG 17: Calculating Data for Combined Problem/Topology Snapshot

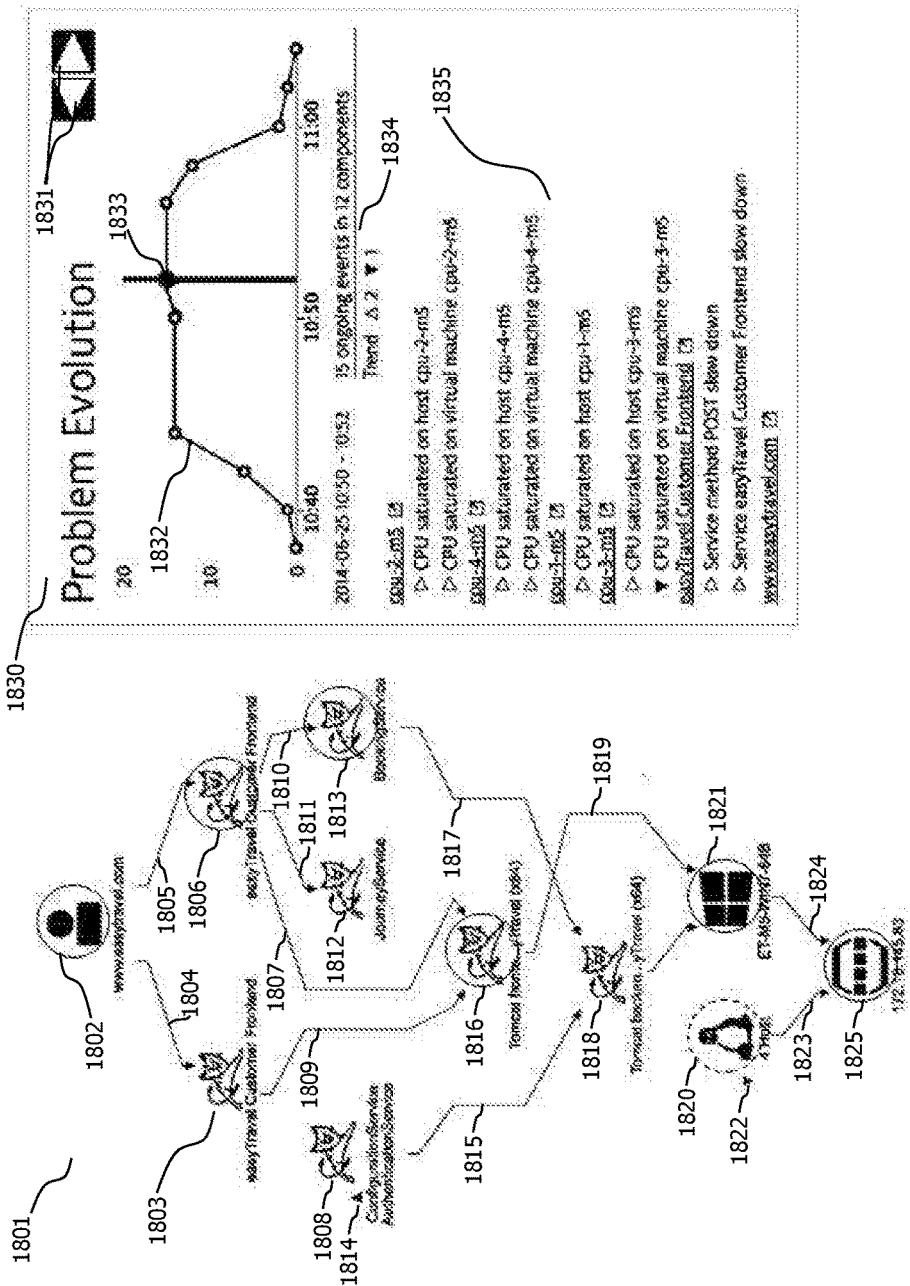
FIG 18: Exemplary Visualization of Problem Evolution

FIG 19: Exemplary Causality Matrix

| Cause Entity Type | Effect Entity Type | Shared Entity Type | Impact Factor |
|---|---|---|---|
| Hypervisor | Hypervisor | Hypervisor | 1.0 |
| Hypervisor | Operating System | Hypervisor | 0.5 |
| Hypervisor | Process Group | Hypervisor | 0.2 |
| Operating System | Process Group | Hypervisor | 0.1 |
| Process Group | Service | Operating System | 0.5 |
| Process Group | Service | Process Group | 0.7 |

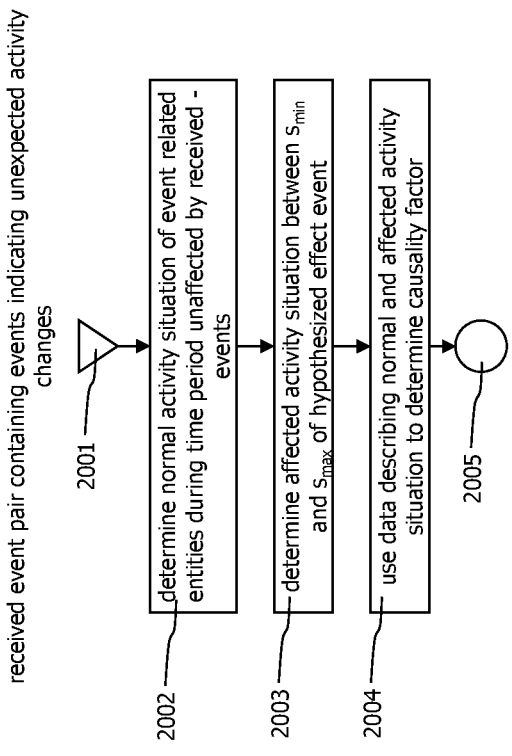
FIG 20: Determine Causality Evidence for Unexpected Activity Change Events

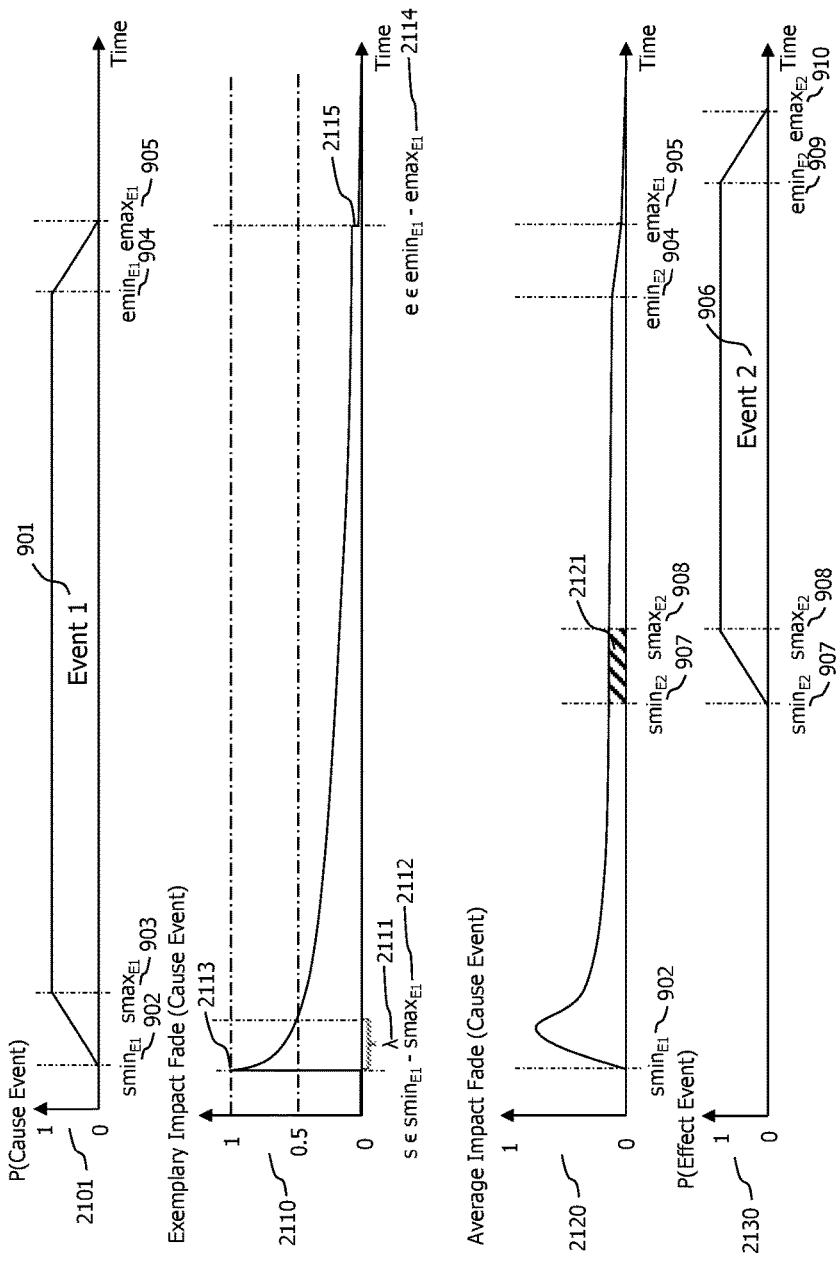
FIG 21: Alternative Event Timing Causality Evidence Considering Impact Fading

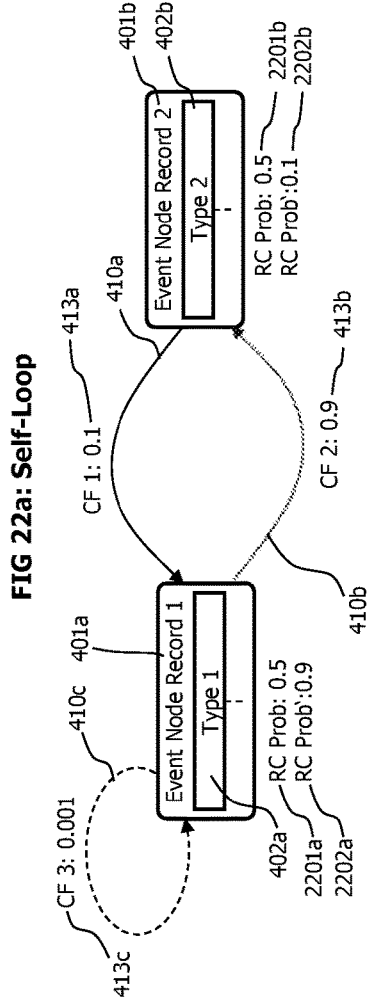
FIG 22: Event Type Specific Root Cause Estimation Optimizations

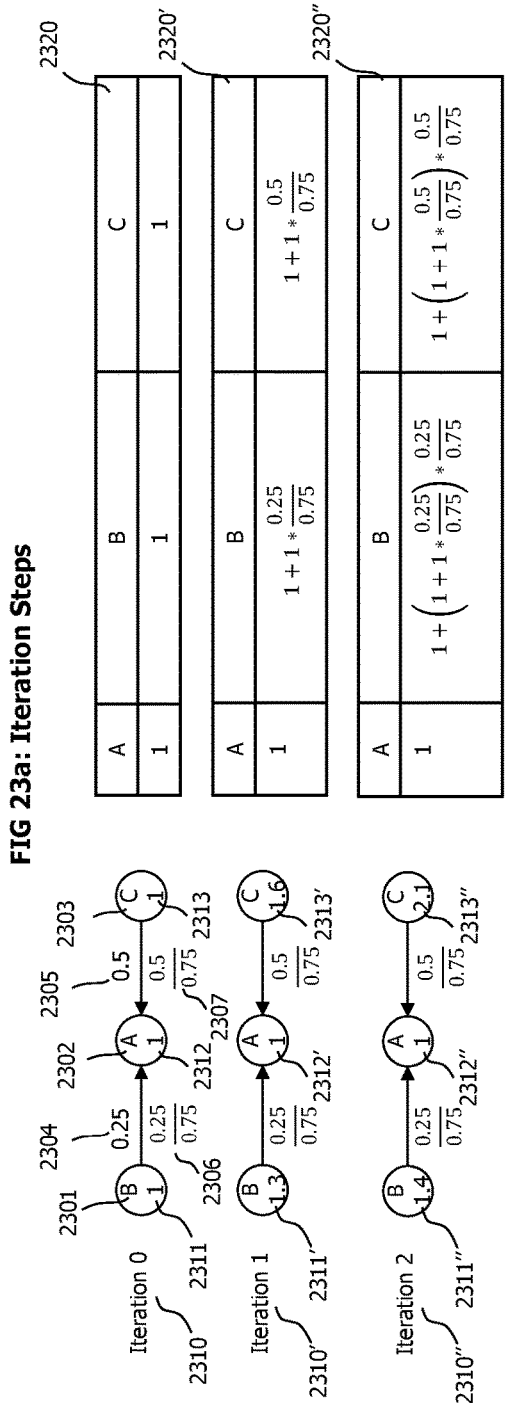

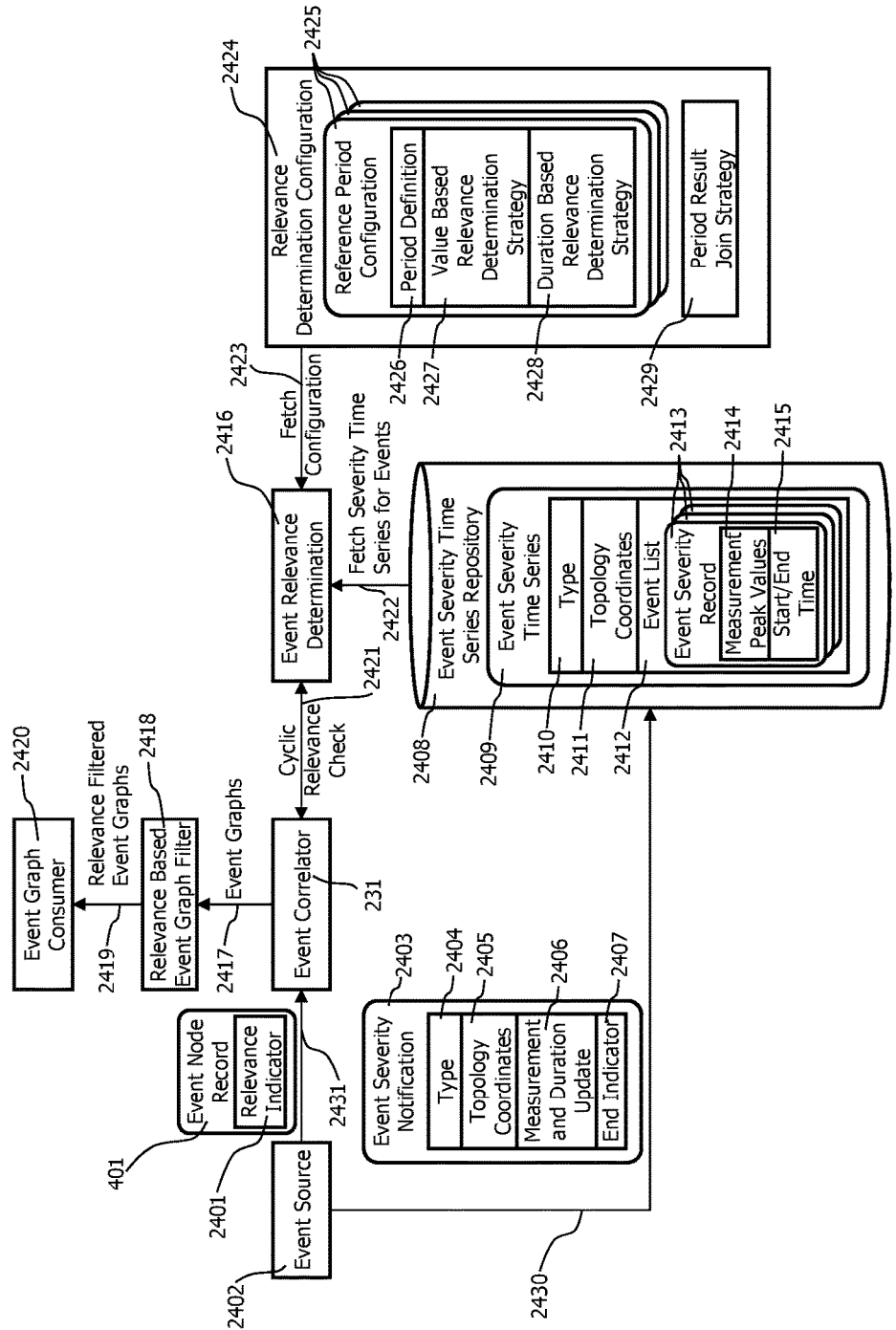
FIG 24: Frequent Event Filtering Overview

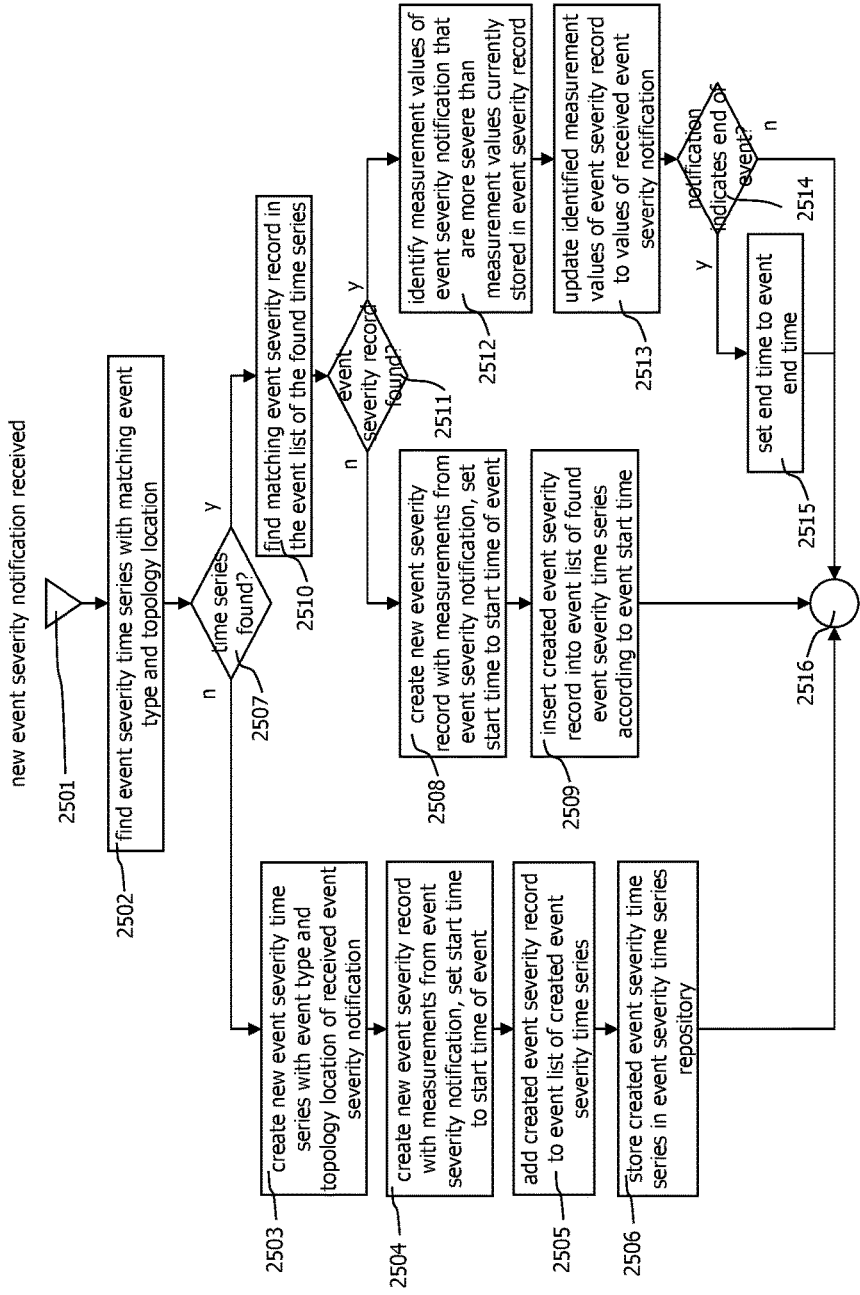

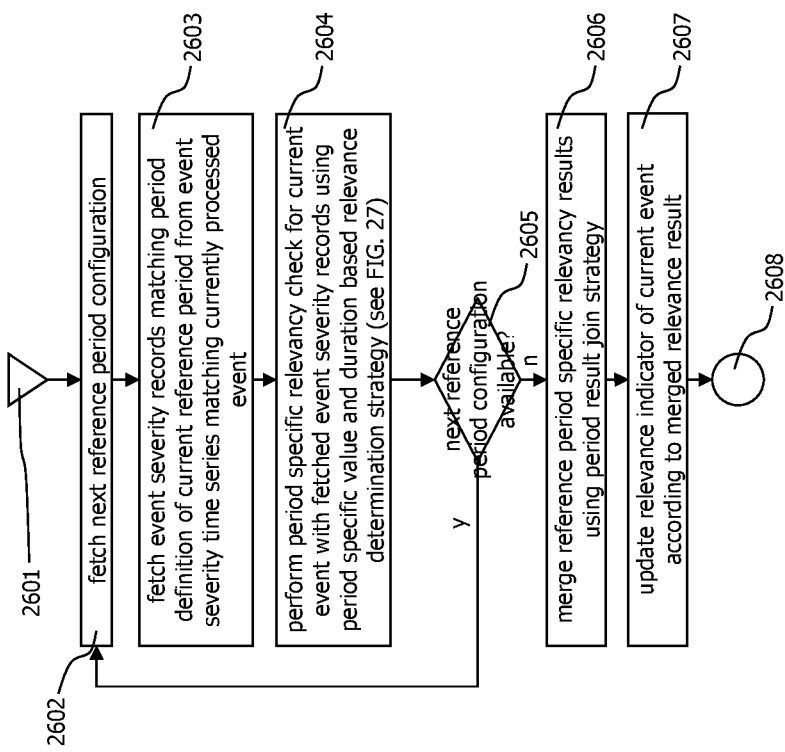

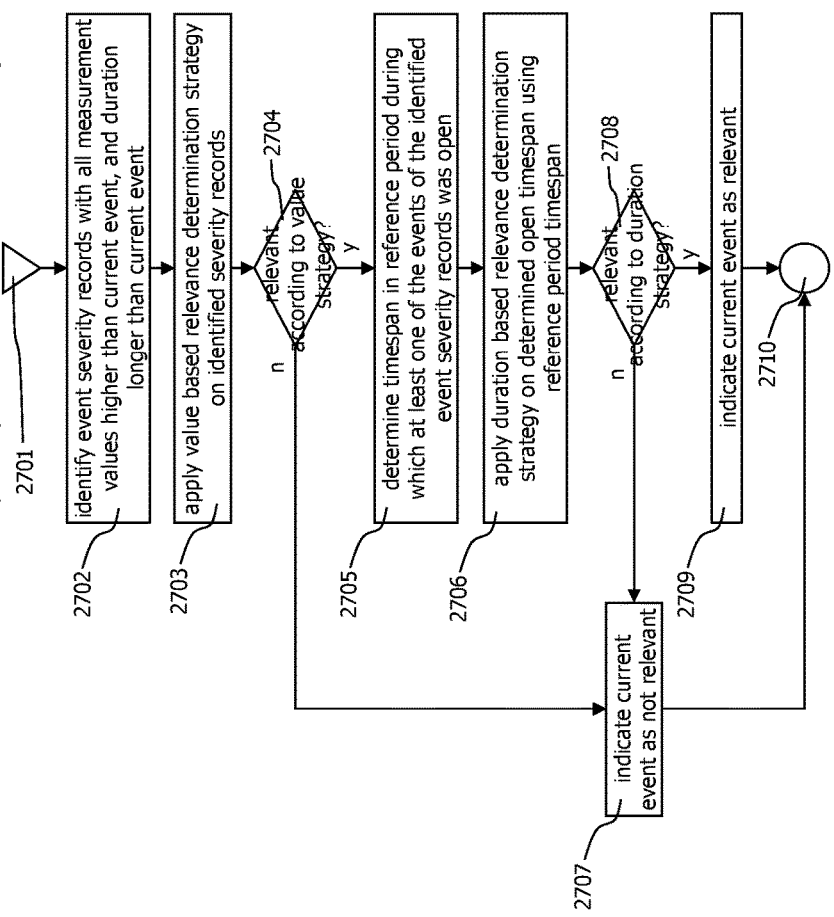
FIG 27: Reference Period Specific Event Relevance Check

FIG 28: Visual Determination of Event Relevance Status
FIG 28a: Measurement Value Based Relevance Status Determination
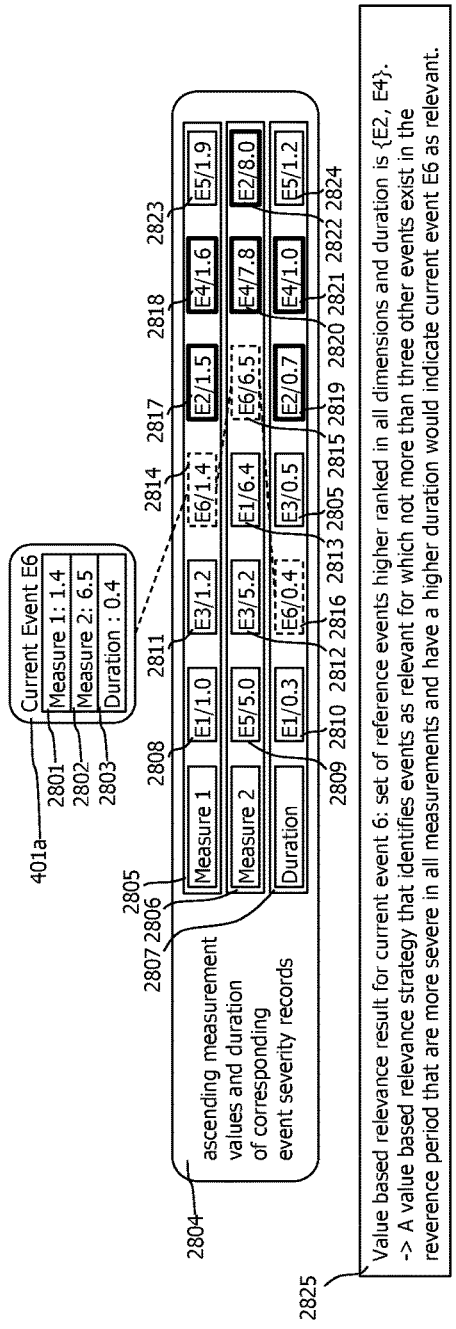
FIG 28b: Event Duration Based Relevance Status Determination
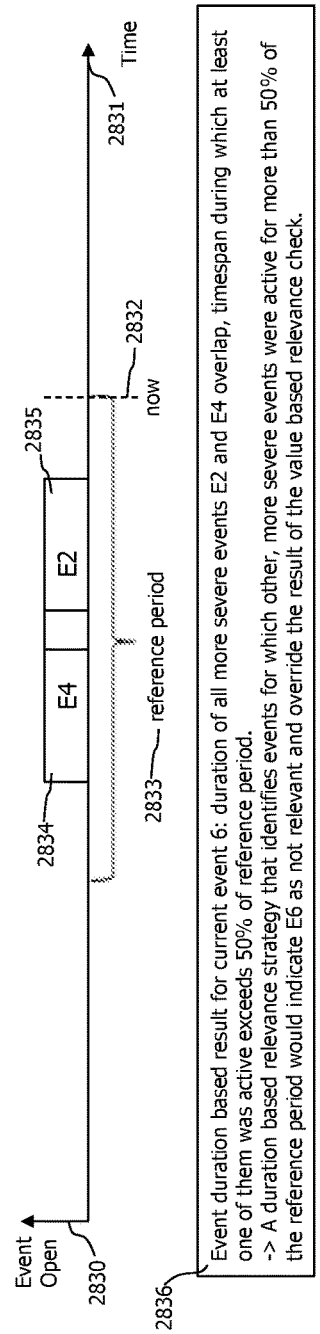

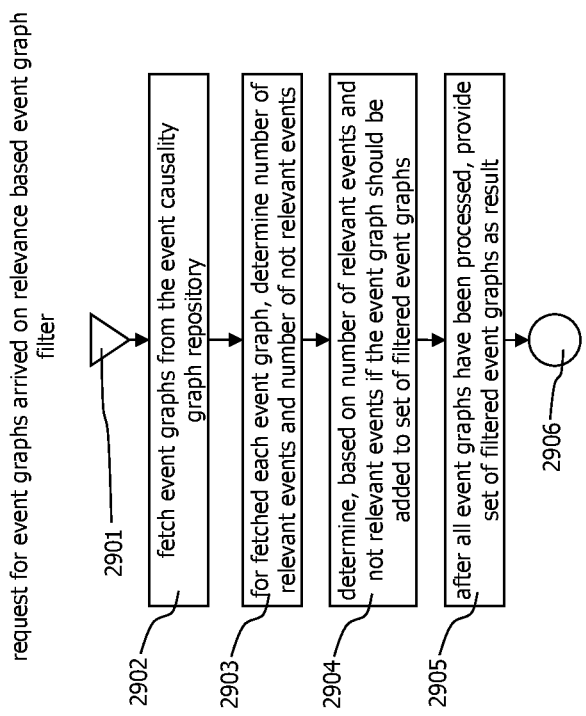
FIG 29: Relevance State Based Filtering of Events Graphs

METHOD AND SYSTEM FOR REAL-TIME CAUSALITY AND ROOT CAUSE DETERMINATION OF TRANSACTION AND INFRASTRUCTURE RELATED EVENTS PROVIDED BY MULTIPLE, HETEROGENEOUS AGENTS

CROSS-REFERENCE TO RELATED APPLICATIONS

This application claims the benefit of U.S. Provisional Application No. 62/218,128, filed on Sep. 14, 2015 and U.S. Provisional Application No. 62/301,116 filed on Feb. 29, 2016. The entire disclosures of each of the above applications are incorporated herein by reference.

FIELD

The invention generally relates to the field of automated causality detection and more specific to detection of causality relations and root cause candidates for performance and resource utilization related events reported by transaction tracing and infrastructure monitoring agents.

BACKGROUND

The importance of application performance monitoring has constantly increased over time, as even short and minor performance degradations or application outages can cause substantial losses of revenue for organizations operating those applications. Service oriented application architectures that build complex applications by a network of loosely connected, interacting services provide great flexibility to application developers. In addition, virtualization technologies provide more flexibility, load adaptive assignment of hardware resources to applications. As those techniques increase flexibility and scalability of the applications which enables more agile reaction of application developers and operators to changed requirements, this also increases the complexity of application architectures and application execution environments.

Monitoring systems exist that provide data describing application performance in form of e.g. transaction trace data or service response times or hardware resource utilization in form of e.g. CPU or memory usage of concrete or virtual hardware. Some of those monitoring systems also provide monitoring data describing the resource utilization of virtualization infrastructure like hypervisors that may be used to manage and execute multiple virtual computer systems. Although those monitoring systems provide valuable data allowing to identify undesired or abnormal operating conditions of individual software or hardware entities involved in the execution of an application, they lack the ability to determine the impact that the detected abnormal conditions may have on other components of the application or on the overall performance of the application. Components required to perform the functionality of an application typically depend on each other and an abnormal operating condition of one of those component most likely causes abnormal operating conditions in one or more of the component that directly or indirectly depend on it. Knowing those dependencies on which causes for detected abnormal operating conditions may travel can greatly improve the efficiency of countermeasures to repair those abnormal operating conditions. However, those dependencies are e.g. caused by communicating software services and components or by shared virtualization infrastructure. Documentation describing those dependencies is often not available, or manually analyzing this dependency documentation is too time consuming for the fast decisions required to identify appropriate countermeasures.

Consequently, an integrated system and method is required that identifies and monitors software and hardware components involved in the execution of a monitored application, that detects dependencies between those components and that uses the gathered structural, performance and resource utilization related data to identify abnormal operating conditions of components and to identify causal relationships between different identified abnormal operating conditions. In case multiple, causally depending abnormal operating conditions are detected, the system may further determine one or more detected conditions being the root cause for the other causally depending conditions.

This section provides background information related to the present disclosure which is not necessarily prior art.

SUMMARY

This section provides a general summary of the disclosure, and is not a comprehensive disclosure of its full scope or all of its features.

The present technology may automatically detect causal relationships between events describing different types of abnormal operation condition of monitored application components. A set of heterogeneous agents monitoring software, hardware and virtualization related operating conditions of monitored application components like services, processes, virtualized and concrete computer systems and virtualization infrastructure components. In addition, those agents also identify and monitor topology data in form of communication and structural dependencies of those components, like services calling other services, processes communicating with other processes over a computer network, processes providing services, computer systems running processes or virtualization infrastructure providing virtualized computer systems.

The topology data provided by the heterogeneous agents is integrated into topology a model of the monitored application describing communication related and structural dependencies between monitored application components. The monitoring and measurement data provided by the agents contains topology coordinate data that allows to identify the corresponding topology component within the topology model.

Events describing the transition from normal to abnormal behavior are extracted from continuous measurement data either by monitoring static thresholds or by using statistical methods that compare historic measurement data with current measurement data to detect deviations from normality.

The generated events consist in a temporal extent, a type and a topology location which is used by a causality estimator, together with data from the topology model and a set of heuristic rules to calculate estimated causality factors between pairs of events. The estimated causality factors are proportional to the probability that one event of the event pair is cause of the other.

The causality estimator incrementally creates networks of causally related events, by grouping those events with causality factors exceeding a certain threshold into separate event causality networks. Those event causality networks may also be referred to as identified problems.

Some embodiments may in addition analyze those event causality networks by determining the global causal impact each event in the network has on each other event in the network to identify root-cause candidate events that most probably directly or indirectly caused all other events in the identified problem.

Yet other embodiments may in addition to performance and resource utilization measurements also monitor the load of the monitored system, in terms of e.g. transaction requests or network communication requests per time interval. Events describing unexpected load changes may be extracted from those measurements as described before. Causality estimations may be performed for different load change events by in addition considering normal load situation prior the load change events to improve causality estimation for those kinds of events.

Still other embodiments may store temporal snapshots of event causality networks that allow a post mortem visualization of the evolution of the problem identified by an event causality network.

Yet other embodiments may evaluate properties of events from a historic reference time period, like peak measurement values or the duration of those reference events do determine if currently ongoing events describe an unexpected operating condition of the monitored environment. Currently ongoing events for which is determined that they do not describe an unexpected operating condition may be suppressed by event based visualization or processing tasks. Suppressing such events helps to reduce unnecessary notifications generated by the monitoring system.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 provides a conceptual overview of exemplary transaction executions and corresponding execution infrastructure in conjunction with performance related transaction and infrastructure events that may have causal relationships.

FIG. 2 shows a block diagram of a monitoring system using a heterogeneous set of agents to acquire transaction monitoring and infrastructure monitoring and topology data. The monitoring and topology data is received by a monitoring server and processed by an event correlator to estimated causal relationships and potential root cause events.

FIG. 3 provides a more detailed block diagram of a causality estimator that receives pairs of events and uses various data describing the events and their context to calculate a causality factor describing the probability that one of the events in the received event pair caused the other.

FIGS. 4A-C depict data records that may be used to describe event causality relationship graphs.

FIGS. 5A-C show examples of event context data in form of hierarchical classification coordinates to describe how classification coordinate may be used to support or exclude potential causal relations.

FIG. 6 shows an exemplary event graph of transaction and infrastructure related events that shows detected causal relationships. The nodes of the graph describe the events and the edges of the graph indicate causal relationships and also describe the infrastructure entities involved into the causality propagation.

FIGS. 7A-C depict flow charts describing the processing of performance and topology data received from agents to create event and event context data that is used by the event correlator.

FIG. 8 shows a flow chart that conceptually describes the processing of a newly arrived event by the event correlator to identify causal relationships between the new event and existing events.

FIGS. 9A-D visually describes exemplary causality estimation methods based on event and event context data. Results of multiple estimation methods may be combined into a combined causality estimation.

FIG. 10 provides a flow chart that conceptually describes the calculation and combination of different causality factors of two events.

FIG. 11 shows a flow chart of the process that calculates the causality factor between two infrastructure events.

FIG. 12 shows a process that evaluates transaction hierarchal classification coordinates to e.g. identify event pairs where a causal relationship is impossible.

FIG. 13 provides a flow chart of a process that evaluates the transaction traces corresponding to events to determine a causality factor.

FIGS. 14A-B show a flow chart that conceptually describes the processes to calculating causality factors between events of an event pair containing a network event.

FIGS. 15A-B visually and in form of flow charts describes the conversion of non-transaction service events into corresponding service events as preparation for causality calculation with transaction or service events.

FIG. 16 conceptually describes the process of identifying potential root-cause events out of a network of causal related events.

FIG. 17 shows the process that prepares combined event and corresponding topology data for the visualization of the temporal evolution of a problem consisting in a network of causality related events.

FIG. 18 provides exemplary visualization forms of combined event and topology data involved in a detected problem.

FIG. 19 shows a tabular representation of heuristic based impact factors that events of a specific type on a specific type of topology entity may have on another event of a specific type on another specific type of topology entity.

FIG. 20 depicts the process that calculates the causality between events indicating unexpected activity changes, like increased or decreased transaction or service load or changed amount of network activity. The process considers the previous period with unchanged activity to estimate the extent of causality between the candidate events.

FIG. 21 depicts an alternative method to calculate event timing based causality factors.

FIGS. 22A-B depict an optimization of event graphs to improve the accuracy of the root cause estimation based on a variant of the page rank algorithm.

FIGS. 23A-B depict an example iterative centrality calculation procedure that may be used to calculate a cumulative causality impact weight for nodes in an event graph.

FIG. 24 shows an overview of a monitoring system using an event correlator in conjunction with other components that determine if currently ongoing events describe exceptional operating conditions of the monitored system.

FIG. 25 describes the process of maintaining event severity time series. Event severity time series provide the temporal sequence of events of a specific type that occurred on specific a topological entity of the monitored system.

FIG. 26 shows a flowchart of a process that cyclically checks for open events if similar, more severe events exist in one or more reference periods.

FIG. 27 describes the process of determining the existence of similar, more severe events for a currently open event within one reference period.

FIGS. 28A-B visually describes the process that determines for a currently open event, the number of similar events during a reference period and the cumulative open time of those similar events during the reference period. Both determination results are used to further determine if the current event describes an exceptional operating conditions of the monitored system.

FIG. 29 shows a flow chart of an exemplary process that uses the distinction between events that describe an exceptional operating conditions and other events for the filtering of event graphs.

Corresponding reference numerals indicate corresponding parts throughout the several views of the drawings.

DETAILED DESCRIPTION

Example embodiments will now be described more fully with reference to the accompanying drawings.

The present technology integrates monitoring data retrieved form heterogeneous sets of agents, deployed to computer systems, virtualization infrastructure and processes involved in the execution of monitored applications. The monitoring data contains hierarchical and communication related topology data, resource utilization data and transaction execution performance data. Retrieved topology data is accumulated to create an integrated topological model of the monitored application containing transaction execution related service call relationships, process related communication activities and hierarchical process and operating system structural aspects of the monitored application.

Continuously received resource utilization and performance monitoring data is analyzed to detect unexpected changes like an abnormal increased average transaction response time, an abnormal change of a parameter describing the statistic distribution of transaction response times like a specific quantile, abnormal change of transaction load, abnormal increase of a transaction execution error rate, increased CPU or memory resource usage. The detected changes are modelled as discrete events, described by an event type, a topological location, and a probability function describing the probability that for a given timestamp t, the event was active at the given timestamp t.

A causality estimation module receives the generated events and evaluates their type, topology location and timing data by considering the topological model of the monitored application to identify probable causal relationships between events.

Referring now to FIG. 1 which conceptually shows an overview of components of a monitored application, executed by a set of processes that provide services required to execute user requested transactions, the processes are executed by operating systems running on concrete or virtualized computer systems. It provides a state snapshot of the monitored application showing a set of events that occurred on some of the monitored application components and presents some exemplary questions that could be answered by the applying the present technology.

A first set of web browsers 119 interacts 121 with the monitored application by using service S1 122. S1 122 is provided by a process or a set of equivalent processes grouped in process group PG1 123. To fulfill the requested services, S1 calls service S2 128 provided by process group PG 2 131. Both PG1 and PG2 are executed by operating system OS1 124 that runs on virtualized hardware provided by hypervisor HV 125. To fulfill its service requests, S2 in turn calls S3 112 provided by another process group PG3 114 running on separate operating system OS2 115. Process group PG4 116 is also running on OS2 but it provides no services used by monitored transactions. Both OS1 and OS2 run on virtualized hardware provided by hypervisor HV 125.

A second set of web browsers 101 interacts 103 with the monitored application using service S5 104 that is provided by processes grouped in process group PG5 107 running on operating system OS3 109. Process group PG6 108 is also running on operating system OS3. To fulfill its service requests, S5 calls 105 the service S3.

The situation depicted in FIG. 1 shows a set of events describing unexpected resource utilization and performance related conditions. Resource utilization problem R1 117 started on process group PG4 at time 1, and resource utilization problem R2 situated on operating system OS2 started at later time 2. Performance problem P3 occurred on S3 at time 3 and afterwards P4 130 occurred on S2 at time 4 and P5 127 occurred on S1 at time 5. Afterwards, problem P6 120 occurred at the set of browsers 119 interacting with the application via service S1.

The service call dependencies described in the topology model is indicating that S1 calls S2 which in turn calls S3 and the process group/operating system structural topology data indicating that PG3 provides S3 and that PG3 and PG4 run on the same operating system OS2. Topological data shows either transaction communication related or structural connections between P6 120 and R1 117 and e.g. allows causal relationships between R1 and P6.

However, deeper analysis of the timing of the events in the causality chain and their type and the strength of their connection need to be analyzed to judge the plausibility and probability of such a causal connection. As an example, the response time of S1 may be composed mainly of local processing components and other service calls and only to a small extend depend on the response time of S2, which would reduce the plausibility of a causal relationship between S1 and S2. Further, the type of resource utilization problem may show a small probability to cause a performance problem. As an example, R1 and R2 may indicate higher than expected disc usage of a hard disc managed by OS2, which has a low propagation probability to a performance issue reported for a service provided by another process group on the same operating system.

All those event type, transaction and timing aspects of involved events may be analyzed by an automated causality estimation system to determine causality chains and to answer the question 132 for the root cause of P6.

Monitoring the browser set 2 101 reveals performance problem P5 102 at time 5. At an earlier time 4, performance problem P4 106 was detected at S5 which is used by the browsers 101. S5 calls S3, which opens a possible transaction call related causality path between P3 and P4 106 on S5. Further R3 110 occurred on PG6 and R4 111 occurred on OS3 106 running both PG6 and PG5 107 providing service S5. This creates a structural causality path between P4 106 on S5 and R3 110 on PG6. According to topological data, both R3 110 on PG6 and P3 113 on S3 (and in turn R1 117 on PG4) are in possible parallel parts of a causality path ending with P5 102 on browser stet 2.

Detailed analysis of data related to and describing the events contained in the potential causality chain allows to answer the question 133 for the impact R3 110 on PG6 and P3 113 on S3 has on P5 102 on browser set 101.

A block diagram of a monitoring and causality estimating system that may receive and process monitoring and topology data as described before to detect events indicating unexpected changes and to estimate causal relationships between those events is shown in FIG. 2.

Transaction agents 203 are deployed to transaction processes 202 that are involved in the execution of monitored transactions. The transaction agents 203 instrument the transaction process in a way that allows to monitor and trace the execution of individual transactions over thread, process and operating system boundaries. Examples of transaction processes are Oracle Java® or Microsoft .NET® processes providing e.g. HTTP or remote method call services to receive external requests. Those transaction processes typical perform server or backend side processing of requested transactions. Instrumentation of the processes and tracing of transactions executed by those transaction processes may be performed according to the teachings of U.S. Pat. No. 8,234,631 "Methods and System for tracing transactions throughout distributed heterogeneous applications without source code modifications" which is included herein by reference in its entirety. Transaction agents 203 may also be deployed to web content created by the monitored application that is shown by a web browser, the content may be instrumented in a way that allows to detect web browser side activity and to determine server-side or backend processing caused by individual browser side activities. Browser side monitoring may be performed according to the teachings of U.S. patent application Ser. No. 13/722,026 "Method and System for Tracing End-to-End Transactions, including Browser Side Processing and Capturing of End User Performance Experience" which is included herein by reference in its entirety. The transaction trace data 204 created by the transaction agents deployed to web browser and server/backend processes describe individual transaction execution from browser side to various stages of nested server/backend side processing.

The transaction agents 203 are connected with a monitoring server 229 via a computer network 210 and send transaction trace data combined with infrastructure coordinate data that allows to identify the infrastructure components that executed parts of monitored transactions to the monitoring server 229.

Transaction processes 202 are executed by process infrastructure 201 in form of operating systems running on concrete or virtualized hardware. In addition to transaction processes, the operating systems may also execute other processes that are not directly involved into the execution of monitored transactions and to which no transaction agent is deployed.

Infrastructure agents 206 are deployed to monitor 205 process infrastructure components, including operating systems, processes executed by operating systems and virtualization components like hypervisors or virtualization managers. The infrastructure agents may either be implemented as a process running on a specific operating system and monitoring the state of the operating system it is running on and the state of all processes executed by the operating system, or in form of a query process running external to monitored operating system or virtualization components and query measurement data via externally available monitoring interfaces. Variants of infrastructure agents may also be injected into application processes to e.g. provide monitoring data that is only accessible inside the application processes.

All variants of infrastructure agents provide measurement data describing various resource utilization states of monitored infrastructure elements together with topology coordinate data. The topology coordinate data identifies the topology element within the topological model 220 that corresponds to the process infrastructure component monitored by the infrastructure agent.

The integration of topology data provided by various types of infrastructure agents and by transaction agents into an integrated topology model is performed according to the teachings of U.S. patent application Ser. No. 14/879,183 "Method and System for Real-time Modeling of Communication, Virtualization and Transaction Execution related Topological Aspects of Monitored Software Applications and Hardware Entities" by Greifeneder et. al which is included herein by reference in its entirety.

An infrastructure agent 206 consists in an infrastructure measure extractor 207, which cyclically retrieves measurement data describing the resource utilization of the infrastructure entities it is monitoring. Such measurements may include the CPU or memory usage of operating systems, processes executed by an operating system or virtualization components like hypervisors. In addition, measurements describing network communication between processes executed on different host computer systems or utilization of network bandwidth by processes or operating systems or the utilization of disc space of hard discs managed by an operating systems or other measurements describing the usage of a limited resource by a process, operating system or virtualization component may be monitored and extracted by the infrastructure measure extractor. The extracted measurement data may together with topology coordinate data that allows to identify the corresponding topology component described by the measurement data, be forwarded 208 to an infrastructure event generator 209 which analyzes the measurement data to identify unexpected levels of resource consumptions. On detection of such unexpected resource consumptions, the infrastructure event generator generates infrastructure events describing the type and time of the resource consumption change and the topology entity on which the event occurred. The infrastructure events 217 generated by the infrastructure event generator 209 are sent to a monitoring server 229 via the connecting computer network 218.

In some variant embodiments, the generation of infrastructure events out of infrastructure measurements may be performed by a centralized infrastructure event generator operating at the monitoring server. In this case, the infrastructure agent may send infrastructure measurement data to the monitoring server instead of infrastructure events.

The infrastructure event generator 209 may in addition to events generated out of measurements provided by the infrastructure measure extractor 207 also generate events describing state changes of the monitored infrastructure that are not related to measurements provided by the infrastructure measure extractor 207. As an example, an infrastructure agent monitoring an operating system may e.g. detect if a process executed by the monitored operating system terminated unexpectedly. This may e.g. be performed by monitoring the exit status or return code generated on termination of a process and generating an event if the return code indicates an abnormal termination of the process. An infrastructure agent 206 monitoring a specific process may be configured to detect abnormal operating conditions of the monitored process, like exhaustion of specific execution resources and may create event indication those conditions. As an example, such an infrastructure agent may detect exhaustion of memory available to the process or exhaustion of available execution threads.

An infrastructure agent monitoring an operating system may cyclically send heartbeat messages to a monitoring server indicating that agent and monitored operating system are still alive. The monitoring server may, on absence of those heartbeat messages over a specific period of time, create an event indicating that the monitored operating system is unavailable or no longer visible to the monitoring system.

Processing of those non-measurement related infrastructure events by the event correlator 231 is similar or equal to the processing of measurement related infrastructure events.

In addition to infrastructure events, infrastructure agents may send 216 infrastructure topology data to the monitoring server 229, which integrates the infrastructure topology data received from various infrastructure agents with service topology data extracted from end-to-end transaction trace data generated from trace data received by transaction agents, into an integrated topology model 220. Sending of infrastructure topology data by infrastructure agents, extraction of service related topology data and integration of various different types of topology data fragments into an integrated topology model may be performed according to the teachings of U.S. patent application Ser. No. 14/879,183.

The integrated topology model 220 describes process groups combining similar or equivalent processes, like e.g. application server processes of the same type (e.g. IBM WebSphere® or Oracle WebLogic® application servers), services provided by those process groups (e.g. HTTP, FTP, remote method call services provided on a specific port or other services that may be called by a monitored end-to-end transaction), operating system instances, virtualization components like hypervisors or virtualization managers.

In addition, the topology model contains vertical relationship data describing e.g. which services are provided by which process groups, which process groups run on which operating system instance and which virtualization component provides the virtual computer system on which an operating system instance is executed.

Next to the vertical relationship data, the topology model contains horizontal relationship data describing monitored communication between process groups and services. Vertical relationships indicating process group communications may be derived from infrastructure topology data 216 describing corresponding communication endpoints detected by infrastructure agents monitoring operating systems and process groups. For details about used communication endpoint data and detection of corresponding communication end point pairs see U.S. patent application Ser. No. 14/879,183.

Transaction trace data 204 representing the process local view of a monitored transaction received by the monitoring server 229 is processed by a transaction correlator 219 which creates end-to-end transaction trace data describing individual transactions over thread and process boundaries. The created end-to-end transaction trace data is stored in an end-to-end transaction trace repository 212. A service topology extractor 214 analyzes end-to-end transaction traces stored in the transaction repository to extract service topology data 215 out of transaction trace data. The extracted service topology data is inserted into to the integrated topology model. An example end-to-end transaction trace data may describe a transaction started by an external request on a HTTP service on port 80 provided by a process of process group "frontend servers". The transaction trace data may describe process internal request handling and a remote method execution request sent to a process of the process group "backend servers", and the process internal handling of the remote method execution at the backend server. The extracted service topology data describes that process group "frontend servers" provides a HTTP service on port 80, that process group "backend servers" provides a remote method execution service and that this remote method execution service is called by the HTTP service of the process group "frontend servers".

A service event generator 222 analyzes end-to-end transactions stored in the end-to-end transaction repository 212 to identify unexpected changes of performance related service events 223.

The service event generator 222 first groups the end-to-end transactions according to data attached to the transaction traces that describes the execution context of the transactions, like e.g. type and version of the web browser used to trigger the transaction and of the operating system running the web browser, or the geolocation of the web browser. The transaction grouping performed by the service event generator may be performed according to the teachings of U.S. patent application Ser. No. 15/227,029 "Method and System for Real-Time, Load-Driven, Multidimensional and Hierarchical Classification of Monitored Transaction Executions for Visualization and Analysis Tasks like Statistical Anomaly Detection" by Greifeneder et. al which is included herein by reference in its entirety. The resulting transaction groups or transaction categories represent sets of transactions sharing the same execution context parameter. Those transaction categories may specify context parameters at different hierarchical levels of granularity.

An exemplary transaction category may contain transactions executed by Firefox browsers version 35, on a Microsoft Windows® operating system running on a computer system situated in Austria. Another exemplary transaction category may have the same browser and operating system restrictions, but contain transaction with an origin within Europe, as the hierarchy level of the geolocation dimension of this transaction category is higher.

To define those transaction categories, a set of historic transactions is analyzed. After the transaction categories are defined, the service event generator analyzes the historic transactions contained in each category, identifies the services used by those historic transactions, measurement data describing the performance behavior of those services, like e.g. a service response times, from the trace data of those transactions and calculates baseline measurement data representing expected performance behavior of those services for the transactions of the transaction category.

The service event generator 222 further analyzes current transactions, assigns them to the previously detected transaction categories, identifies services used by those current transactions and determines performance measurement data describing the current performance behavior of those services for current transactions of the transaction category.

The service event generator compares for each service, transaction category specific current performance measurement data with corresponding baseline performance measurement data and creates service events 223 in case a significant deviation is detected.

The service events 223 describe time and type of the event, the corresponding transaction category and the topology coordinates of the service on which the event occurred.

Service events 223 and infrastructure events 217 are forwarded to the causality estimator 227 of the event correlator 231, which uses data describing the events, and additional data like the fraction of the topological model related 225 to an event, or the transaction trace data 224 considered for the decision to raise an event to estimate a causality factor between newly received events and already existing events. In case a new event arrives at the causality estimator 227, the causality estimator sequentially fetches each event existing in an event graph 230 of the event causality repository 232 as pairing candidate event and calculates an estimated causality factor between the new event and the pairing candidate event. An event graph 230 represents a group of events that have a plausible causal relationship in a way that each event in the event graph is reachable by each other event in the event graph via causal relationships, not considering the direction of the causal relationships. I.e. an event graph 230 forms a weakly connected graph of events connected by causal relationships.

In case the calculated causality factor exceeds a certain threshold, indicating that a causal relationship between the new event and the pairing candidate event is plausible, a causal link between the new event and the pairing candidate event is established. Causal links may be established between the new received events and multiple pairing candidate events. If causal links are established between the new event and pairing events from different event graphs, those event graphs are connected by the new event and form one combined event graph. The newly received event is added to the event causality graph repository.

On event graph updates 234, like e.g. adding a new event to an event graph 230 or combination of separated event graphs into one event graph by a new connecting event, the root cause estimator 235 is notified about the event graph update and recalculates 233 the estimated root cause events of the updated event graph 230.

A block diagram showing the internal components of a causality estimator 227 is shown in FIG. 3. An event type based causality method selector 307 receives a new event 308 and a pairing candidate event 226 from the event causality graph repository 232. Both new event and candidate event may either be a service event 223 or an infrastructure event 217. The causality method selector 307 analyzes the type of both events and selects the appropriate causality evaluator method. The evaluator selection of the event type based causality method selector 307 may always include the event timing evaluator 301, regardless of the type of the two events.

The event timing evaluator 301 evaluates the start timing data of both events to extract evidence of the probability of a causal relationship between the two events based. The event timing evaluator 301 calculates a first partial causality factor assuming that one event is the cause of the other event by calculating a probability that both events were active during the startup time of the effect event, and a second causality factor with swapped cause/effect assumption.

A visual description of the processing performed by the event time evaluator 301 can be seen in FIG. 9a.

It is noteworthy that all causality evaluators like the event timing evaluator 301, the transaction classification coordinate evaluator 302, the transaction horizontal topology evaluator 304, the infrastructure vertical topology evaluator 305 and the infrastructure horizontal topology evaluator 306 calculate a partial causality factor for both potential impact directions.

As an example, if both events are infrastructure events describing an unexpected resource consumption of an infrastructure component, like high CPU or memory usage, the infrastructure vertical topology evaluator 225 which evaluates vertical topological connections between the components of the events may be selected. The infrastructure vertical topology evaluator accesses the topology model 220 to retrieve the parts of the topology model that are relevant for the events. The relevant topology model for an infrastructure event consists in the vertical topology component stack of the component on which the event occurred. Those are all components that are reachable from the component on which the event occurred by following vertical topological relationships. As an example, for an operating system, the vertical topology stack consists in all process groups running on the operating system, all services provided by those process groups and, if applicable, the hypervisor providing the virtualized hardware on which the operating system is running. For a process group, the vertical topology stack consists of all services provided by the process group, the operating system executing the process group and in case the operating system runs on virtualized hardware, the hypervisor providing this hardware.

In addition to the event related topology model 225, the infrastructure vertical topology evaluator also accesses a knowledge base 224 describing heuristic based causality factors between events of specific types that occurred on topology components of specific types. As an example, the knowledge base may determine based on component entity type of potential cause and effect event and on component entity type of the next shared entity an impact factor that describes the probability that the cause event has an impact on the effect event. As an example a potential cause event may occur on an operating system executed on virtualized hardware provided by a hypervisor, and a potential effect event may occur on a process group executed in another operating system on other virtualization hardware provided by the same hypervisor. For this constellation, the knowledge base may provide the low impact probability of 0.1. For an exemplary tabular representation of such a knowledge base see FIG. 19. The processing performed by the infrastructure vertical topology evaluator 305 is described in detail in FIG. 11.

In case both events describe unexpected network connection usage conditions of topology entities like process groups, the causality method selector may select the infrastructure horizontal topology evaluator 306. The infrastructure horizontal topology evaluator 306 may access the event related topology model 225, showing the communication links between the topology entities related to the events to determine if a causal relationship is possible. A causal relationship is only possible if there is a direct communication link between both topology entities. In case topology data permits a causal relationship, the infrastructure horizontal topology evaluator 306 may fetch the event related infrastructure communication data 311 which consists of measurement data describing the infrastructure communication activities performed by both topology entities 311 during the time period in which the events appeared. The amount of communication activities between the topology entities may be related to the communication activities of the event related entities with other topology entities to calculate a causality factor. A detailed description of the processing performed by the infrastructure horizontal topology evaluator 306 can be found in FIG. 14.

When both events are service related, the event type based causality method selector 307 may select the transaction classification coordinate evaluator 302 and the transaction horizontal topology evaluator 304 for the calculation of the causality evaluator.

The transaction classification coordinate evaluator 302 analyzes the transaction classification coordinates of both service events to determine if the transaction corresponding to both service events are mutually exclusive. This is the case if the transaction classifications of both events allow no transaction that is involved in both events. An example for such a situation is a first service event with a geolocation "North America" and a second service event with a geolocation "Germany". No transaction can exist that bot originated in North America and in Germany. Consequently, no causal relationship between both is possible. In such cases, the transaction classification coordinate evaluator 302 would create a causality factor indicating that no causal relationship is possible. In other cases, where the transaction classification coordinates allow transactions involved in both service events, a causality factor is created that does not influence other causality factor calculations. The transaction classification coordinate evaluator accesses a classification hierarchy database 312 to determine if transaction classifications of two candidate events allow transactions involved in both transactions. The classification hierarchies database 312 describes the hierarchic structure of classification dimensions like geolocation, browser type or operating system type, and contains e.g. information describing that "Austria" and "Germany" are distinctive geographic locations which both belong to the geographic location "Europe", or that Linux and Microsoft Windows® belong to the group of desktop operating systems and iOS® and Android® belong to the group of mobile operating systems.

The transaction horizontal topology evaluator 304 analyzes the received service events to determine the start period and the transaction classification parameters of both events to identify and fetch those transaction traces from the transaction repository 212 that are relevant for the events 224. Those are the transaction traces matching the classification parameters of at least one of the service events and that were executed during the start period of one of the service events. The transaction horizontal topology evaluator analyzes the fetched transaction trace data to relate the transactions using both services identified by the service events to the transactions using only one of those services. The ratio between transactions using both services to transactions using only one is an indicator of the probability of a causal relationship. Details about the processing performed by the transaction classification coordinate evaluator can be found in FIGS. 9c, 9d, and 13.

In case the type of new event 308 and pairing candidate event 226 differ, the event type based method causality selector may convert an event into an equivalent virtual event that matches the other event. As an example, in case one event is a service event and the other event is an infrastructure event, the infrastructure event may be converted into corresponding service events on services depending on the entity on which the infrastructure event happened. As an example, an infrastructure event on a process group may be transferred into corresponding virtual service events on all services provided by the process group. As the event was not really observed on the services provided by the process group, the weight of those virtual events must be reduced for causality calculations. More details about the converting of events of specific types into corresponding equivalent virtual events and how to adjust the weight of such virtual events for causality determination can be found in FIG. 15.

The causality factor combiner 303 combines the partial causality factors 310 created by the various evaluators 301, 302, 304, 305 and 306 into a combined causality factor 228 representing the probability of a causal relationship between the new event 308 and the pairing candidate event considering all applicable transactional, topological and timing related aspects. The partial causality factors 310 provided by different evaluators may be normalized to the range from 0 to 1 and the causality factor combiner may combine them by multiplication. For multiple partial causality factors describing the same causality related aspect, and that are describing multiple parallel ways on which causal effects may travel, the combiner selects the maximum factor before multiplying it with other factors. As an example, causality estimation for a service event and multiple virtual service events derived from an infrastructure event may reveal multiple causal paths with different causality factors, as the transactions corresponding to the service event may use multiple services corresponding to the virtual service events.

Data records that may be used to model events and their causal relationships as part of an event graph 230 in an event causality graph repository are shown in FIG. 4. An event node record 401 as shown in FIG. 4a may be used to describe events created by the infrastructure event generator 209 or the service event generator 222. An event node record 401 may contain but is not limited to a type field 402 that describes the type of the described event, example event types are unexpected service slowdown, unexpected increase of service failure rate, unexpected high/low service load, high CPU, high memory usage, high network bandwidth usage, high network failure rate etc., a topology type describing the type of the topology entity on which the event occurred, like a service, process group, operating system or hypervisor, topology coordinates 404 uniquely identifying the topology entity on which the even occurred, like a specific service, process group, operating system or hypervisor, transaction classification coordinates 405 which are only set for service events and describe the classification parameters of the transactions involved in the creation of the service event, a start time range 406 containing the timestamp of the last observation showing the event as inactive and the timestamp of the first observation showing the event as active and an end time range 407 containing the timestamp of the last observation showing the event as active and the timestamp of the first observation showing the event as inactive. The time start time range 406 may also be referred to as raise time and the end time range 407 may also be referred to as fall time. The data stored in start time range 406 and in the end time range 407 may be used to determine a probability function describing the probability that the event was active during the time period of activation and deactivation of the event.

An event causality edge record 410 as shown in FIG. 4b may be used to describe the causal relationship between two events described by event node records 401. An event causality edge record 410 may contain but is not limited to a cause event reference 411 that uniquely identify an event that describes the cause part of the described causal relationship, an effect event reference 412 that uniquely identifies an event that is according to the event causality edge record caused by the event identified by the cause event reference, a causality factor 413 determining the weight of the causal effect between the cause end the effect event, and an entity graph 414 describing the list of topology entities over which a causal effect travels from the cause event to the effect event. The causal factor 413 is calculated by the causality estimator considering various topological, transactional and timing related aspects of cause and effect event.

FIG. 4c shows an event graph record 420 that may be used to represent and store an event graph 230. An event graph record 420 may contain but is not limited to a list of event node records 421 containing the event node records 401 forming the event graph and a list of event causality edge records 422 containing the event causality edge records 410 that connect event node records of the event graph 230 described by the event graph record. On processing of incoming events to determine causal relationships between the incoming event and existing events, the causality estimator 227 may update a graph records in case a causal relationship of the incoming event record with an event record of an existing graph record is detected, it may create a new graph record containing only the incoming event record if no causal relationships with other events are detected or it may merge two or more existing graph records in case causal relationships of the incoming event record reveal a connection between those existing graph records.

The event node records 401 and the event causality edge records 410 of an event graph record 420 describing an event graph 230 form a graph that at least meets the requirements of a weakly connected graph.

Exemplary classification coordinate pairs that e.g. describe the transaction classifications of transactions corresponding to service events are displayed in FIG. 5. The exemplary coordinates contain the dimensions geolocation 501, browser 502 and operating system (OS) 503. This is only an exemplary set of coordinated dimensions. Embodiments of the disclosed system and method may contain additional or completely different coordinate dimensions.

A disjoint coordinate pair allowing no transactions matching both coordinates of the pair is shown in FIG. 5a. The classification coordinates A 504 and B 508 do not specify a browser 506, 510 or operating system type 507, 511. Browser and operating system dimension do not restrict matching transactions and according to those dimensions alone, transactions matching both classification coordinates are possible. The geolocation dimension of coordinate A specifies "North America" 505 and the geolocation dimension of coordinate B specifies "Germany" 509. Those geolocation coordinates are mutual exclusive as no transaction can be originated both in Germany and North America. Consequently, no transaction can be involved in two events having those classification coordinates and thus no transaction related causal relationship between both events is possible.

FIG. 5b shows a coordinate pair in which one classification coordinate represents a subset of the other classification coordinate. Classification coordinate A 523 specifies a geolocation dimension value "Europe" 524, a browser dimension value "Internet Explorer" and an operating system dimension representing indicating any operating system 526. Transactions matching this classification coordinates are triggered from any Internet Explorer browser, on any operating system in any part of Europe. Classification coordinate B 527 specifies a geolocation "Germany" 528, a browser "Internet Explorer 9" 529 and any operating system 530. Classification coordinates A 523 are more generic in the geolocation and browser dimension than classification coordinates B 527 and are equal generic on the operating system dimension. Consequently, any transaction matching classification coordinates B 527 also match classification coordinates A 523, but transactions matching A 523 may not match B 527.

In case the transaction classification coordinate evaluator 302 detects for two events for which causality probability needs to be calculated, that the classification coordinates of one event are completely included into the classification coordinates of the other event, the causality calculation method may be adapted. As an example, it is highly improbable that an event with more generic transaction classification coordinates is the cause for an event with more specific transaction coordinates. As a consequence, the transaction classification coordinate evaluator 302 may on detection of a classification coordinate configuration as exemplary described in FIG. 5b skip the calculation of a causality probability that the event with the more generic coordinates is the cause for the event with the more specific coordinates. Some embodiments of the presented technology may in a situation when the classification coordinates of one pairing candidate event completely include the classification coordinates of the other pairing candidate use different causality factors to determine causal relationships between the events and to determine root cause probabilities for those events. Those embodiments may e.g. use a causality factor indicating that the more generic event caused the more specific event to determine causal events to assure that both events are assigned to the same event graph 230. For the estimation of root cause events, an alternative causality factor between the two events may be used that indicates no causal relationship, to avoid incorrect or biased root cause estimation results caused by the probably incorrect assumption that the event with the more generic transaction classification coordinates caused the event with the more specific transaction classification coordinates.

FIG. 5c shows a situation with a classification coordinate pair A 543 and B 547, where A is more specific than B in the geolocation dimension and B is more specific than A in the browser dimension. For such a classification coordinate pair, the classification coordinate evaluator 302 can neither rule out a causal relationship as it can in situations with mutual exclusive classification coordinates as in FIG. 5a, nor can it reduce the potential direction of causal relationships as possible for situations as described in FIG. 5b. For such classification coordinate pairs, the classification coordinate evaluator 302 may either create a partial causality factor indicating that no evidence to support or oppose a causal relationship can be extracted from transaction classification parameters which has no influence on the calculation of the combined causality factor, or it may create no partial causality factor at all. As an example, assuming partial causality factors having a range from 0 to 1 and a causality factor combiner 303 that multiplies the partial causality factors to get a combined causality factor, a partial causality factor with value 1 may be created by the transaction classification coordinate evaluator 302 as this value has no impact on the calculation of the combined causality factor 228.

An exemplary event causality graph, showing causal relationships between events of the problem scenario described in FIG. 1 is shown in FIG. 6. The event graph shows event node records (102, 106, 110, 111, 113, 117, 118, 120, 127 and 130) representing performance and resource usage related events as described in FIG. 1, and possible and probable causal relationships between those events as detected by a causality estimator that exceed a specific impact level threshold (602, 605, 608, 611, 614, 620, 624 and 626) and are thus modelled in form of event causality edge records, and one possible causal relationship 618 that has an impact level below impact level threshold and which is thus ignored for further calculations. More possible causal relationships that are suppressed due to a low impact factor may exist in this scenario, but they are not shown.

One chain of causal relationships starts with R1 117 detected on PG 4 116 at time 1. A causal relationship 602 is detected between R1 on PG 4 and R2 118 on OS 2 at time 2. The causal relationship 602 has an entity graph 414 describing the chain of topological entities propagating the detected causal effect between R1 117 and R2 118. For causal relationship 602 between R1 117 and R2 118, this chain 603 consists of PG 4 116 and OS 2 115. Another causal relationship 605 is detected between R2 118 and P3 113. For causal relationship 605, the topological entities transporting the modelled causal impact 606 are OS 2 115, PG 3 114 and S 3 112, as the causal impact travels from the operating system over a process group to a service provided by the process group.

Another causal chain starts on R3 110 detected on PG 6 at time 3, which is connected by the detected causal relationship 620 with R4 111 detected on OS 3 at time 4. The causal impact modelled by the relationship 620 travels over a topological entity chain 621 containing PG 6 and OS 3. A causal relationship 624 is detected between R4 111 on OS 3 and P4 106 on S 5 110 is. The causal relationship 624 is propagated from OS 3 via PG 5 to S 5 623.

Two causal relationships 608 and 618 are detected that are caused by P3 113 on S 3 112 and that have an impact on P4 130 on S 2 128 and on P4 106 on S 5 105, forking the causal chain starting at R 1 117 and connecting the causality chain starting with R3 110 with the causality chain starting with R1 117. Causal relationship 608 travels over topology entities S 3 and S 2, and causal relationship 618 travels over topology entities S 3 and S 5.

The event causality graph shows that P4 106 on S 5 104 is impacted by two different events P 3 113 on S 3 112 and R4 111 on OS 3, providing an example for more complex causal relations than linear causal chains where one event has exactly one cause event.

The impact from event P4 106 on S 5 travels over service S5 105 used by browser set 2 101 and causes 626 the performance event P5 102 on browser set 2 101.

Further, the event P3 113 causes 608 the performance event P4 130 on service S 2 128 via service S 3 112 and service S 2 128. P 4 130 in turn causes 611 P5 127 on service S 1 122 via services S 2 and S 1 612.

Service S 1 122 was used by browser set 1 119 while P6 120 emerged on browser set 1 119 and P5 emerged on S1 122. Consequently, a causal relationship 614 is detected between P5 127 and P6 120 traveling from service S 1 122 to browser set 1 119.

The dashed line 618 represents potential causal relationship between P4 130 on S 2 128 and P5 117 on S 1 122 which is ignored due to a low causal factor. The causal effect described by 618 travels from S 2 128 over PG 2 133 to the shared topology entity OS 1 124 and over PG 1 123 to S 1 122. Each hop from one topology entity to the next in the entity graph 414 of the causal relationship 618 dampens the possible impact factor of 618, which in this example reduces the impact factor to a level below the threshold used by the causality estimator 227 to skip unimportant causal relationships.

The event correlator may also detect and report alternative causal relationships between events, like e.g. causal relationship 628 between event R4 111 on OS 3 109 and P5 102 on browser set 2 101. Although their causality factor may be low in relation to other detected causal relationships, they may improve the accuracy of the root cause estimation.

The processing performed to extract topological data from end-to-end transaction trace and infrastructure data to build an integrated topology model 220 and to detect unexpected changes in performance behavior and resource usage to create corresponding service 223 and infrastructure events 217 is shown in FIG. 7. Gathering topology data from infrastructure and transaction agents 206, extracting topology data describing services and service call relationships from end-to-end transaction trace data may be performed according to the teachings of U.S. patent application Ser. No. 14/879,183 and detailed description of this process may be found there. Detecting of performance events describing unexpected performance or load changes of transaction executions belonging to specific transaction categories is performed according to the teachings of U.S. patent application Ser. No. 15/227,029 and a detailed description of this processing can be found there. FIG. 7 only covers aspects of those processes that are relevant for the understanding of the disclosed technology, as it is based on an integrated topology model and transaction relates service events corresponding to specific transaction categories.

The process of analyzing end-to-end transaction trace data to extract individual service calls performed by the transaction executions, and to determine call dependencies of the service calls is described in FIG. 7a. An end-to-end transaction trace describes the execution of an individual transaction, potentially performed by multiple threads in multiple processes.

More specifically and by an example, a transaction enters a first process by calling a service interface, like e.g. a HTTP service provided by the first process. Processing the HTTP service within the process, causes e.g. the execution of multiple threads within the process. One of those threads involved in fulfilling the HTTP service call, communicates with a second process by sending a remote method invocation message to a remote method execution service of the second process. The end-to-end transaction trace data describes the call of the HTTP service at the first process, the internal processing to fulfill the HTTP request, the remote method call on the second process and the internal processing to fulfill the remote method call on the second process. The service topology derived from the exemplary transaction would describe that the process group to which the first process belongs provides a HTTP service, that the process group of the second process provides a remote method service and that the remote method service is called by the HTTP service.

The process to extract service topology data from end-to-end transaction trace data starts with step 701, when a new end-to-end transaction trace arrives at the service event generator 222. Following steps 702 and 703 determine the service call sequence of the incoming transaction trace data and integrate the topology data describing the extracted service call sequence with the topology data already existing in the topology model 220. Steps 702 and 703 are performed according to the teachings of U.S. patent application Ser. No. 14/879,183. A detailed description about the processing included to perform steps 702 and 703 can be found there. The result of steps 702 and 703 is a topology model that includes the service that are called by the incoming transaction and the call relationships of those services. The topology model also associates those service with the process groups providing them.

Following step 704 extracts service related measures from the transaction trace data. Those measures may include but are not limited to the response time of a service called by the transaction, or an indicator for the success of the service call.

Steps 701 to 704 may be performed on the event of an incoming end-to-end transaction to update current observation data describing the performance, functional and load behavior of individual services, whereas steps 705 and 706 may be performed in a cyclic way, e.g. every 1 or 5 minutes to statistically compare a set of currently observed service executions with corresponding baseline observations.

Subsequent step 705 uses the extracted service measures to perform statistical tests to determine if an unexpected change of the monitored service performance and behavior parameters like response time or error rate has occurred. The tests performed by step 705 may e.g. include comparing a statistical parameter describing the performance or functional behavior of a set of historic calls to the same service at the same process group representing an observed baseline behavior of the service with a corresponding statistical parameter describing performance or functional behavior of a set of corresponding current service calls. The performed tests may include but are not limited to comparing a specific quantile value of the baseline with the value of the same specific quantile from a set of current service calls, comparing the baseline error rate with the error rate of current service calls or comparing the number of service calls per time unit of the baseline period with the number of service calls per time unit from the current observation period.

Service related baseline data is available for various different transaction categories described by transaction classification coordinates and the tests are performed for all classification coordinates for which baseline data is available and for which sufficient current service execution observations are available. As an example, for a specific service provided by a specific process group, baseline data may be available for classification parameters ("*", "*"), ("North America", "*") and ("*", "Internet Explorer") and sufficient current service observations may be available for the classification coordinates ("*", "*") and ("North America", "*"). Consequently, statistical tests may be performed to compare baseline and current behavior for classification coordinates ("*", "*") and ("North America", "*").

In case step 705 identifies a statistically relevant deviation between current and baseline performance or functional behavior, subsequent step 706 creates a corresponding event node record 401. The type 402 of the created event record indicates the type of detected baseline deviation, like increased response time, increased error rate, increased or decreased service call load. The topology type 403 is set to indicate a topology entity of the type service and the topology coordinates 404 are set to identify the service on which the event occurred within the topology model 220. The transaction classification coordinates 405 are set to the classification coordinates for which the test indicating the unexpected baseline deviation was performed. The start time range 406 may be set to indicate a time interval from the last point in time when the described event was not observed, e.g. time of the last test for this service with this classification coordinates that did not show a baseline deviation, to the first point in time when the described event was observed, e.g. the time of the test that caused the creation of the event node record. The end time range 407 may be set to indicate the time period between the last test showing a baseline deviation and the first test showing no more baseline deviation.

The process then ends with step 707.

The processing of infrastructure topology data 216 by the monitoring server 229 to update the topology model is shown in FIG. 7*b*. The processing of topology data as described in FIG. 7*b* is a summary of the processing required to create a topology model of the monitored system that is required for the understanding of the disclosed technology. In detail, the processing of infrastructure topology data 216 and service topology data 215, including the extraction of service topology data out of end-to-end transaction trace data, may be performed according to the teachings of U.S. patent application Ser. No. 14/879,183 by other parts of the monitoring server 229 that are not shown and discussed here as they are not relevant for the understanding of the here disclosed technology. For the understanding of the current disclosure, it is sufficient to assume that an infrastructure topology data processor (not shown) being part of the monitoring server receives and processes incoming infrastructure topology data to create and update the infrastructure related aspects of a topology model 220 describing the topology of the monitored system. The process starts with step 710 when new infrastructure topology data from an infrastructure agent 206 is received. Following step 711 analyzes the received infrastructure topology data to detect new topology entities or topology entity relationships that are not yet represented in the topology model 220. As an example, a new deployed operating system agent would report a new entity of type operating system. In case of new processes started on an already monitored operating system, new entities of type process group may be reported. In addition, monitored network communications of processes may result in new topology entity relationships describing those monitored communication activities.

Following step 712 inserts the new reported topology data into the topology model to also represent the new topology entities and entity relationships reported by the incoming infrastructure topology data 216. The process then ends with step 713. Processing of infrastructure topology data and updating the topology model accordingly is performed according to the teachings of U.S. patent application Ser. No. 14/879,183. A detailed description of the processing can be found there.

The processes 7*a* and 7*b* keep the topology model up to date with new detected operating systems, process groups running on those process groups, services provided by those process groups, service call dependencies between the services, communication activities between processes of process groups and virtualization aspects of the monitored system.

The processing of infrastructure measure data to create infrastructure events is shown in FIG. 7*c*. The process starts with step 720 when new infrastructure measure data is available. The provided infrastructure measure data may include data describing current usage of specific resources like memory, disk space or CPU by a monitored topological infrastructure entity like a process group, an operating system or a virtualization component. The infrastructure measure data may also include data describing utilization and quality of computer networks used by the infrastructure entities. This measurement data may include the number of network communications performed by process groups, the amount of data transferred over the network by specific process group pairs or the number of network errors that occurred during network communications performed by specific process group pairs. For the creation of non-metric based infrastructure conditions, like unexpected crashes of monitored processes or operating systems or the detection of unexpected operation states of monitored processes like the unavailability of required additional process memory or execution threads, process 7*c* may be executed on detection of such unexpected infrastructure conditions in a way that after starting with step 720 on detection of an unexpected infrastructure condition, step 721 is omitted and only step 722 which creates and sends an event record describing the unexpected infrastructure condition is executed before the process ends with step 723.

Subsequent step 721 performs tests on the new infrastructure measure data to determine if they describe an unexpected resource usage. Either a static thresholds or baseline data representing resource utilizations from a previous reference period may be used for this tests. Subsequent step 722 creates event node records 401 describing unexpected resource utilizations detected by step 721. The type 401 of the created event node records are set according to the type of unexpected resource usage like e.g. increased memory or CPU, disk or network usage or unexpectedly high number of network errors. The topology type 402 indicates the topological type of the entity in which the event occurred, like process group, operating system, hypervisor etc. For network communication related events that describe monitored unexpected communication behavior observed for a topological entity like a process group, the type may also indicate the communication role of the topological entity like e.g. a client role sending communication request or a server role accepting communication requests. Typically, for network communication related events, an event is perceived at both communication endpoints, e.g. client and server. The topology coordinates 402 identify the infrastructure entity on which the event occurred within the topology model. The transaction classification coordinates 405 may be set to indicate the most generic transaction classification. The start time range 406 is set to indicate the time period between last observation not showing the unexpected behavior before the event and first observation showing it the and end time range 407 is set to indicate the last observation showing it and the first observation no longer showing it. The process then ends with step 723.

The analysis of infrastructure measures to create corresponding infrastructure events as performed by step 722 may either be performed on a distributed infrastructure event generator 209 operating on infrastructure agents 206, as shown in FIG. 2. It may alternatively be performed by a centralized infrastructure event generator operating at the monitoring server and receiving infrastructure measurements from all connected infrastructure agents 206.

Both service events 223 created by process 7a and infrastructure events 217 created by process 7c are forwarded to the event correlator 231 for further processing.

Referring now to FIG. 8 which shows a flowchart that conceptually describes the processing steps performed by the event correlator 231 to determine the causal relationships of a newly received event node record with existing event node records in the event causality graph repository 232.

The process starts with step 801 when a new event node record 401, which may either describe a service related event or an infrastructure event, arrives at the event correlator. In subsequent step 802, the event correlator determines for each event node record existing in the event causality graph repository 232, a causality factor for the probability that the new event is the cause for the existing event and a causality factor for the probability that the new event is the effect of the existing event.

The calculation of the causality factors considers timing data describing the timing of occurrence of both events, the type of both events, the topological relation of both events and the transactional context of both events. The topological relation of two events may include the entity types of the entities on which the events occurred and their closest shared entity. As an example for two events occurred on process group running on the same operating system, the closest shared entity would be the operating system. In case of process group events for process groups on different operating system, the shared entity could be non-existent, or in case both operating systems are virtualized, be a virtualization component like a hypervisor providing virtualized computer systems for both operating systems. The transactional context relevant for causality estimation may consist in all transaction trace data describing transactions using one of the entities on which the event occurred during the start time 406 of both events.

Following step 803 determines for each pair of events formed by an existing event and the new event and for each causality direction, a causality graph which describes the possible topological paths a causal effect may take to travel from cause to effect. Calculation of the causal graph considers topological relationships caused by shared topological entities, topological relationships caused by service call relationships extracted from transaction traces and monitored process group communications. The determination of a causality graph may be performed as follows. One event of the event pair may be assumed cause and the other one as effect. After cause and effect event are determined, the topological entities on which the events occurred may be identified, and a graph search may be performed on the topology model to find all paths through the topology model 220 on which a causal effect may travel between the topological entity on which the cause event occurred and the topological entity on which the effect event occurred. Referring back to FIG. 1 for an example to determine the causality graph between two events. Considering resource event R2 118 on OS 2 115 as potential cause event and performance event P3 113 on service S3 112 as potential effect event. The portion of the topology model depicted in FIG. 1 shows that OS 2 executes process group PG 3 114, which provides service S3 on which the assumed effect event P3 113 occurred. A search for topological entities connecting OS 2 and S 3 would reveal that OS 2 and S 3 are connected via PG 3 114. The causality graph for cause R2 118 on OS 2 and effect P3 113 on S3 112 would start with OS 2, continue with PG 3 and end with S3.

Step 804 afterwards checks for each calculated causality factor if it exceeds a causality threshold and should thus be considered for causality modelling. An event causality edge record is created for each causality factor exceeding the threshold. The cause event reference 411 is set to refer and identify the event being the cause part of the causal relationship and the effect event reference 412 is set to refer and identify the event being the effect part of the causal relationship. The causality factor 413 is set to the corresponding factor calculated in step 802 and the entity graph 414 is set to the entity graph determined in step 803. The created event causality edge records 410 are inserted into the event causality graph repository 232. Although steps 802 to 804 are shown here in a sequential order, they may be performed in an interleaved way to improve the performance of the correlation process.

Step 805 identifies those event graphs 230 which have been updated by the newly added event node record 401 and event causality edge records 410 and performs a recalculation of the root cause candidate events of those event graphs. The root cause candidates of an event graphs are those events of an event graph that have the greatest global causal impact on all other events of the event graph.

After the root cause candidates of all affected event graphs are recalculated, the process ends with step 806.

Coming now to FIG. 9 which visually and by example describes different aspects of events that are used for causality estimation. The type of both cause and effect event determine the aspects that are applicable for the causality estimation.

The event timing based causality calculation aspect is shown by example in FIG. 9a and shows the probability functions of event 1 901 and event 2 906. The timestamp $smin_{E1}$ 902 is the last point in time when event 1 was not observed and the timestamp $smax_{E1}$ is the first point in time when event 1 was observed. The probability that the condition described by event 1 is in fact the case and can thus pass on influence to other events or receive influence from other events is described by a function of time t that may take an arbitrary form and that has a range of values from 0 to 1. In one embodiment, the function can be plotted as a trapezoid such that the probability that event 1 is active constantly rises from 0 to 1 between $smin_{E1}$ and $smax_{E1}$ and stays at 1 until $emin_{E1}$ 904 indicating the last point in time when event 1 was observed and constantly decreases to 0 until $emax_{E1}$ 905 which is the first point in time when event 1 901 was no longer observed. Similar timestamp data consisting in $smin_{E2}$ 907, $smax_{E2}$ 908, $emin_{E2}$ 909 and $emax_{E2}$ 910 is available for event 2 906. This defines a linear probability function for the existence of the events over time. The period between smin and smax may be called raise time of the event during which the probability function of an event has a value between 0 and 1. In case the raise times of two events overlap as shown in FIG. 9a, a probability factor can be calculated for the situation that one event occurred before the other event and vice versa. The linear probability functions of both events defined by their smin and smax may be used for this calculation, and the calculated probability factors may be used as temporal causality factor.

In case the raise times of the events do not overlap, and the raise time of the first event is between smin and emin of the second event, indication a probability of 1 for the second event during the rise time of the first event, the timing based causality factor that event 1 caused event 2 is 0, as event 2 was already active with a probability of 1 before event 1 started to raise and the timing base causality factor that event 2 caused event 1 is 1 as event 1 was raised while event 2 was active. A partial overlap of the raise time of two events causes a temporal causality factor between 0 and 1 in both causality directions. The temporal causality factor may also be considered as the probability that an assumed cause event was active while an assumed effect event was raised. Referring to the example in FIG. 9a, the probability that event 1 901 was active during the raise time of event 2 906 is proportional to the area 1 covered by the probability function of event 1 from $smin_{E2}$ to $smax_{E2}$ and the probability that event 2 906 was active during the raise time of event 1 902 is proportional to the area 2 covered by the probability function of event 2 from $smin_{E1}$ to $smax_{E1}$. As area 1 is larger than area2, the timing data indicates a higher probability that event 1 is the cause and event 2 is the effect than vice versa.

Other embodiments of the disclosed technology may use, to determine event timing based causality factors, in addition to a function that describes the probability that the event is active, another function that describes the probability that the state change described by the activation or deactivation of an event has an impact on another event. As an example, for a first event that gets activated on a specific point of time and then stays active for a considerably long time like e.g. some hours, the probability of a causal relationship with a second event that got activated immediately after the activation of the first event is much higher than the probability of a third event that got e.g. activated one hour after the activation of the first event. A more specific description of this alternative determination of timing based causality factors can be found in FIG. 21.

The usage of vertical topological aspects of the topology model that describe which process groups provide which services and which operating systems execute which process groups for causality determination is shown by example in FIG. 9b.

According to the topology model 220, operating system OS 3 914 runs process groups PG 6 911 and PG5 915. Process group PG 5 further provides service S 5 916. An event indicating a response time slowdown 918 occurs on service S 5 and another event indicating high CPU usage 912 occurs on process group PG 6 911. Topology data shows that the next shared topology entity of the entities S 5 916 and PG 6 911 on which the events occur is the operating system OS 3 914. According to the topology model, a causal connection between the two events involves their next shared topology entity OS 3 as transfer medium. In the example of FIG. 9b, the high CPU event 912 may have an impact 913 on operating system OS 3 914 and OS may propagate a part of this impact 917 to service S 5 916 which there causes the slowdown event 918. A tabular knowledge base may be used for this type of causal factor determination. The tabular knowledge base may consist in columns for cause entity type, cause event type, effect entity type, effect event type, shared entity type and impact factor. The cause and effect columns define origin and type of the events for which a causal factor should be determined, the shared entity type defines the path a possible causal effect has to travel and the impact factor determines a heuristic based causality factor for given cause/event/shared entity combinations.

For the example of FIG. 9b, cause event type and entity type would be "High CPU" and "Process Group", effect event type and entity type would be "Response Time Slowdown" and "Service" and the type of the shared entity would be "Operating System". The tabular knowledge base would e.g. define for such a combination an impact factor of 0.5 as it is not likely but possible that increased CPU usage on one process causes a slowdown of a service provided by another process if both processes run on the same operating system and compete for the same resources. The tabular knowledge base may provide a lower impact factor of 0.1 for the other impact direction as it is unlikely that a slowdown observed on one process causes a high CPU usage on another process. An exemplary tabular knowledge base is depicted in FIG. 19.

The analysis of end-to-end transaction trace data related to two service events to determine a causality factor is visually and by example shown in FIG. 9c. A service slowdown 943 is detected on service S 4 944 and another service slowdown 942 is detected on service S 2 941. The end-to-end transaction traces related to the service events are those trace data records that describe transactions that were executed during the raise time (time between smin and smax) of the event that is assumed as the effect event as only those transactions can have an impact on the effect event, that also have transaction classification coordinates matching either the transaction classification coordinates of assumed cause or assumed effect event and that additionally use at least one of the services affected by one of the events. The identified event related transaction traces may show one of the four service call scenarios depicted in FIG. 9c.

Transactions of the first scenario "Transaction showing cause and effect" contains service call sequences showing usage of cause and effect event according to the causal direction. The exemplary transaction first calls service S 1 940 which calls S 3 946 and S 2 942. The assumed effect slowdown event S 2 942 was observed on S 2 and S 2 further calls S 4 944 and S 5 945. The assumed cause slowdown event 943 was detected on S 4. As a slowdown of a service also affects its callers, the causal direction for slowdown events is against the service call direction, the service call example of the "Transaction showing cause and effect" example shows calls to services related to cause event 943 and effect event 942 in casual direction.

The second transaction scenario "Transaction showing only effect" contains service calls sequences only showing the assumed effect event. The exemplary service call sequence shows a transaction calling service S 1 940, which calls services S 2 942 showing the assumed effect event 942 and service S 3 946. In this scenario, S2 942 only calls S 5 942.

The third transaction scenario "Transaction showing only cause" is explained by an exemplary service call sequence starting with service S 7 947, which calls service S 8 948 which in turn calls the service S 4 944 which shows the assumed cause event.

The fourth scenario shown in FIG. 9c, shows a variant of the first scenario, as it also performs calls to the service affected by the assumed cause event 943 and the assumed effect event 942, but it also shows an intermediate call to service S8 948 that may potentially dampen the impact that the slowdown event 943 on S 4 944 has on the slowdown event 942 on service S 2 941.

To determine a causality factor between service related events based on event related transaction trace data, the number of event related transactions falling into each above described scenario or category may be determined and related to each other. Transactions falling in the first and the fourth scenario improve the probability of a causal relationship, whereas transactions falling into the second and third decrease the probability of a causal relationship. The number of transactions falling in the fourth scenario may be reduced by a specific factor to honor the potentially dampened causal effects caused by the intermediate service calls. The causality factor calculation may be performed in both causality directions, once assuming one event as cause and the other as effect and once with switched cause/effect assumption.

A more detailed description of the calculation of a causality factor based on event related transaction trace data can be found in FIG. 13.

FIG. 9d shows a variant for transaction based causality factor calculation that also considers service local timing and timing data of intermediate service calls. A slowdown event 928 occurs on service S 9 927, showing an increased response time RT S9 934. Another slowdown event 920 occurred on service S 2 921. A service call sequence extracted from an event related end-to-end transaction shows that service S 2 921 calls service S 4 which in turn calls service S 8 925. S 8 calls service S9 927 on which the assumed cause event 928 occurred. Analysis of event related transaction traces showing both calls to S2 and S9 in assumed causality direction show that the increased response time RT S2 931 of service S 2 921 is composed out of a service local contribution 930, a contribution from intermediate services 932 and a contribution form service S 9 933. A causality factor calculation may also consider the proportion between the response time of the assumed effect event, e.g. RT S 2 931 and the contribution of the service corresponding to the assumed cause event 933. The smaller the response time contribution of the assumed cause event is, the lower is the probability of a causal relationship.

Referring now to FIG. 10, which provides an overview of the process to calculate the causality factor between two events. The process starts with step 1001 when an event pair with a hypothesized causal order (e.g. one event of the pair is assumed cause and the other one assumed effect), arrives at the causality estimator 227. Subsequent step 1002 determines the timing based causality factor part, considering the probability functions of both events to determine the event start timing related probability that the assumed cause event has an influence on the assumed effect event. The determined probability is the timing based causality factor part. The timing based causality factor represents the probability that the assumed cause effect was active during the raise time of the assumed effect event. Referring back to FIG. 9a for an example and assuming that event 1 901 is the cause event and event 2 906 is the effect event, the timing based causality factor would be the average probability that event 1 was active during the raise time of event 2 (time from $smin_{E2}$ to $smax_{E2}$). Visually, this value may be described as the average height of the curve describing the probability that event 1 is active between $smin_{E2}$ to $smax_{E2}$. This value has a range from 0.0 to 1.0, where 0.0 indicates impossibility and 1.0 certainty. In case $smax_{E2}$ would be before $smin_{E1}$, the probability curve of event 1 would have the value of 0.0 during the raise time of event 2, indicating that according to the timing data of the events, it is impossible that event 1 caused event 2. In case $smin_{E2}$ and $smax_{E2}$ would be between $smax_{E1}$ and $emin_{E1}$ which is the period during which event 1 is active with certainty, also the timing based probability of a causal effect traveling from event 1 to event 2 would be 1.0 indicating, the value for certainty. For all other situations where the raise times of both events either fully or partially overlap, the timing based causality factor would have a value lower than 1.0 and higher than 0.0 and would indicate the probability that the assumed cause event was active during the raise time of the assumed effect event. Processing steps to determine the timing based causality factor could be performed as follows. A first step determines the start time interval (i.e. smin to smax) of the assumed effect event, a second step determines the portion of the probability curve of the assumed cause event during the start time of the assumed effect event and a third step calculates the average value of this portion of the probability curve of the assumed cause event as the timing based causality factor.

Following step 1003 analyzes the types of the events of the event pair to determine appropriate causality evaluation procedures. Exemplary evaluation procedures are described in FIG. 3. Step 1003 may evaluate both type 402 and topology type 403 of the received events for the determination. The determination of the appropriate evaluation procedures may be based on domain knowledge about possible causal relationships between different types which may be available in form of a knowledge base table. This table may define the appropriate causality evaluation procedure for all available event type combinations.

As an example this table may define that for event pairs consisting in service execution related events, the transaction classification coordinate evaluator 302 and the transaction horizontal topology evaluator 304 are appropriate, for infrastructure events the infrastructure vertical evaluator 306 and that for network communication related events the infrastructure horizontal evaluator is applicable. For event pairs with heterogeneous event types, the table may for combinations of a service execution related event and an infrastructure event or a network communication related event specify the transaction horizontal evaluator 304 and for combinations of an infrastructure event and a network communication related event specify the infrastructure vertical 305 and the infrastructure horizontal evaluator 306.

The following decision step 1004 determines if both event types match the previously determined causality evaluation procedures. In case the event types match, processing continues with step 1006 which calculates the causality factors according to the determined evaluation procedures. Otherwise, step 1005 is executed which identifies the event type that is not matching the evaluation procedure and converts it into one or more equivalent event types of matching type.

As an example, for an event pair consisting in a service execution related event and an infrastructure event, the transaction horizontal topology evaluator 304 is chosen, which requires two service related events. To achieve this situation, the infrastructure event has to be converted into one or more corresponding service events. This conversion may e.g. be performed by first using data from the topology model 220 to identify the services that are potentially affected by the infrastructure event. In case the infrastructure event occurred on a process group, then all services provided by this process group are potentially affected by the infrastructure event. If the infrastructure event occurred on an operating system, then all services provided by all process groups running on the operating system are potentially affected. A virtual service event is created for each of the identified potentially affected services with the timing data of the infrastructure event, and the transaction horizontal topology evaluator 304 calculates a causality factor between the first service event and each of the virtual service events on the services potentially affected by the infrastructure event. As the virtual services are not really observed on the services, but derived from an observed infrastructure event, the calculated causality factor needs to be adjusted by a damping factor that models the uncertainty that the services are really affected by the infrastructure event. The damping factor may depend on the type of the infrastructure entity on which the event occurred and may cause increased damping with increased topological distance between a service on which a virtual service event is created and the infrastructure entity on which the infrastructure event occurred. As an example the damping factor for process groups may be lower than the damping factor for operating systems, as a potential impact from a process group only involves the process group and its provided services, whereas an impact from an operating system first needs to impact process groups which then may propagate the impact to their provided services. The damping factor may be available in form of another knowledge table defining a service event damping factor for each infrastructure entity type. It is noteworthy that for a causality factor calculation system that creates causality factors with a value range from 0 to 1, where 0 indicates the impossibility of a causal relationship and 1 a certain causal relationship in which damping factors with a value range from 0 to 1 are used and is applied by multiplying them to a causality factor, higher damping factors may have a lower numerical value.

Other event type conversions may be required for other causality evaluators some of them are explained by example in FIG. 15.

After step 1005 determined the equivalent virtual events for the event not matching the chosen causality determination procedure, step 1006 calculates the causality factors between the originally matching event and the determined virtual equivalent events. A damping factor may be applied to the causality factors corresponding to virtual events to reflect fact that the events were not directly observed but represent the potential impact that another, observed event may have.

Following step 1007 combines all calculated partial causality factors into one overall causality factor. For causality factors describing different, parallel causal paths, like for e.g. for different causal relationships calculated for different equivalent virtual events, the maximum value is chosen as it represents the most likely path for causal relationships. Partial causal factors representing different aspects of the analyzed events, like the timing based causality aspect and the event type specific causality aspects, like vertical infrastructure related aspects or horizontal transaction execution related aspects are combined by multiplying them. All partial causality factors represent the probability that the assumed cause effect causes the assumed effect event and they may have a range from 0.0 to 1.0 where 0.0 indicates impossibility and 1.0 indicates certainty. The different partial causality factors consider different aspects describing the context connecting both events, like timing data of both events, topology entities used by both events or transactions or network communications involved in both events. The combination of those partial causality factors into an overall causality factor may be performed by multiplying all partial causality factors.

Some causality estimators may provide multiple causality factors describing the same aspect of the events. As an example, the situation depicted in FIG. 15*b* shows a network event 1543 and a slowdown event 1533. A causal effect between both can travel via PG 1 and S1 or via PG 2 and S2. A partial causality may be calculated for both causal paths. The causality factor combiner may in step 1007 first select the maximum causality factor of such partial causality factors representing different causality alternatives of one aspect of the two events and use this maximum value for the combination of partial causality factors considering other aspects of the events.

After the partial causality factors are combined into one overall causality factor, the process ends with step 1008.

Referring now to FIG. 11 which describes the process of calculating the causality factor for two infrastructure events, as e.g. performed by the infrastructure vertical topology evaluator 305. The process starts with step 1101 when an event pair containing two infrastructure events arrives at the infrastructure vertical topology evaluator. Following step 1102 used data stored in the topology model 220 to determine the type of the nearest shared topology entity of the entities corresponding to the events in the event pair. As an example, for two events that occurred on process groups, step 1102 may use topology data to determine the operating systems executing the process groups. In case the operating systems are the same, step 1102 provides the type operating system as the type of the shared topology entity. Otherwise, step 1102 continues by identifying virtualization components like hypervisors used to provide the virtualized computer systems on which the operating systems are executed. In case both computer systems are virtualized and those virtualized computer systems are provided by the same virtualization component, step 1102 provides the type of the virtualization component as the type of the nearest shared topology entity. In case no shared topology entity is found, the process ends and returns a partial causality factor indicating no causal relationship.

In case a shared topology entity is found, following step 1103 fetches the types of the topology entities of the entities related to the event pair, and subsequent step 1104 fetches the matching heuristic based partial causality factor from a tabular knowledge base describing causal relationships between events occurred on entities of a specific type having a shared entity of a specific type. The fetched partial causality factor is provided for further processing and the process ends with step 1105. An example for a tabular knowledge base as used by step 1104 may be found in FIG. 19. The tabular knowledge base consists in a column 1901 identifying the type of the topological entity on which the assumed cause event occurred, a column 1902 to identify the type of the topological entity on which the assumed effect event occurred, a column 1903 identifying the type of the nearest topological entity shared by the entity on which cause and effect occurred and a column 1904 defining an impact factor for the combination of cause/effect/shared entity type. In some embodiments, column 1901 and 1902 may, in addition to the type of topological entity on which the event occurred, also specify the type of the occurred cause and effect event. This allows to model more fine grained impact factors that next to the type of the entity on which an event occurred, also consider the type of the event to determine an impact factor for an assumed cause and effect event.

Referring now to FIG. 12 which describes the determination of a partial causality factor based on the transaction classification coordinates of two service related events. The process starts with step 1201 when an event pair containing two service related events arrives at the transaction classification coordinate evaluator 302. Following decision step 1202 determines if the transaction classification coordinates of both events are disjoint. In case of disjoint coordinates, the process continues with step 1204 which notifies that no causality between the two events is possible. For an example of disjoint classification coordinates please refer to FIG. 5*a*. Step 1204 may also include to skip all other causality calculations as a causal relationship between the events of the received event pair is not possible. The process then ends with step 1207. In case step 1202 determines that the classification coordinates are not disjoint, the process continues with step 1203 which analyzes if a parent/child relationship between both classification coordinates exists. In case a parent/child relationship can be identified (for an example of two classification coordinates with parent child relationship please see FIG. 5*b*), the process continues with step 1205 which notifies a possible causal path from the event with the child classification coordinates to the event with the parent classification coordinates. Step 1205 may further notify that a causal path from the event with the parent classification coordinates to the event with the child classification coordinates is impossible. Afterwards, the process ends with step 1207. In case step 1203 determines no parent/child relationships of the transaction classification coordinates, the process continues with step 1206 which notifies a possible causal path in both directions. The process then ends with step 1207.

Referring now to FIG. 13 which describes the process to calculate the partial causality factor for two events based on the monitored transaction traces corresponding to both events, as e.g. performed by the transaction horizontal topology evaluator 304. The process begins with step 1301 when an event pair for which a transaction based causality factor should be calculated arrives at the transaction horizontal topology evaluator. One event of the event pair is assumed to be the cause event and the other event is assumed to be the effect event. The following causality factor calculation is based on this hypothesis. Subsequent decision step 1302 determines if the event pair contains a non-service related event, like an infrastructure or network communication related event.

In case the pair contains such an event, step 1303 is executed which uses topology data to determine the services potentially affected by the event and which creates corresponding virtual service related events that are located at the potentially affected services, using the timing data of the original not service related event. Afterwards, step 1303 determines a damping factor to consider that the virtual events were not really observed at the services but represent an assumed impact of a non-service related event on those services. The damping factor depends on the type of the entity on which the non-service related event occurred.

Step 1304 is performed after step 1303 or if decision step 1302 identified only service related events in the received event pair. Step 1304 fetches the transaction traces relevant for the causality determination for the received events by selecting transaction traces executed during the raise time (between smin and smax, see e.g. FIG. 9*a*) of the hypothesized effect event, having transaction classification coordinates matching at least one of the transaction classification coordinates of the events, and which use at least one of the services on which an event of the event pair occurred.

Following step 1305 determines the transaction call order to support the hypothesized cause/effect direction. As an example, for service response time related events, a response time degradation of a service impacts the response time of other services that call the service. Therefore, for response time related events, the cause/effect supporting transaction call order is from the called service (hypothesized cause) to the calling service (hypothesized effect). The same is applicable for error rate events.

For transaction load events, indicating unexpected increases or decreases of the number of service calls per time period, the cause/effect supporting call order is from the calling service to the called service, because a load change observed on one service can only affect and change the load scenario on other services it calls. It cannot influence the load situation of the services calling it.

After the causality relevant service call order is determined in step 1305, the process continues with step 1306 which calculates a factor C as the number of transactions that call the services corresponding to the two events in the causality relevant call order. Considering the service call sequences of monitored transactions as shown in FIG. 9*c*, the slowdown event 943 on service S 4 944 as assumed cause and the slowdown event 942 on service S 2 941 as assumed effect, scenario 1 and scenario 4 show calls to the services corresponding to the events in a call service order supporting a causal effect from event 943 to event 942. The calculated factor C has for this example the value 2.

To consider service internal monitoring data, as described in FIG. 9*d*, C may alternatively be calculated as the sum of response times of calls to the service of the assumed cause event, for transactions calling both services in causality supporting call order. Continuing with the exemplary transactions of FIG. 9*c*, this is the sum of the response time of service S 4 944 of scenario 1 and of scenario 4.

After the calculation of the causality contribution factor C in step 1306, step 1307 is executed which calculates factor D, representing the dissipation of causal effects between assumed cause and effect event. Factor D is calculated as the number of transactions using at least the service corresponding to the assumed effect event. Returning to the example of FIG. 9*c* again, this would be transactions of scenario 1, 2 and 3 as they call service S 2 941 on which the assumed effect event 942 occurred. To consider the service internal monitored timing data as shown in FIG. 9*d*, factor D may alternatively be calculated as sum of response times of calls to the service on which the effect event occurred performed by matching transactions. In the FIG. 9*c* example, this would be the sum of the response times of calls to service S 2 in scenario 1, 2 and 4.

Following step 1308 calculates the horizontal causality factor as C divided by D. In case one of the events in the received event pair was no service related event, and the causality factor calculation was performed by using virtual service event, step 1308 also applies the according damping factor to the previously calculated causality factor. The calculated horizontal causality factor is provided for further processing and the process ends with step 1309.

In case of a causality calculation with virtual events, situations may occur in which multiple virtual cause or effect events occur in one service call sequence of a transaction. During calculation of factors C and D, each service call sequence only increments C or D by one, even if more event affected service calls are found. Referring back to scenario 4 of FIG. 9c, and considering an infrastructure event on a process group providing services S 2 an S 4. Consequently, corresponding virtual events would be placed on S 2 and S 4. Even as two assumed effect events are on the services of the service call chains, the transaction of scenario 4 counts only once for the calculation of factors C and D.

Referring now to FIG. 14, which describes the causality factor calculation for infrastructure network communication related events. Those events describe unexpected behavior of monitored network communication activities performed by infrastructure entities like process groups. The examples for detected unexpected behavior including unexpected increase or decrease of monitored network communications, increase of network communication errors, increase of network latency, decrease of network throughput or unexpected increase of network bandwidth usage.

Network activities may be monitored by infrastructure agents 206. Network events may e.g. be created on observed unexpected changes of those network activities as exemplary described above. Either a fixed threshold base or a baseline based system comparing historic with current network activity data may be used to determine if network events should be created. Those network events are located on individual topology entities, like process groups or operating systems. Process 14a describes the calculation of a network communication related causality factor for events of arbitrary type, including the conversion of an event that is not network communication related in one or more corresponding virtual network communication related events. Process 14b describes the calculation of a network communication related causality factor for two network communication related events.

The process to calculate the communication related causality factor for an event pair containing events of arbitrary type starts with step 1401 when an event pair arrives at the infrastructure horizontal topology evaluator 306. Following decision step 1402 checks if the received event pair contains an event that is not related to infrastructure network communication. In case both events are related to infrastructure network communication, the process continues with step 1407, which executes the process described in FIG. 14b. The calculated impact factor is provided for further processing and the process ends with step 1408.

In case step 1402 identifies that one of the events in the received event pair is not related to infrastructure network communication, the process continues with step 1403 which transforms the event not related to infrastructure network communication into one or more corresponding infrastructure network communication related events. Typically, network communication is only performed by processes that are represented by topological entities of the type process group. In case e.g. the event that is not related to infrastructure network communication occurred on a service, step 1403 may identify the process group providing the service as location of a corresponding virtual network event, in case of an event occurred on an operating system, step 1403 may fetch all process groups running on the operating system as locations for corresponding virtual network events. After the topological entities for corresponding virtual infrastructure network events are found, step 1403 determines an impact damping factor for the virtual events. The damping factor may be determined by using a tabular knowledge base for virtual infrastructure based events, which provides a heuristic based damping factor based on the type of the original event and the type of the topological entity on which the original event occurred.

Following step 1404 calculates a causality factor for each of the previously determined virtual infrastructure communication events and the received concrete infrastructure communication event. Step 1404 executes the process described in FIG. 14b to calculate the causality factor for each of those event pairs containing the concrete infrastructure communication event and one of the virtual infrastructure communication events.

After step 1404 has calculated individual causality factors for each event pair containing one virtual network event and the concrete network event, following step 1405 combines those causality factors into one resulting causality factor. The combination may be performed by choosing the highest impact factor, the average of all impact factors or the product of all impact factors.

Subsequent step 1405 applies the damping factor determined in step 1403 to the calculated causality factor and provides the final causality factor for further processing. The process ends with step 1406.

The calculation of the causality factor for two infrastructure network events is shown in FIG. 14b. The process starts with step 1410 when an event pair consisting in two infrastructure network events is received. A specific causal direction is hypothesized and consequently one event is assumed to be the cause event and the other to be the effect event. Process 14b may be executed for both causal directions to provide a causality factor for both causal direction hypotheses. Following step 1411 determines the network communications performed by the entities on which the events occurred during the raise time of the assumed effect event. Those performed network communications may include the TCP connections existing or established during the raise time of the effect event. A TCP connection is identified by two network addresses and ports, describing the two communication endpoints connected by the TCP connection. Each port is assigned to a specific process on an operating system which allows to identify the corresponding process groups for a TCP connection. The association of TCP connections to process groups may be performed according to the teachings of U.S. patent application Ser. No. 14/879, 183. A detailed description of the required processing can be found there.

Following decision step 1412 determines if a direct communication was performed between the entities on which the events occurred during the raise time of the effect event. In case no such communication was performed, the process continues with step 1416, which provides a causality factor indicating no causal relationship between the events. The process then ends with step 1420.

In case decision step 1412 detects a direct communication during effect event raise time, the process continues with step 1413 which analyzes the network communications performed by the entities corresponding to the two events during the raise time of the hypothesized effect event, as determined in step 1411.

Step 1413 creates groups of equivalent communication activities. The communication activities may e.g. be grouped by topological communication endpoints. As an example, communication activities connecting the same process groups may form one communication group of equivalent communication activities.

Afterwards, step 1414 determines the number of communication groups containing network communications involving the entity related to the cause event and the number of communication groups containing network communications involving the entity related to the effect event. As an example for an assumed effect event that occurred on a process group 1, and monitored network communications during the raise time of the effect event from process group 1 to process group 2, process group 3 and process group 4, the set of equivalent communication groups would contain communications between process group 1 and process group 2, between process group 1 and process group 3 and between process group 1 and process group 4. The derived number of communication groups would in this example be 3.

Subsequent decision step 1415 determines if the type of the assumed cause event indicates an ambient network event. An ambient network event describes a degradation of the network infrastructure that cannot directly be assigned to a topological entity. An example for an ambient network event would be an increased packed loss rate or an increased network latency. Network events indicating unexpected failures of attempts to create a network connection with a specific topological entity like e.g. a process group can be assigned to a topological entity and are therefore no ambient network events.

In case step 1415 identifies an ambient network event, processing continues with step 1418 which calculates the reciprocal value of the number of effect communication groups and of the number of cause communication groups. The product of both reciprocal values is provided as causality factor. The process the ends with step 1420.

In case step 1415 identifies that the assumed cause event indicates a non-ambient network event, the process continues with decision step 1417, which checks if the hypothesized cause event indicates unexpected network communication behavior on the server side.

A non-ambient network event can be assigned to a specific topological entity, like a process group, and within a network communication such a process group can either have the role of a client or a server. When acting as client, the process group sends communication requests to a counterpart server and expects corresponding responses. When acting as server, the process groups waits for incoming communication requests from clients and sends corresponding responses back to the requesting clients. Therefore, it can be assumed that causal effects of non-ambient network events can only travel from server side to client side and not in the opposite direction. Consequently, in case step 1417 identifies that the assumed cause event indicates a non-ambient network event on the client side, the process continues with step 1416 which indicates no causal relationship between the assumed cause and effect event before ending the process with step 1420.

In case step 1417 identifies that the assumed cause event indicates a non-ambient network event on the server side, the process continues with step 1419, which calculates a causality factor between the assumed cause and effect event as the reciprocal factor of the number of communication groups of the topological entity corresponding to the assumed effect event. As the assumed cause event is a non-ambient network event that can be assigned to a specific server side communication endpoint of a specific topological entity, it is sufficient to only consider the number of communication groups corresponding to the assumed effect event for the calculation of the causality factor. Some embodiments of the presented technology may in step 1419 provide a constant causality factor like e.g. 1, indicating a high probability of a causal relationship. Afterwards, the process ends with step 1420.

Exemplary conversions of specific event types into corresponding virtual event types according to the requirements of various causality evaluation processes are visually and by flow chart described in FIG. 15.

FIG. 15*a* discusses the conversion of infrastructure events into corresponding virtual service related events as prerequisite to perform causality calculations based on event related transactions as performed by the transaction horizontal topology evaluator 304.

The topological overview shown on the left side of FIG. 15*a* visually describes the conversion of an event indicating unexpected high CPU usage observed on an operating system into corresponding virtual service events and the usage of those virtual service events for the determination of the causality factor with another event observed on a service. A high CPU event 1508 is observed on operating system OS 1 1509, and a service slowdown event 1502 is observed on service S1 1503. According to the topology model, OS 1 executes the process groups PG 2 1512 and PG 3 1510 which provide the services S 2 1513 and S 3 1511. Consequently, both service S 2 and S 3 are potentially affected by the high CPU event observed on OS 1. This topological information may be used for the service usage based filtering of event related transactions. In the example shown in FIG. 15*b*, those are transactions using at least one of the services S 1 1503, S 2 1513 or S 3 1511. Transaction T 1 1501 is one of the selected transactions. Analysis of the service call chain of the transaction starts with the execution of S 1 1503 which is the service on which the concrete service event occurs. From S 1, the service call chain proceeds to service S 2. To detect if service S 2 1513 is affected by the other, not service related event, the causality factor evaluation process may search down the entity stack 1507 of service S 2 1513 do determine if the service is potentially affected by the not service related event. The entity stack of a topology entity like a service or a process group consists in the other topology entities on which the topology entity depends on. As an example, a service depends on the process group it provides and the process group in turn depends on the operating system that runs the processes of the process group. In the example shown in FIG. 15*a*, the entity stack of service S 2 1513 consists in process group PG 2 and operating system OS 1 1509. Consequently, transaction T1 is potentially influenced by the high CPU event 1508 on OS 1 1509.

A procedural description of this event type conversion is provided by the flow charts on the right side of FIG. 15*a*. The process to determine the corresponding service entities for an infrastructure event occurred on an infrastructure entity like an operating system or process group starts with step 1520 when an infrastructure event occurred on a specific topology entity arrives at the transaction horizontal topology evaluator 304, which starts to create corresponding virtual service events, see e.g. step 1303 of the process shown in FIG. 13. Following step 1521 uses topology data to identify the service entities that directly or indirectly depend on the entity on which the infrastructure event occurred which are provided for further processing. The process then ends with step 1522.

The process that determines if a specific service called by a transaction is affected by a not service related event on an infrastructure entity starts with step 1523 when a service call is received for which such possible influence should be determined. Following step 1524 uses topology data to determine the entity stack of the service. After the entity stack is determined, step 1524 determines if the entity stack contains the entity on which the not service related event occurred. In case the entity stack contains the entity on which the not service related event occurred, step 1524 indicates that the service is affected by the infrastructure event. Otherwise it indicates that the service is not affected. The process then ends with step 1525.

The processing shown and described in FIG. 15b may be included in variants of the process shown in FIG. 13 to improve the performance of the transaction horizontal related causality calculation.

The conversion of infrastructure network communication events into corresponding virtual service events for causality calculation is shown in FIG. 15b. An example described by a topological view is shown in the left half of FIG. 15b and the corresponding processing steps are shown on the right.

The example shows service group SG 1 1530 formed by services S 1 1532 and S 2 1534. Service groups are formed by grouping equivalent services. Transaction executions using one of the services in a service group may be arbitrarily directed to one of the services in the group, e.g. by a load balancer. The reason for providing different equivalent services is to improve the scalability of an application by allowing to perform more service calls executions in parallel. Service S 1 is executed on process group PG 1 1532 and service S 2 is executed on process group PG 2. A service slowdown 1533 is observed on service group S1 and a network event 1542 is observed on the process group PG 3 1543. During the causality relevant time period (e.g. raise time of the assumed effect event), both process PG 1 providing service S 1 and PG 2 providing service S2 performed network communication activities with PG 3 on which the network event occurred. This situation creates two possible impact paths over which causal effects between the service slowdown event on SG 1 and the network event on PG 3 may travel. The first impact path 1539 leads from PG 3 over PG 1 and S 1 to SG 1 and the second impact path 1538 leads from PG 3 over PG 2 and S 2 to SG 1. The causality factor corresponding to impact path 1539 is influenced by the communication activities of PG 3 and PG 1 with another counterpart. For PG 3 this are the communication activities 1541 and 1537 and for PG 1 this are communication activities 1540. The sum of those communication activities is 2 for PG 1 and 3 for PG 2. Accordingly, the causality factor describing the probability that PG 1 is affected by the network event on PG 3 is ½ multiplied by ⅓ resulting in a causality factor between PG 1 and PG 3 of ⅙. A potential causal effect has to further travel over PG 1 and S 1 to have an effect on the event on SG 1, which potentially dampens the causal effect. To model reflect this situation, the causality factor is further reduced by a damping factor.

A similar causality factor calculation may be performed for the impact path 1538 over PG 2 and S 2. However, the observed communication activities for PG 2 differ from those of PG 1. PG 1 performs only one other communication activity which causes a higher causality factor of ⅓ between PG 1 and PG 3.

To create an overall causal factor between network event 1542 and service group slowdown event 1533, the causality factors calculated for the two impact paths 1539 and 1538 need to be combined. The combination of the impact path specific causality factors may be performed by selecting the maximum causality factor or by calculating an average causality factor.

The processing to determine the causality factor between transaction related events on service grouping entities and network events starts with step 1550, when two such events are available for causality factor determination. Subsequent step 1551 uses data from the topology model 220 to determine those process groups that provide the services belonging to the service group on which the service group related event occurred. Following step 1552 calculates the causality factors between the process groups providing services for the service group and the process group on which the network event occurred. Subsequent step 1553 applies a damping factor to reflect the damping of the calculated causal effect from the process group to the service group and afterwards combines the multiple causality factors for each process group providing a service for the service group into one overall causality factor. The process then ends with step 1554.

The process of calculating the potential root cause events for an event graph 230 created or updated by the causality estimator, as performed by the root cause estimator 235 is shown in FIG. 16. Processing of root cause events for an event graph may be triggered each time after the event graph was updated by the causality estimator.

The process starts with step 1601 when an event graph 230 consisting in event node records 401 connected by event causality edge records 410 is received by the root cause estimator 235. More precisely, the root cause estimator receives a graph consisting in event node records 401 that are connected with event causality edge records because the causality factor between events in the graph has a value above a certain threshold and describes a possible causal relationship with a probability that is high enough that cannot be ignored. The root cause estimator receives and processes event graph that are updated, e.g. because one or more event node records are added to a graph. This invalidates possible previous root cause estimation results and requires a recalculation of the root cause estimation. On processing of an incoming event node, the causality estimator 227 may detect causal relationships with event nodes of existing event graphs represented by event graph records 420, and update the affected event graph records accordingly. Updating an event graph record 420 may trigger an event graph update notification 234, which causes the root cause estimator 235 to recalculate the root cause candidates for the updated event graph record as described here.

Following step 1602 calculates for each event node record in the graph its cumulative causality impact weight on all other nodes. Input for this calculation are the causality factors of the event causality edge records 410 of the received event graph 230. In graph theory this is referred to as the problem to identify the "centrality" of a graph. The "centrality" of a graph contains the subset of nodes of a graph that are most important. Various well known graph analysis methods may be used for this calculation. As an example, a variant of the eigenvector centrality may be calculated for each event node record as it represents the influence an event node record has on each other event node record in the graph. A definition of the eigenvector centrality can e.g. be found on https://en.wikipedia.org/wiki/Centrality#Eigenvector_centrality. An exemplary calculation of the cumulative causality impact weight for the nodes of a graph, using a variant of a centrality calculation procedure is shown in FIG. 23.

Following step 1603 identifies the event node record with the highest calculated cumulative causality impact weight, and subsequent step 1604 calculates, an impact delta value which is based on the highest cumulative causality impact weight. In some embodiments, the impact delta value may be determined as a fraction of the highest calculated cumulative causality impact weight, by e.g. multiplying it by a constant factor between 0 and 1, like 0.05 or 0.01. The impact delta value may be used together with the highest cumulative causality impact weight to determine root cause candidate events by e.g. selecting events with a cumulative causality impact weight that is higher than the highest cumulative causality impact weight minus the impact delta value. As an example, for a graph containing 5 events, the calculated impact weight may be 0.5, 0.49, 0.48, 0.32 and 0.24. In the example, the highest cumulative impact weight would be 0.5. Multiplying the highest cumulative impact weight with the constant factor 0.05 results in an impact delta value of 0.025. Consequently, events with a causality impact weight between 0.5 (max weight) and 0.475 (max weight 0.5−impact delta 0.025) would be considered as root cause candidates, resulting in the three events with impact weight 0.5, 0.49 and 0.48.

In other embodiments, the number of events in the event graph may also influence the calculation of the impact delta value in a way that it e.g. allows a higher impact delta for event graphs with a higher number of events. E.g. for graphs with 1 to 10 events, the constant factor to calculate the impact delta would be 0.01, for graphs with 11 to 20 events the constant factor could be 0.02. This allows a higher impact delta for root cause candidates in graphs consisting in a higher number of events.

Following step 1605 identifies those event nodes that have a cumulated causal impact weight that is higher than the highest cumulative impact weight minus the impact delta value as root cause candidates and subsequent decision step 1606 determines if the number of root cause candidates is below the maximum root cause size. The maximum root cause size may either be a constant value, like e.g. 3, or it may be a value depending on the size of the analyzed event graph, and may e.g. be defined as 25% of the number of event node records 401 in the analyzed event graph.

Decision step 1606 determines if the number of the detected root cause candidates is smaller than the maximum number of root cause candidates.

In case step 1606 determines that the number of root cause candidates is smaller than this maximal root cause size, the process continues with step 1608 which identifies the previously determined root cause candidates as root cause event. Otherwise, step 1607 is executed which indicates that the root cause detection could not identify events as root cause for the analyzed event graph. In both cases, the process ends with step 1609.

Referring now to FIG. 17 which conceptually describes the extraction of visualization data that describes the situation of a detected problem described by an event graph 230, at a specific point in time on which the state of at least one event in the event graph has changed. The extracted visualization data consists in the topological entities and connections involved into the problem described by the event graph, and data describing the events that are active at the specific point in time. Topological entities and connections may either be involved in a detected problem because events belonging to the problem occurred on a topological entity or because causal impact between events of the problem travelled over topological entities and connections.

The process starts with step 1701 when a request for problem snapshot visualization data arrives. The request identifies a specific event graph 230 and provides a specific timestamp for which the snapshot visualization should be created. Following step 1702 determines the topology entities involved in the problem by evaluating the entity graph data 414 of each event causality edge record 410 of the event graph. The entity graph specifies those topology entities over which a causal effect between two connected events of the event graph has to travel. Therefore, all entities recorded in an entity graph are of an event of a problem are involved in the problem.

Afterwards step 1703 marks those entities on which events of the problem described by the event graph 230 were observed as directly involved, and subsequent step 1704 in addition marks those entities on which events were active at the provided point in time as entities with active events. The marking of topological entities by steps 1703 distinguishes entities that only passed causal effects from one topology entity to another but were not affected by an observed event from those entities on which an observed event occurred. The marking of step 1704 identifies those entities which are affected by an event at the point in time described by the currently created snapshot.

Following step 1705 determines the entities on which the state of an event changed at or near the provided specific point in time. As each event node record 401 provides a start time range 406 and an end time range 407, step 1705 may e.g. check for each event node record 401 of the analyzed event graph 230, if the provided timestamp is within the raise time (between smin and smax) or the fall time (between emin and emax) of the event node record. Entities with events for which the timestamp is within the raise time may be marked as entities with an event changed to active and entities with events for which the timestamp is within the fall time may be marked as entities with events changed to inactive.

Subsequent step 1706 provides the selected and marked topology entities for further visualization tasks. The process then ends with step 1707.

A screenshot providing an exemplary visualization of the temporal evolution of a problem described by an event graph 230, together with the topological entities involved in the problem is shown in FIG. 18.

The right half of the screenshot 1801 shows a graph view of the topological entities directly or indirectly involved in the problem visualized together with topological connections of the entities. The topological entities are overlaid with data describing the state of events occurred on the events. A solid circle, e.g. at entities 1802, 1806 and 1825 indicates a currently active event on the entity, a dashed circle, e.g. at entity 1822 indicates an event that was active before but is no longer active at the currently observed point of time. An up pointing arrow, e.g. 1814 at entity 1808 indicates an event that got activated at or near the observed point of time. The problem relevant topology entities displayed in 1801 consist in service 1802 which represents an interface of the monitored system to the outside world and its customer, like a public URL allowing to access a specific application by external users. Such services represent a whole application and may in the topology model be represented as distinctive topological entities of the type application. The application service, on which an event is currently active, calls services 1803 and 1806 which are also involved in the problem. An event is currently active on service 1806. Service 1806 calls services 1816, 1812 and 1813 and service 1803 only calls service 1816. Events are currently active on service 1816 called by service 1803 and 1806 and on service 1813 only called by service 1806. An event is getting activated 1814 at service 1808 at the observed timestamp. Both service 1808 and 1813 are calling service 1818, which is executed on a Microsoft Windows® operating system 1821 on which an event is currently active. Also service 1816 is executed on this operating system. Operating system 1821 is executed on virtualized hardware provided by hypervisor 1825. The hypervisor also provides virtual hardware for Linux operating system 1822. An event was active on operating system at the time before the snapshot, which is currently closed. The down arrow 1822 indicates the state transition of an event at this entity from active to inactive at or near the observed point in time.

The visualization provided by image 1801 provides a good overview of the state of monitored events and their relationships. It also allows a user to judge the severity of different events to concentrate counter measures on entities affected by those severe events. As an example, events on entity 1802, 1806, 1813, 1816 and 1821 are more severe than the event just activated on service 1808, as the former are related to effects that may be observable by customers of the application, whereas the later one seems to only affect a system internal functionality.

The right part of the screen shot 1830 provides a problem overview chart 1832 describing the number of active events of the problem over time. Forward/reverse buttons 1813 allow a temporal navigation over the evolution of the problem and an indicator 1833 indicates the current view position. The graph view 1801 may be updated after a temporal navigation to reflect the state of the problem at the new selected time.

An overview line 1834 displays data identifying the currently viewed time range, the number of active events, the number of topological entities or components affected by those events and trending information showing the number of events that got activated and deactivate since the last change.

The list 1835 below provides detail data of the currently active events, containing the type of the event and the name of the topological entity on which the event occurred.

The data required for the screenshot depicted in FIG. 18 may be provided by the process described in FIG. 17.

Referring now to FIG. 19 which provides an exemplary tabular knowledge base as it may be used by causality evaluation processes. The table consists in column cause entity type 1901, effect entity type 1902 and shared entity type 1903 which may be used to specify types of situations consisting in a cause event occurred on a type of entity, an effect event occurred on a type of entity and type of the entity that is shared between cause and effect entity. The column impact factor 1904 specifies the value of the impact factor for the specific type of situation. Typically, the shared entity provides the environment in which a cause and an effect entity are executed. As an example, service entities are provided by process groups, process groups are executed by operating systems and operating systems may run on virtualized hardware provided by a hypervisor. In case of two services provided by the same process group, their shared entity type would be process group. In case they are provided by two different process groups on the same operating system, their shared entity type would be operating system.

Lines 1905 to 1910 exemplary describe some of those situation and a corresponding impact factor. Various other variants of tabular knowledge bases may be used by the disclosed systems, specifying more columns to identify a matching impact factor, like e.g. columns specifying the type of cause and effect event.

The processing to determine causal relationships between events indicating unexpected load changes, like the number of observed transactions executions or network activities per time interval, is shown in FIG. 20. To determine the causal impact between such events, it is important to also analyze the corresponding, unaffected load situation before the events occurred.

The process starts with step 2001 when an event pair consisting in events describing an unexpected load change arrives at the causality estimator 227. One load change event is assumed to be the cause of the other load change event.

Following step 2002 determines the transaction load situation that was observed on the services related to the events before the events occurred. Step 2002 may fetch transaction trace data of transaction with transaction classification coordinates matching one of the classification coordinates of the received cause or effect event, that are using at least one of the services related to the received events and that were executed immediately before the events occurred. E.g. transactions that occurred in a time period ending immediately before smin of hypothesized cause and effect event with a duration of the time period of smax-smin of the hypothesized effect event. The transaction load situation that is unaffected by both transaction load events allows to determine the expected and normal load situation of the services related to the events, and to determine a causality factor describing the probability that a call to the hypothesized cause event results in a call to the hypothesized effect event under normal operating conditions.

Subsequent step 2003 determines the transaction load situation between smin and smax of the hypothesized effect event by fetching transaction traces executed during this time period that used at least one of the services corresponding to one of the received event and that match one of the transaction classifications of the events.

Following step 2004 may use the transaction trace data related to normal operating conditions of both services related to the received events as determine in step 2002 to calculate a factor describing the probability that a call to the service related to the cause event results in a call to the effect event under normal operating conditions. Afterwards, step 2005 may use the transaction trace data related to the time period corresponding to the raise time of the hypothesized effect event as determined in step 2003 to determine a factor describing the probability that a call to the service related to the cause event results in a call to the effect event under operating conditions affected by the received load activity events. The calculation of both probability factors may be performed similar as described in FIG. 13.

Afterwards, step 2004 may use the normal and affected probability factor to calculate a causality factor describing the probability that the hypothesized cause event caused the hypothesized effect event. A similar probability of a cause service call causing an effect service call of normal and affected conditions would support the hypothesis of a causal relationship, whereas a deviating probability is an indicator against a causal relationship. A similar probability that a call to the cause service causes a call to the effect service (for load change events, the causal direction is against the call direction) for normal and load change situation indicates that the reduced load of the calling service is mostly unchanged propagated to the called service. Significantly deviating probabilities for normal and changed load situations indicate that the load change at the called service may also be impacted by other events. This also reduces the probability of a causal relationship between the two analyzed load change events.

After a causality factor between the two received events was calculated in step 2004, the process ends with step 2005.

Referring now to FIG. 21, which describes an alternative method to calculate event timing based causality factors that in addition to the probability that events are active at specific points in time also considers a varying probability that the state change of the monitored system indicated by an event can have an impact on other events. The idea behind this alternative method is, that there is a higher probability that an event has an impact on other events directly after the event is raised and that this probability decays over the time the event is active.

Graph 2101 describes the probability that an assumed cause event 1 901 was active over time, with a timestamp $smin_{E1}$, $smax_{E1}$, $emin_{E1}$ and $emax_{E1}$ as described in FIG. 9a and graph 2130 describes the probability that an assumed effect event 2 901 was active with similar timestamps also as described in FIG. 9a.

Graph 2101 shows that the probability that event 1 901 is active starts with a value of 0 at $smin_{E1}$ 902 indicating that it is impossible that event 1 is active and constantly increases to a value of 1 indicating that event 1 is definitely active at $smax_{E1}$ 903. The graph has a value of 1 between $smax_{E1}$ and $emin_{E1}$ indicating certainty that event 1 901 was active during this period and it has a value constantly decreasing from $emin_{E1}$ 904 to $emax_{E1}$ 905 indicating that the probability that event 1 is active diminishes until 0 at $emax_{E1}$ 905 indicating certainty that event 1 901 is inactive.

The exemplary impact fade graph 2110 models the assumption that the probability that an event has an impact and may cause another event is highest at or directly after the point in time at which the event was activated and then decreases over time. The exemplary impact degradation function shown in 2110 is an exponential decay function that starts with value 1 at activation time of the event and then exponentially decreases over time until the event was deactivated. After deactivation of the event, the probability function may either have a constant value of 0, indicating the impossibility of an impact after the deactivation, or it may drop by a certain factor 2115 that further decreases the probability of a causal impact, to a highly improbable but not impossible value to allow rare causal aftereffects of an event. The exponential decay impact degradation may be specified by a parameter λ that defines the point in time after start of the function at value 1 when the value of the function degraded to the half of the start value. Further, a factor may be specified that is applied to the value of the decay function after the event deactivation to model the step down 2115 of the impact probability after deactivation of the event. Using an exponential decay function to describe the decreasing impact probability of an event over time is only an example. Various other types of functions, like a linear decay function may be used, as long as they describe a value that falls over time.

Graph 2110 shows an exemplary impact fade graph for a specific assumed start time s 2112 out of the interval from $smin_{E1}$ to $smax_{E1}$ and a specific assumed end time e 2114 out of the interval from $emin_{E1}$ to $emax_{E1}$. As the concrete start and end times of event 1 901 are unknown, but only time intervals $smin_{E1}$ to $smax_{E1}$ and $emin_{E1}$ to $emax_{E1}$ are known that contain start and end time of the event, all possible exemplary impact fade graphs 2110 for all possible start and end time combinations may be created and combined into an average impact fade graph 2120.

The average impact fade graph represents the probability that an assumed cause event impacts other events by considering a degraded impact probability over time and an unknown exact start and end time of the assumed cause event. The average impact fade graph may be calculated by calculating the average value of all possible exemplary impact fade graph for the time period from $smin_{E1}$ to $smax_{E1}$.

After the average impact event fade graph is calculated, the start time interval of a potential effect event 906 as shown in graph 2130 may be used to identify the relevant part 2121 of the average impact fade graph 2120 of the assumed cause event 901. The relevant part 2121 may be used to calculate a timing based partial causality factor. As an example, an average value of the graph values in the relevant part 2121 may be calculated and used as timing based partial causality factor.

Referring now to FIG. 22, which depicts optimizations of event graphs 230 to improve the accuracy of the root cause estimation based on a variant of the page rank algorithm (see e.g. U.S. Pat. No. 6,285,999 "METHOD FOR NODE RANKING IN A LINKED DATABASE") as e.g. performed by some embodiments of a root cause estimator 235. The page rank algorithms analyzes the importance of documents in a network of documents that are connected by weighted and directed links. In one explanation approach, the page rank algorithm simulates a random surfer that navigates through the document network by randomly choosing one of the links that connects the current document with other documents. The weight of the links determines the probability that a specific link is followed. Instead of following a link on the current document, the random surfer may, with a lower probability, also choose a random other document of the document network and continue surfing from this other document. The rank of a specific page is the probability that the random surfer is on the specific page.

The page rank algorithm may be applied to an event graph 230 to calculate a rank or weight of each event in the graph representing the global impact of the event on all other events in the graph.

FIG. 22a shows a situation of an event graph containing only the two events event 1 401a and event 2 401b, that are connected by a causal node 413a indicating an impact from event 2 to event 1 with a causality factor of 0.1 and by another causal node 413b indicating an impact from event 1 to event 2 with a causal factor of 0.9. Intuitively by judging the different causality factors, a higher root cause probability or rank of event 1 401a would be expected as the probability of an impact from event 1 to event 2 is higher than the reverse direction.

However, by using the page rank algorithm, an equal root cause probability would be calculated for both events. The reason for this unexpected result may be explained by using the random surfer model. The random surfer randomly chooses one outgoing link/causal connection from the current event. As in this case, each event has only one outgoing causal connection, the probability that the random surfer is on an event is equal for event 1 and event 2. To correct this unexpected results, a virtual self-loop causal connection 410c with a very low causal factor 413c may be introduced for event types that have, according to knowledge of the technical domain, typically no other root cause and are therefore the root cause of themselves. An example for such an event type would be a "disc full" event indicating a full hard disc, which from the view of a performance monitoring system has no visible root cause. The virtual self-loop allows the random surfer another departure variant from event 1. As a result, the calculated root cause probability 2202a of event 1 would be higher than the root cause probability 2202b of event 2, as expected according to the corresponding causal factors 413a and 413b.

A further optimization, which dampens undesired effects of the self-loop described in FIG. 22a is shown in FIG. 22b. The self-loop emphasizes the root cause probability of events of certain types, which may lead to incorrect root cause candidates. As an example event 3 401c and event 4 401d may describe service related events which are connected by a causal link 410c from event 4 401d to event 3 401c indicating that event 3 is caused by event 4. The causal link 410c has a high causal factor 413c of 0.9. The causal factor is justified by monitored transactions using the services related to the events according to the required event causality call direction, for details see e.g. FIG. 9c or FIG. 13. A further event 5 401e is connected with event 4 401d with causal link 410d indicating that event 5 causes event 4 with a relatively low causal factor 413d of 0.1.

As the type 402e of event 5 indicates a type of event that most probably is its own root cause, a self-loop causal link 413e is added to the event graph before calculation of the root cause probability factors.

As a result of adding the self-loop causal connection 410e, the calculated root cause probability 2202e for event 5 has a higher than expected value, incorrectly suggesting that event 5 is the root cause of the events in the event graph, which is not justified by the causal links of the graph.

To correct this behavior, virtual event nodes describing an unobserved cause 2204f and 2204g may be introduced for specific event types, like e.g. service related events that are connected with those events by a causal link 410f and 410g with a relatively low causal factor 413f and 413g that model the probability that an unobserved root cause exists for those events. Adding those events provides more variations for the random surfer to escape from event 5 and it's self-loop. This dampens the effect of the self-loop and provides expected root cause probability results that are also justified and supported by the calculated causal factors 413c and 413d which intuitively indicate that event 4 is the root cause of the problem. By applying this optimization, a root cause probability of e.g. 0.1 2203c is calculated for event 3, 0.8 2203d for event 4 and 0.1 2203e for event 5, which identifies event 4 as root cause candidate as expected.

Referring now to FIG. 23, which visually describes an iterative centrality calculation procedure that may be used to calculates the cumulative causality impact weight for the nodes of an event graph 230.

Typically, centrality calculation procedures shift weight between nodes in a graph according to e.g. the number of connections of a node, or according to the weight of a node. Those procedures work in iteration steps, where each step shifts a portion of weight, and where the amount of shifted weight decreases with each iteration step. Those procedures may either be terminated after a specific number of iterations, or when the amount of shifted weight falls below a specific threshold. This threshold may define a maximum tolerable error of the calculation result.

FIG. 23a shows the first three iteration steps to calculate the cumulative causality impact weight for a graph consisting in the three nodes "A" 2302, "B" 2301 and "C" 2303. Nodes "A" and "B" are connected by an edge 2304 with calculated weight 0.25 and nodes "B" and "C" are connected by an edge 2305 with a calculated weight of 0.5.

In an initial step, before the first iteration is started, a normalized weight 2306 and 2307 is calculated for each edge 2304 and 2305 by applying formula 2330, and the cumulative causality impact weight 2311, 2312 and 2313 of the nodes of the event graph is set to an initial value of 1.0.

Tables 2320, 2320' and 2320" show how the cumulative causality impact weight for each node is calculated in the three executed iteration steps.

Initialization of cumulative causality impact weights to 1.0 and calculation of the normalized edge weight brings the graph into the state of iteration 0 2310.

With iteration 1 2310', the new cumulative causality impact weight for each node is calculated by applying formula 2340, using the cumulative causality impact weight of the node from iteration 0 and the normalized edge weight of all outgoing edges of the node.

Iteration 2 applies formula 2340 using the cumulative causality impact weight calculated in iteration 1.

The values of the cumulative causality impact weight for iteration 0, 1 and 2 and for nodes "B" 2301 and "C" 2303 show a rise with each iteration, but they also show that the amount of added impact weight declines with every iteration. This allows to define a termination point for this iterative process when e.g. the amount of added impact weight falls below a certain threshold. Node "A" 2302 has no outgoing edges representing a causal effect originated from node "A" 2302. Accordingly, the cumulative causality impact weight for node "A" remains constant for all iterations. The calculation of cumulative causality impact weights for the nodes shows that node "C" 2303 has the highest weight, which is expected according to the weights of the edges 2304 and 2305 representing the impact that event "B" has on event "A" and that event "C" has on event "A".

After the iterative step to determine the cumulative causality impact weight of the event nodes in graph is finished, e.g. because the amount of impact weight shifted for each event node falls below a threshold, the calculated cumulative causality impact weights of all event nodes may be normalized to a value between 0.0 and 1.0 by dividing each cumulative causality impact weight of each node by the sum of cumulative causality impact weights of all nodes in the graph.

The example described in FIG. 23a was selected to demonstrate mathematical procedures that may be used to determine root cause candidates for an event graph describing calculated and estimated causal relationships between events. To not distract the reader from the applied process, a minimal example was chosen, and the result of the calculation looks foreseeable for this example and it may appear that selecting node "C" as root cause candidate may be possible by analyzing the previously calculated impact weights alone.

However, for other event graphs with more events and more causal edges and a more complex graph topology, the root cause candidates may not be as obvious and the determination of those root cause candidates may require a mathematical analysis to determine the centrality of the event graph.

Referring now to FIG. 23b which describes the formulas that may be used to determine the impact weight delta for one iteration.

The formula 2330 to calculate the normalized edge weight for an edge divides the weight of an incoming edge of an event node by the sum of the weights of all incoming edges of the event node. Formula 2330 is applied on all edges of the graph and normalizes the weight of all incoming edges of an event node in a way that the sum of normalized edge weights of all incoming edges of a node has the value of 1.0 and each normalized edge weight has a value from 0.0 to 1.0.

Formula 2340 may be used to calculate the impact value received by a specific event node in a non-initial iteration step, e.g. iteration 1 2310' or iteration 2 2310". The new node weight is calculated as the sum of weight contributions by all outgoing edges of the event node, and the weight contribution of an outgoing edge is calculated by adding the constant value 1.0 to the product of the node weight from the last iteration and the normalized edge weight of the outgoing edge.

The semantic of the directed edges 2304 and 2305 in this example is defined that the event node which is the origin of the arrow is the cause event, and the event node to which the arrow is pointing represents the effect event. The calculations and processing demonstrated above may also be applied to a graph that uses the opposite semantic of impact edges, e.g. the arrow points from the impacted event to the impacting event. In this case, formula 2330 operates on outgoing edges instead of incoming edges and formula 2340 operates on incoming edges instead of outgoing edges.

It is noteworthy that the above described procedure to detect the root cause candidate events of an event graph is inspired by existing methods to calculate the centrality of a graph, like e.g. methods to calculate Degree Centrality, Eigenvector Centrality, Katz Centrality or PageRank, but it also distinguishes substantially from those existing centrality calculation methods, as they e.g. do not consider the weight of edges at all, or they use the same weight factor for all outgoing edges of a node.

Referring now to FIG. 24, which describes an overview of a monitoring system that uses data describing events form one or more historic reference periods to determine if events that are similar and more severe than currently ongoing events have been observed before. Events for which no similar and more severe events have been observed before may be considered to describe an exceptional operating condition of the monitored environment. Such events may be marked as relevant and this marking may be used by subsequent event based processing and visualization tasks.

Event sources 2402, which may be a multitude of infrastructure agents 206 or service event generators 222, generate event node records 401, which in addition to the fields described in FIG. 4a contain a relevance indicator 2401 field which may be used to mark events describing an exceptional operating condition. Typically, the event source 2402 has no data available to determine if an event is relevant. In absence of data to decide the relevance state of an event, the event source sets the relevance indicator to indicate a not relevant event on creation of the event record node. The event record nodes are forwarded 2431 to the event correlator 231 and processed as described above to identify causal relationships between different events. In addition to the event node records 401, the event sources 2402 also send 2430 event severity notifications 2403 to an event severity time series repository 2408. Event severity notifications provide updates about measurements and durations describing currently ongoing events detected by the respective event sources. An event severity notification 2403 may contain but is not limited to a type field 2404 specifying the type of event described by the notification, a topology coordinates field 2405 identifying the topological entity on which the event occurred, a measurement and duration update field 2406 containing new measurement values for all measures describing the event and an update to the duration of the event, and an end indicator 2407 indicating if the event referred by the event severity notification has ended.

The event severity time series repository 2408 receives and processes the event severity notifications to incrementally create event time severity time series 2409. Event severity time series describe for each event type and topological entity, the history of occurred events. An event severity time series 2409 may contain but is not limited to a type field 2410, identifying a specific event type, a topology coordinates field 2411 identifying a specific topological entity and an event list 2412 containing a list of event severity records 2413 describing events of the specific event type that occurred on the specific topological entity. The event severity records 2413 in the event list 2412 are sorted ascending by the start time of the corresponding events.

An event severity record 2413 describes measurement peak values and the duration of a specific event and may contain but is not limited to a set of measurement peak values 2414 describing the highest reported values for measurements of the specific event, and a start/end time field 2415 describing the duration of the specific event. The processing of event severity notifications 2403 to incrementally create event severity time series 2409 is described in detail in FIG. 25. It is noteworthy, that for some types of measurement, not the highest, but the lowest reported value is relevant to determine the severity of an event. An example of such a measurement type would be the amount of free memory available for a process. A lower value of such a measurement indicates a more severe situation. Such measurements may be processed similar to other measurements where a higher value indicates a more severe situation, expect that for those measurements, the lowest reported value is stored to the measurement peak values.

An event relevance determination unit 2416 cyclically fetches 2421 all currently open event node records 401 (i.e. end time range/interval 407 of event node record 401 not set), that are not yet marked as relevant (i.e. relevance indicator 2401 indicating a not relevant event) from the event correlator 231. The event relevance determination unit 2416 accesses 2422 the event severity time series repository 2408 to fetch the event severity time series records 2409 corresponding to the fetched event node records 401. It also accesses 2423 a relevance determination configuration 2424 to fetch configuration data that controls the process to determine if an event node record 401 describes an exceptional operating condition and is therefore relevant. The event relevance determination unit performs the relevance determination for all fetched event node records 401 and updates the relevance indicator 2401 of those event node records according to the outcome of the determination process. The determination process is described in detail in FIGS. 26 and 27.

A relevance determination configuration 2424 may contain but is not limited to a set of reference period configurations 2425, containing data that specifies the temporal extend of a reference period, and strategy configurations for peak measurement value 2427 and event duration based 2428 determination of relevant events, and a period result join strategy 2429 which defines how, potentially different, relevance results for different reference periods are joined.

The event correlator 231 is grouping event node records 401 into event graphs 230 according to detected causal relationships as described before. An event graph consumer 2420 may request those event graphs for tasks like visualization or further processing. Those event graphs may be filtered by a relevance based event graph filter 2418 in a way to only event graphs that contain at least one, or another specific minimum of relevant event are forwarded to the event graph consumer 2420.

Referring now to FIG. 25 which conceptually describes the processing of event severity notifications 2403 by the event severity time series repository 2408 to create or update event severity time series 2409.

The process starts with step 2501 when a new event severity notification 2403 is received by the event severity time series repository 2408. Subsequent step 2502 queries the event severity time series repository 2409 for an event severity time series 2409 with an event type 2410 and topology coordinates 2411 matching event type 2404 and topology coordinates 2405 of the received event severity notification 2403. If subsequent decision step 2507 detects that no matching event severity time series was found, step 2503 is executed which creates a new event severity time series 2409 and sets its type 2410 and topology coordinates to the corresponding values of the received event severity notification 2403. Following step 2504 creates a new event severity record 2413 and sets its measurement peak values 2414 to the measurements 2406 received with the event severity notification 2403 and the start/end time 2515 to indicate the start time of the event corresponding to the received event severity notification. Afterwards, step 2505 adds the created events severity record to the event list 2412 of the created event severity time series 2409 and step 2506 stores the created event severity time series in the event severity time series repository. The process then ends with step 2516.

In case decision step 2507 detects that a matching event severity time series was found for the incoming event severity notification, step 2510 is executed which queries the event list 2412 of the found event severity time series to find the event severity record 2413 corresponding to the event for which the received event severity notification 2403 was sent. Finding the matching event severity record may be based on an event identifier identifying individual events, which may be stored in event severity notification and event severity records. If it can be assumed that only one event of a specific type is open on a specific topological entity at one point in time, a combination of event start time and topology coordinates may be used to identify a matching event severity record. Subsequent decision step 2511 evaluates if a matching event severity record was found and executes step 2508 in case none was found. Step 2508 creates a new event severity record 2413, sets its measurement peak values 2414 to the measurements 2406 received with the event severity notification 2403 and the start/end time 2415 to indicate the start time of the event corresponding to the received event severity notification. Following step 2509 inserts the created event severity record into the event list 2412 on a position according to the start time of the event described by the event severity record. Step 2509 inserts event severity records in a way that the event severity records are sorted ascending by the start time of the events described by the event severity records. Afterwards, the process ends with step 2516.

If decision step 2511 detects that a matching event severity record 2413 is available, the process continues with step 2512, which identifies those measurement values of the received event severity notification 2403 that are more severe (typically measurement values that have a higher value) than the peak measurement values currently stored in the event severity record 2413. As an example, an event severity record may currently store a measurement "CPU usage" with a peak value of 50% and a measurement "Memory usage" with a peak value of 30%, and an incoming event severity notification may provide a "CPU usage" of 60% and a "Memory usage" of 25%. Step 2512 would in this case identify "CPU usage", as the reported measurement is higher than the corresponding currently stored peak value.

Following Step 2513 updates the identified measurement values of the measurement peak values field 2414 of the found event severity record to the values of the received event severity notification. Following above example, step 2513 would set the peak value of measurement "CPU usage" from 50% to 60%. Afterwards, decision step 2514 is executed which checks if the end indicator 2407 of the event severity notification indicates that the event for which the event severity notification was sent has just ended. In case the end indicator indicates an ended event, step 2515 is executed which sets the start/end time field 2415 to indicate the end time of the event. After step 2515 or if the end indicator does not indicate an ended event, the process ends with step 2516.

Referring now to FIG. 26, which describes the process of determining the relevance of a specific event by considering multiple reference periods. The process starts with step 2601 and is executed for each event node record 401 currently stored in the event causality repository 232 of the event correlator 231 that represents an open event and for which the relevance indicator 2401 is still set to indicate a not relevant event. Following step 2602 fetches a reference period configuration 2425 from the reverence determination configuration 2424 and subsequent step 2603 fetches the event severity time series 2409 matching the event type and topology coordinates of the currently processed event node record and afterwards selects those event severity records 2413 from the event list 2412 of the fetched event severity time series 2409 that describe events falling into the reference period definition 2426 of the currently processed reference period configuration 2425. The reference period may be defined as a time period like "the last 24 hours" or "the last week" and may be interpreted as a time period extending from the current time into the past. The selection of event severity records as performed in step 2603 may be done by selecting those event severity records that refer to an event that has a start time inside the reference time period specified by the period definition 2426. Following step 2604 performs reference period specific relevance determination processing on the current event node record 401, using the event severity records selected in step 2603 and the value 2427 and duration 2428 based relevance determination strategy of the currently processed reference period configuration. A detailed description of the processing performed by step 2604 can be found in FIG. 27.

Following decision step 2605 checks if another reference period configuration 2425 is available in the configuration 2424 and in case a not yet processed reference period configuration is available, continues with step 2602. Otherwise, the process continues with step 2606 which merges the reference period specific relevance results calculated for different reference period configurations by applying the period result join strategy 2429 stored in the configuration. Exemplary join strategies are: "mark event node record as relevant if it is identified as relevant in all reference periods", "mark as relevant if identified relevant in more than the half of the reference periods" etc.

After the period specific results are merged into a final result, the final result is set to the relevance indicator 2401 of the currently processed event node record 401 in step 2607 and the process ends with step 2608.

The process that performs the relevance determination for an event node record describing a currently ongoing event for a specific reference period is described in FIG. 27. It is executed for each event node record describing a currently ongoing event that has a relevance indicator indicating a not relevant event. The process uses a value based relevance determination strategy 2427 and a duration based relevance determination strategy 2428 of a specific reference period configuration 2425, and a set of event severity records matching the currently processed event by type and topology coordinates and matching the duration definition 2426 of the specific reference period configuration. The process starts with step 2701 for a specific event node record and subsequent step 2702 selects from the matching event severity records those event severity records which have only measure peak values that are higher than the corresponding measure peak values of the currently processed event and which have a higher duration than the event described by the currently processed event node record 401. As an example, for a current event record with peak values "CPU usage" 50%, "Memory usage" 30% and duration 500 milliseconds, all event severity records would be selected that show all of a "CPU usage" peak value higher than 50%, a "Memory usage" peak value higher than 30% and a duration that is longer than 500 milliseconds (in case of an event severity record describing a currently ongoing event with no end time set, the duration may be calculated as the period between the current time and the event start time). The event severity records identified by step 2702 are those event severity records that have only peak measurements that are more severe than the peak measurements of the currently processed event and that also have a longer duration than the currently processed event. The set of event severity records determined by step 2702 contains all events of the same type of the currently processed event record that also occurred on the same topological entity than the currently processed event record. The size and other parameters of this set may be used to determine how "common" the occurrence of events like the event corresponding to the currently processed event node record were during the reference period. The set of events identified by step 2702 may also be referred to as equivalence class of the currently processed event.

Some embodiments may apply weight factors to measurement peak values and duration of event severity records from the reference period. Those weight factors may virtually increase the severity and duration of the reference events, to decrease the probability that a current event is wrongly identified as relevant.

Following step 2703 applies the value based relevance determination strategy 2427 of the currently processed reference period configuration on the set of event severity records identified by step 2702 to determine if the current event is relevant according to measurement peak values and individual durations of reference events. Value based relevance determination strategies may be based on the equivalence class of a candidate event as determined in step 2702. The equivalence class may i.e. be defined as the set of events from the reference period having only peak measure values that are higher than the measure values of the candidate event and that also have a longer duration than the candidate event. Exemplary value based relevance determination strategies may include but are not limited to a) "determine event as relevant if its equivalence class is empty", b) "determine event as relevant if size of equivalence class is lower than a specific threshold" or c) "determine event as relevant if the size of the equivalence class relative to the number of all reference events is lower than a specific percentage threshold". Example strategy a) would only select an event as relevant if there is no reference event available has only peak measure values that are higher than the measure values of the candidate event and that also has a longer duration than the candidate event; strategy b) would only select an event as relevant if the number of reference event having only peak measure values that are higher than the measure values of the candidate event and that also have a longer duration than the candidate event is lower than a specific value (e.g. a candidate event is relevant if its equivalence class contains not more than three events); example strategy c) would compare the number of all reference events with the number of reference events of the equivalence class and only select a candidate event as relevant if the percentage of events of the equivalence class is lower than a specific value. A concrete example for strategy c) could e.g. allow a maximum equivalence class size of 5%. Considering a set of reference events with a size of 100, a candidate event with an equivalence class size of 4 (i.e. equivalence class contains 4% of reference events) would be selected as relevant, whereas a candidate event with an equivalence class size of 6 (i.e. equivalence class contains 6% of reference events) would not be selected as relevant.

Afterwards, decision step 2704 is executed which continues execution with step 2707 if step 2703 identified the current event as not relevant. In this case, step 2707 is executed which indicates the currently processed event node record as not relevant. Afterwards, the process ends with step 2710. In case step 2703 determines that the currently processed event node record is relevant according to the value based determination strategy, the process continues with step 2705 which determines the timespan in the reference period during which at least one events of the equivalence class was active. The timespan determined by step 2705 may also be referred to as equivalence open time. Comparing the equivalence open time with the duration of the reference period may be used as an indicator about how "common" it was that an event that was more severe than the current event in all measurements was open during the reference period. Following step 2706 applies the provided duration based relevance determination strategy 2428 on the equivalence open time and the duration of the reference period. An example strategy is "determine an event as not relevant if the equivalence open time is longer than 50% of the reference period", which only allows to mark an event as relevant if the time during which at least one event that was more severe than the current event was open is shorter than 50% of the reference time period.

Subsequent decision step 2708 executes step 2707 if the evaluation of duration based strategy in step 2706 resulted in a not relevant event, and step 2709 otherwise. Step 2709 indicates the currently processed event node record 401 as relevant and the process ends with step 2710.

A visualization of the peak measurement based and open duration based determination of the relevance status of an event by a specific example is shown in FIG. 28a and FIG. 28b. FIG. 28a shows measurements and duration of a set of reference events E1 to E5 and of an event E6 401a for which the relevance status should be determined. Events E1 to E5 were selected from the event list 2412 of an event severity time series 2409 that matches the event type and topology coordinates of the candidate event E6. Out of the event list 2412, those event severity record are selected that match the period definition 2426 of the reference period configuration 2425 that is used to test the relevance state of E6. The peak measurements for each measure of the events, e.g. measure 1 2805 and measure 2 2806 and the duration 2807 are each individually sorted ascending by measurement or duration value. As an example, reference event E1 has a peak value of 1.0 for measure 1 and is therefore on position 1 2808 in the sorted list for measure 1, a peak value of 6.4 for measure 2 which ranks it to position 3 2813 and a duration of 0.3 which ranks it to position 1 in the sorted duration list. After all measurements and durations of the reference events are sorted, the positions of measures and duration of the candidate event E6 are determined. According to its measure values and its duration, E6 is on position 3 2814 for measure 1, on position 4 2815 for measure 2 and on position 2 2816 for the duration. Events E2, E4 and E5 show peak measurement and duration values that are higher than the corresponding measure values and the duration of candidate event E6, but only events E2 and E4 show only higher measure values and a higher duration than E6, see positions 2817 to 2822. The applied value based relevance determination strategy 2427 selects those events which show a higher duration and which have higher values for all measures than the candidate event as members of the equivalence class for E6. Other selection strategies may also be applied, like selecting those reference events for which more than half of the measure values are higher than the corresponding measures of the candidate event, or selecting those reference events for which at least one measure value is higher than the corresponding measure value of the candidate event.

After the equivalence class for the candidate event is determined, it is evaluated according to the value based relevance determination strategy 2427. The strategy used in this example identifies a candidate event as relevant if the size of its equivalence class is not greater than 3. By applying this strategy, candidate event E6 is considered relevant according to its measure values and its duration because only two reference events fall into the equivalence class and the value based relevance determination strategy allows an equivalence class with up to three events. Other strategies may be applied here, like only selecting candidate events as relevant if the equivalence class is empty, or strategies that analyze the relation between the size of the relevance class and the number of reference events and only identify a candidate event as relevant if the equivalence class is lower than a given percentage of the number of reference events.

Referring now to FIG. 28*b* which illustrates a relevance determination strategy that is based on the duration during which at least one of the events of the equivalence class of the candidate event was open. A reference period 2833 is specified by the applied reference period configuration and may be denoted as a timespan relatively to the current time, like e.g. the last hour, the 24 hours, the last seven days. The open times of all events of the of the equivalence class may be combined (e.g. combination of duration in which E4 was open 2834 and in which E2 was open 2835 in the current example) to determine the duration in which at least one of the events of the equivalence class was open. This combined open time may be compared with the duration of the reference period to determine the relevance state of the candidate event. In the example shown in FIG. 28*b*, the combined open duration of events from the equivalence class exceed 50% of the reference period, indicating that during more than half of the reference period at least one event was open that was more severe than the candidate event. The exemplary duration based relevance determination strategy described in 2836 identifies the candidate event as not relevant and thus overrules the previous measure value and duration based decision that the candidate event is relevant.

Referring now to FIG. 29, which describes an exemplary usage of the event relevance status in form of a process that filters event graphs. The process starts with step 2901 when a request for event graphs is received by the relevance based event graph filter 2418. Following step 2902 fetches all event graphs from the event causality graph repository 232 of the event correlator 231 and subsequent step 2903 determines for each fetched event graph the number of relevant events and not relevant events by using the relevance indicator of the event node records of the event graph records.

Afterwards, step 2904 determines, based on the number of relevant and not relevant events of an event graph if the event graph should be added to the set of result event graphs that is returned to the sender of the request. The determination performed by step 2904 may be performed according to a certain rule or strategy. Examples for those rules include but are not limited to: only return event graphs that contain at least one relevant event, only event graphs that contain more relevant events than not relevant events or only return event graphs that contain at least one relevant event of a specific type. The last rule example may be used to identify event graphs that contain at least one relevant event of a type that indicates an exceptional operating condition that directly affects the end users of the monitored application. Example event types used by this rule may include events types indicating a response time degradation of a service request sent by web browsers of end users to render content of the monitored application.

Subsequent step 2905 forwards the filtered event graphs to the sender of the request. The process ends with step 2906.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for monitoring performance in a distributed computing environment, comprising:
   providing a repository that stores a plurality of existing event records, where each existing event record describes an event in the distributed computing environment;
   receiving, by an event correlator, an incoming event record which describes an event in the distributed computing environment;
   determining whether the incoming event record indicates an anomalous operation condition of an entity in the distributed computing environment by comparing the event in the incoming event record to a plurality of historic events and discarding the event record in response to a determination that the event record does not indicate an anomalous operation condition;
   forming a pair of records between the incoming event record and each existing event record in the plurality of existing event records;
   determining a first causality factor for each pair of records, where the causality factor describes probability that event described in the incoming event record is cause of an event described in a respective existing event record;
   determining a second causality factor for each pair of records, where the causality factor describes probability that event described in the incoming event record is an effect of an event described in a respective existing event record; and
   creating an event causality record from a given record pair and storing the event causality record in the repository when either the first causality factor or the second causality factor from the given record pair exceeds a threshold, where the event causality record describes a causal relationship between two events which occurred in the distributed computing environment.

2. The method of claim 1 further comprises determining a causality graph for each pair of records, where the causality graph describes possible topological paths between events described in the respective pair of records.

3. The method of claim 1 further comprises
   receiving, by a service event generator, transaction trace data that identifies a transaction being executed the distributed computing environment, wherein the transaction trace data is generated by a transaction agent instrumented in a process executing in the distributed computing environment;
   determining, by the service event generator, a sequence of service calls from the transaction trace data;
   updating, by the service event generator, a topology model using the sequence of service calls, where the topology model defines relationships between entities in the distributed computing environment.

4. The method of claim 3 further comprises
   extracting, by the service event generator, a service measure from the transaction trace data;
   determining, by the service event generator, whether there is an anomaly with the service measure; and
   generating, by the service event generator, an incoming event record for the service measure in response to a determination of an anomaly in the service measure.

5. The method of claim 4 further comprises
   receiving, by an infrastructure topology data processor, infrastructure topology data, where the infrastructure topology data identifies a new entity in the topology model or a new relationship between entities in the topology model and is generated by an infrastructure agent instrumented in an entity in the distributed computing environment; and
   updating, by the infrastructure topology data processor, the topology model using the infrastructure topology data.

6. The method of claim 5 further comprises
   receiving, by an infrastructure event generator, infrastructure measure data, wherein the infrastructure measure data is generated by an infrastructure agent instrumented in an entity in the distributed computing environment;
   extracting, by the infrastructure event generator, an infrastructure measure infrastructure measure data;
   determining, by the infrastructure event generator, whether there is an anomaly with the infrastructure measure; and
   generating, by the infrastructure event generator, an incoming event record for the infrastructure measure in response to a determination of an anomaly in the infrastructure measure.

7. The method of claim 1 wherein determining the first causality factor and the second causality factor further comprises computing a portion of the first causality factor and the second causality factor as a function of timing between event described in the incoming event record and the event described in the respective existing event record.

8. The method of claim 7 wherein determining the first causality factor and the second causality factor further comprises determining an event type for the event described in the incoming event record and the event described in the respective existing event record; and determining a portion of the first causality factor and the second causality factor according to a method for the event type associate with the events when the event type associate with the events match.

9. The method of claim 7 further comprises converting one of the event described in the incoming event record or the event described in the respective existing event record into a virtual event when the event types associate with the events do not match.

10. The method of claim 1 further comprises identifying root cause candidates for a performance problem in the distributed computing environment, where the root cause candidates are identified from the plurality of event records and a plurality of event causality records forming an event graph in the repository.

11. The method of claim 10 wherein identifying root cause candidates further comprises
calculating a cumulative impact factor for each event in the event graph on all of the other events in the event graph;
ranking events according to the cumulative impact factor; and
selecting a subset of events in the event graph having highest cumulative impact factor as root cause candidates.

12. The method of claim 10 wherein the event graph is defined as a weakly connected graph, where the nodes of the weakly connected graph are formed by event records and the edges of the graph are formed by event causality records.

13. The method of claim 1 further comprises
receiving a request for problem visualization, where the request includes a timestamp for the visualization and identifies a specific event graph;
identifying entities in topology model involved with the problem from the specific event graph; and
presenting a graphical visualization of the problem on a display device using the identified entities.

14. The method of claim 13 wherein identifying entities in the topology model involved with the problem further comprises
marking entities referred to by events in the specific event graph;
marking entities on which events were active at time specified by the timestamp;
marking entities on which state of an event changed proximate to the timestamp; and
presenting the graphical visualization of the problem using the marked entities.

15. The method of claim 1 wherein the plurality of historic events are grouped according to event type and according to topological entity and the event in the incoming event record is compared to historic events having the same event type and occurring on the same topological entity.

16. A computer-implemented method for monitoring performance in a distributed computing environment, comprising:
providing a repository that stores a plurality of existing event records, where each existing event record describes an event in the distributed computing environment;
receiving, by an event correlator, an incoming event record which describes an event in the distributed computing environment;
forming a pair of records between the incoming event record and each existing event record in the plurality of existing event records;
determining a first causality factor for each pair of records, where the causality factor describes probability that event described in the incoming event record is cause of an event described in a respective existing event record;
determining a second causality factor for each pair of records, where the causality factor describes probability that event described in the incoming event record is an effect of an event described in a respective existing event record;
creating an event causality record from a given record pair and storing the event causality record in the repository when either the first causality factor or the second causality factor from the given record pair exceeds a threshold, where the event causality record describes a causal relationship between two events which occurred in the distributed computing environment;
receiving, by a service event generator, transaction trace data that identifies a transaction being executed the distributed computing environment, wherein the transaction trace data is generated by a transaction agent instrumented in a process executing in the distributed computing environment;
determining, by the service event generator, a sequence of service calls from the transaction trace data; and
updating, by the service event generator, a topology model using the sequence of service calls, where the topology model defines relationships between entities in the distributed computing environment.

17. The method of claim 16 further comprises
extracting, by the service event generator, a service measure from the transaction trace data;
determining, by the service event generator, whether there is an anomaly with the service measure; and
generating, by the service event generator, an incoming event record for the service measure in response to a determination of an anomaly in the service measure.

18. The method of claim 17 further comprises
receiving, by an infrastructure topology data processor, infrastructure topology data, where the infrastructure topology data identifies a new entity in the topology model or a new relationship between entities in the topology model and is generated by an infrastructure agent instrumented in an entity in the distributed computing environment; and
updating, by the infrastructure topology data processor, the topology model using the infrastructure topology data.

19. The method of claim 18 further comprises
receiving, by an infrastructure event generator, infrastructure measure data, wherein the infrastructure measure data is generated by an infrastructure agent instrumented in an entity in the distributed computing environment;
extracting, by the infrastructure event generator, an infrastructure measure infrastructure measure data;
determining, by the infrastructure event generator, whether there is an anomaly with the infrastructure measure; and
generating, by the infrastructure event generator, an incoming event record for the infrastructure measure in response to a determination of an anomaly in the infrastructure measure.

20. A system for monitoring performance in a distributed computing environment, comprising:
- a repository that stores a plurality of existing event records, where each existing event record describes an event in the distributed computing environment;
- an event correlator configured to receive an incoming event record which describes an event in the distributed computing environment and determines whether the incoming event record indicates an anomalous operation condition of an entity in the distributed computing environment by comparing the event in the incoming event record to a plurality of historic events and discards the event record in response to a determination that the event record does not indicate an anomalous operation condition; and
- a causality estimator receives the incoming event record and forms a pair of records between the incoming event record and each existing event record in the plurality of existing event records, where the causality estimator determines a first causality factor for each pair of records and a second causality factor for each pair or records, where the first causality factor describes probability that event described in the incoming event record is cause of an event described in a respective existing event record and the causality factor describes probability that event described in the incoming event record is an effect of an event described in a respective existing event record;
- wherein the causality estimator creates an event causality record from a given record pair and stores the event causality record in the repository when either the first causality factor or the second causality factor from the given record pair exceeds a threshold, such that the event causality record describes a causal relationship between two events which occurred in the distributed computing environment.

21. The system of claim 20 further comprises a service event generator configured to receive transaction trace data that identifies a transaction being executed the distributed computing environment, determines a sequence of service calls from the transaction trace data, and updates a topology model using the sequence of service calls, wherein the transaction trace data is generated by a transaction agent instrumented in a process executing in the distributed computing environment and the topology model defines relationships between entities in the distributed computing environment.

22. The system of claim 21 wherein the service event generator extracts a service measure from the transaction trace data, determines whether there is an anomaly with the service measure, and generates an incoming event record for the service measure in response to a determination of an anomaly in the service measure.

23. The system of claim 22 further comprises an infrastructure topology data processor configured to receive infrastructure topology data and update the topology model using the infrastructure topology data, where the infrastructure topology data identifies a new entity in the topology model or a new relationship between entities in the topology model and is generated by an infrastructure agent instrumented in an entity in the distributed computing environment.

24. The system of claim 23 further comprises an infrastructure event generator configured to receive infrastructure measure data, extract infrastructure measure from the infrastructure measure data, determine whether there is an anomaly with the infrastructure measure, and generate an incoming event record for the infrastructure measure in response to a determination of an anomaly in the infrastructure measure, where the infrastructure measure data is generated by an infrastructure agent instrumented in an entity in the distributed computing environment.

25. The system of claim 20 wherein the causality estimator determines the first causality factor and the second causality factor by computing a portion of the first causality factor and the second causality factor as a function of timing between event described in the incoming event record and the event described in the respective existing event record.

26. The system of claim 25 wherein the causality estimator determines the first causality factor and the second causality factor by determining an event type for the event described in the incoming event record and the event described in the respective existing event record; and determining a portion of the first causality factor and the second causality factor according to a method for the event type associate with the events when the event type associate with the events match.

27. The system of claim 25 wherein the causality estimator converts one of the event described in the incoming event record or the event described in the respective existing event record into a virtual event when the event types associate with the events do not match.

28. The system of claim 20 further comprises a root cause estimator that identifies root cause candidates for a performance problem in the distributed computing environment, where the root cause candidates are identified from the plurality of event records and a plurality of event causality records forming an event graph in the repository.

29. The system of claim 28 wherein root cause estimator identifies root cause candidates by calculating a cumulative impact factor for each event in the event graph on all of the other events in the event graph; ranking events according to the cumulative impact factor; and selecting a subset of events in the event graph having highest cumulative impact factor as root cause candidates.

30. The system of claim 28 wherein the event graph is defined as a weakly connected graph, where the nodes of the weakly connected graph are formed by event records and the edges of the graph are formed by event causality records.

31. The system of claim 20 wherein the event correlator is configured to receive a request for problem visualization, identify entities in topology model involved with the problem from the specific event graph, and present a graphical visualization of the problem on a display device using the identified entities, where the request includes a timestamp for the visualization and identifies a specific event graph.

32. The system of claim 20 wherein the event correlator identifies entities in the topology model involved with the problem by marking entities referred to by events in the specific event graph, marking entities on which events were active at time specified by the timestamp, marking entities on which state of an event changed proximate to the timestamp, and presenting the graphical visualization of the problem using the marked entities.

* * * * *